Oct. 1, 1935.  L. A. VASSAKOS  2,016,029
AUTOMATIC PHOTOGRAPH STUDIO
Filed June 8, 1931  47 Sheets-Sheet 4
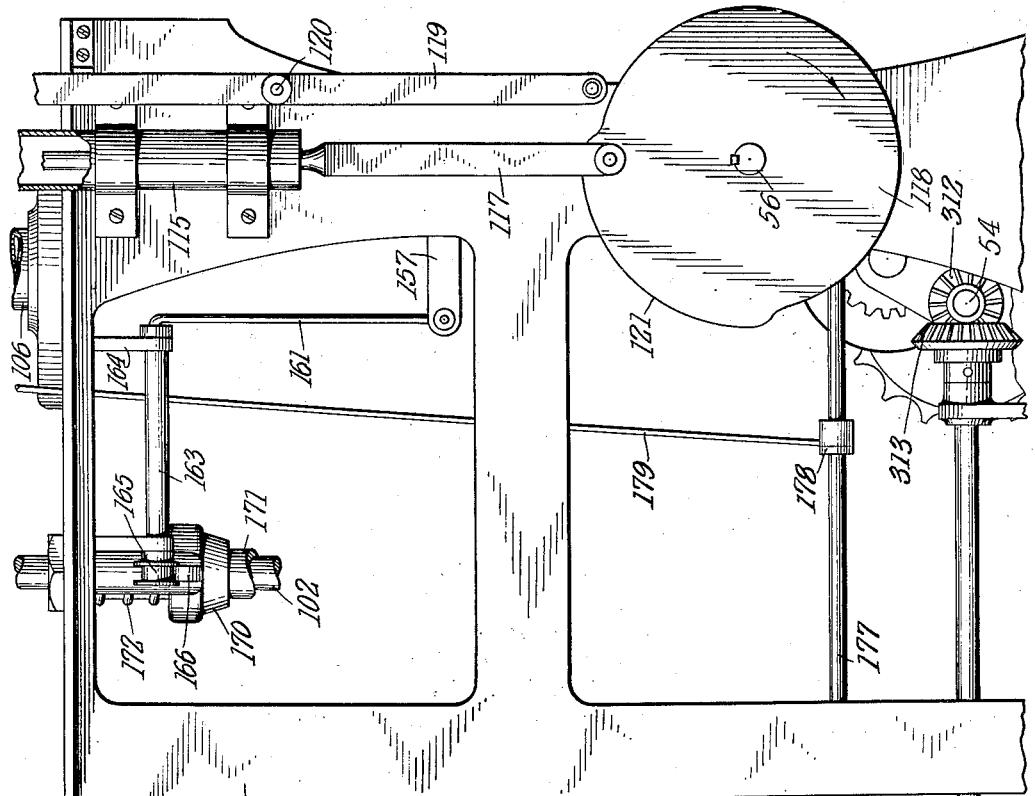
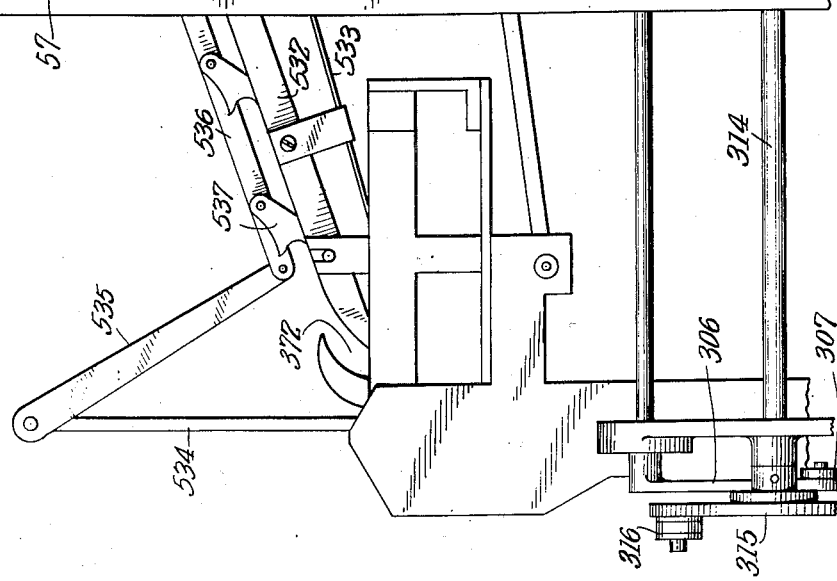
INVENTOR
Leonidas A. Vassakos
BY
ATTORNEY

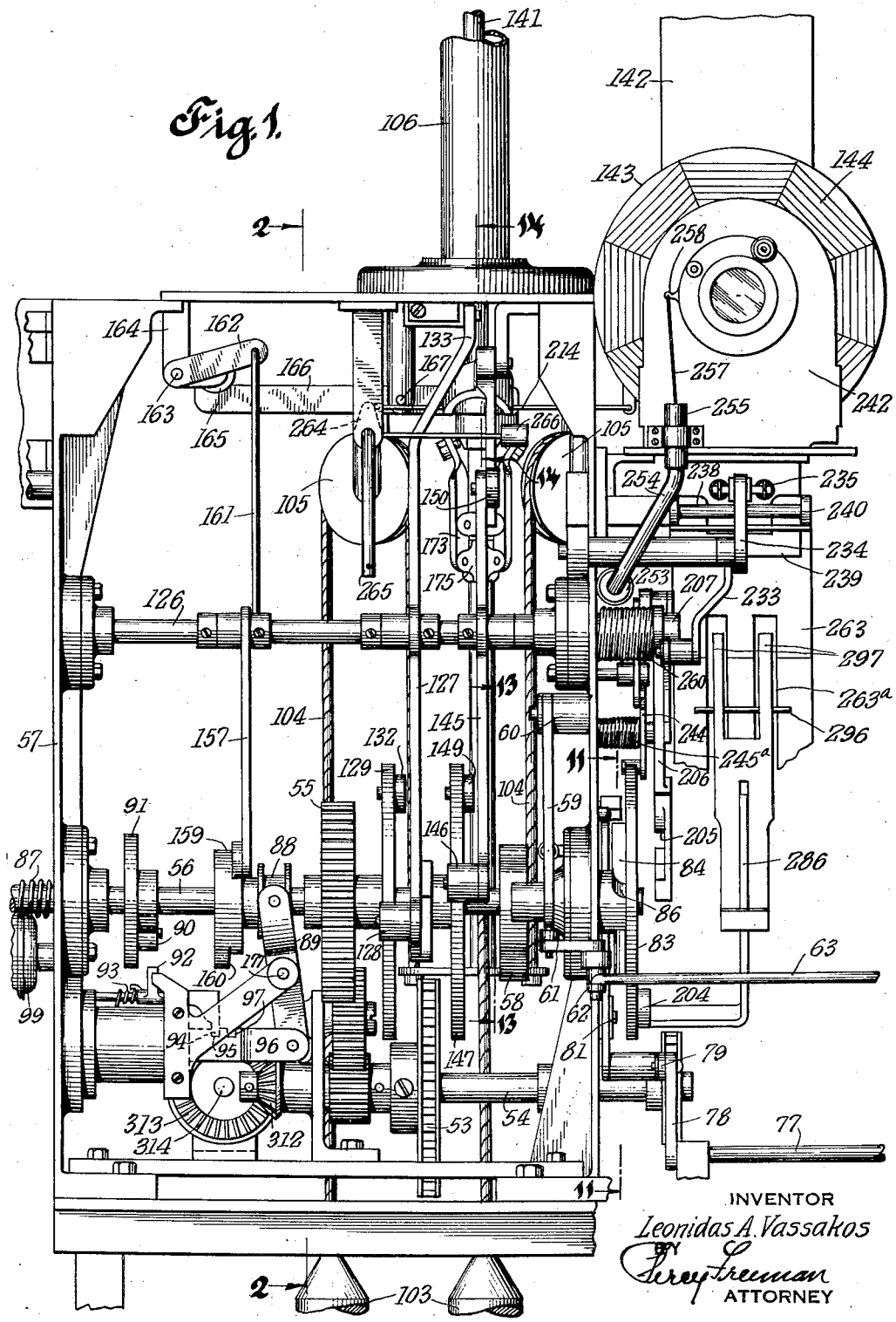

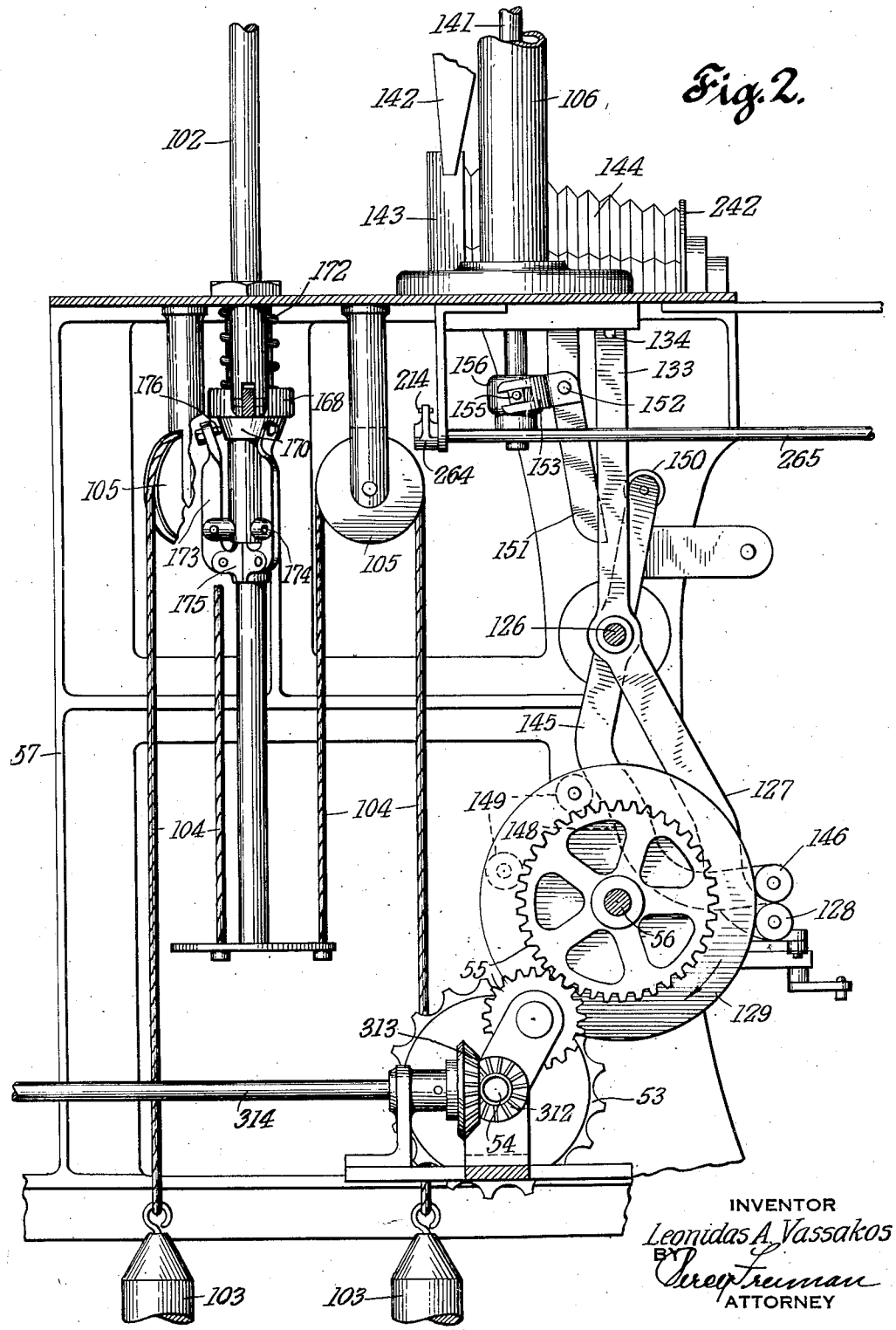

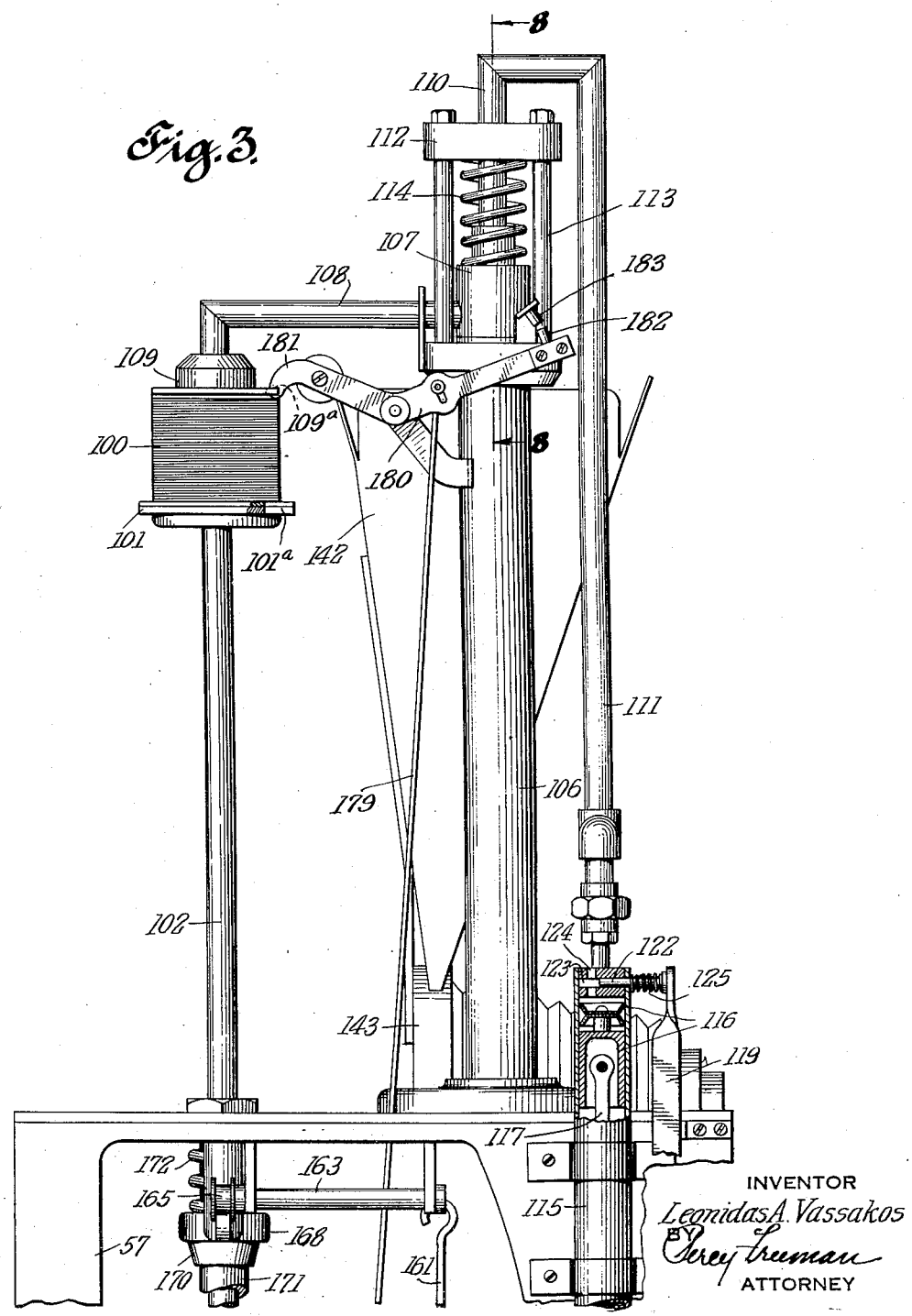

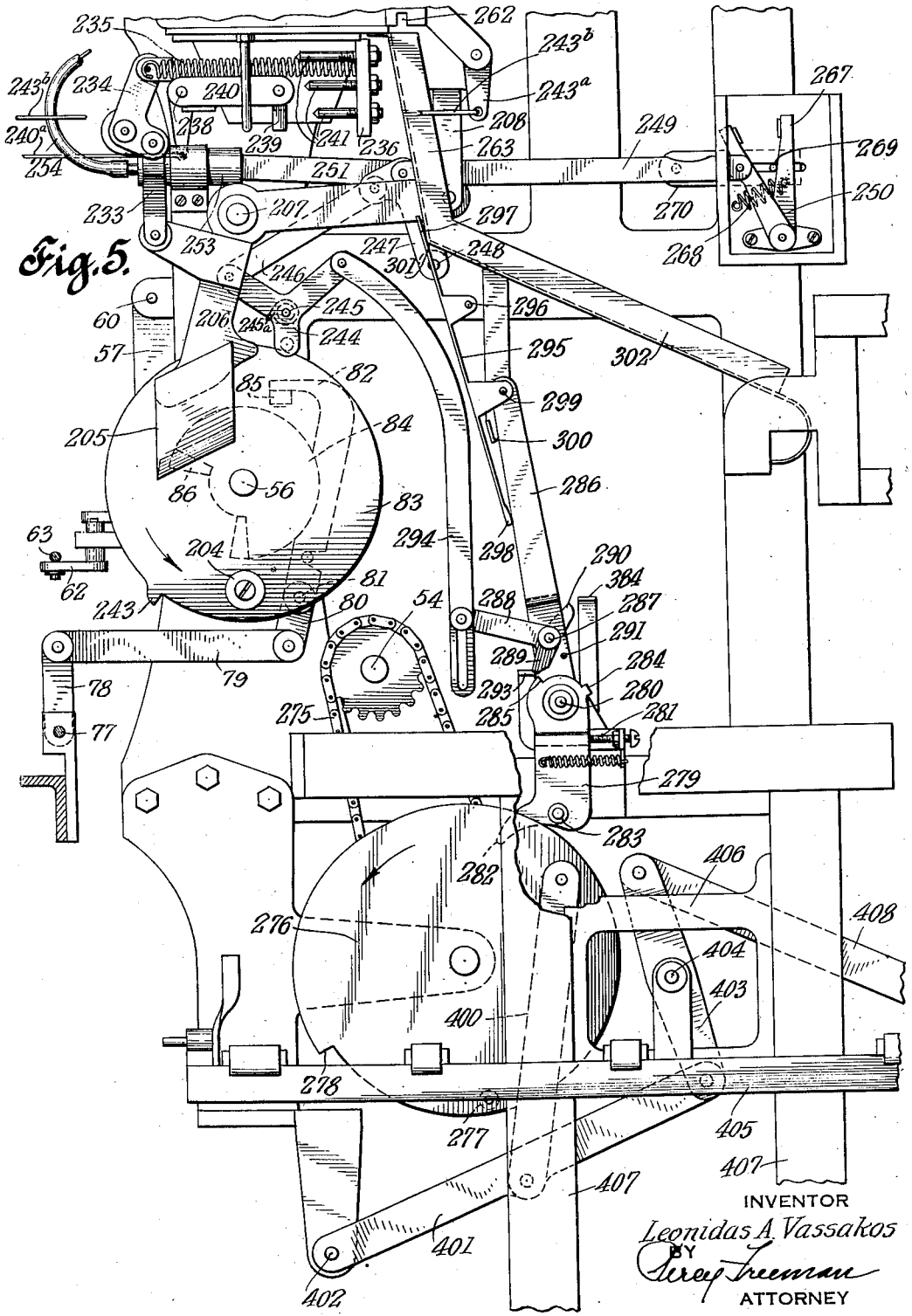

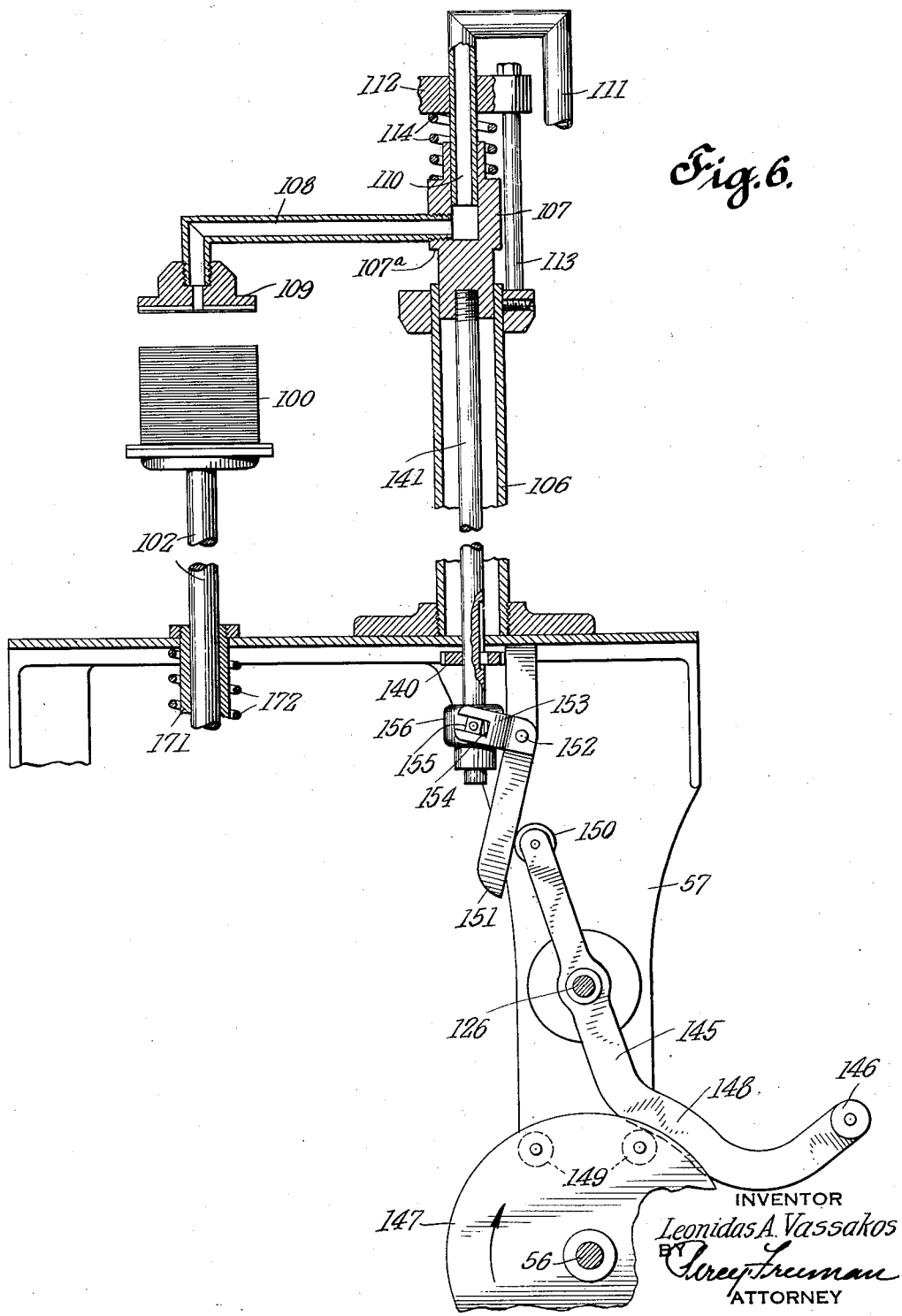

Oct. 1, 1935.  L. A. VASSAKOS  2,016,029
AUTOMATIC PHOTOGRAPH STUDIO
Filed June 8, 1931  47 Sheets-Sheet 7
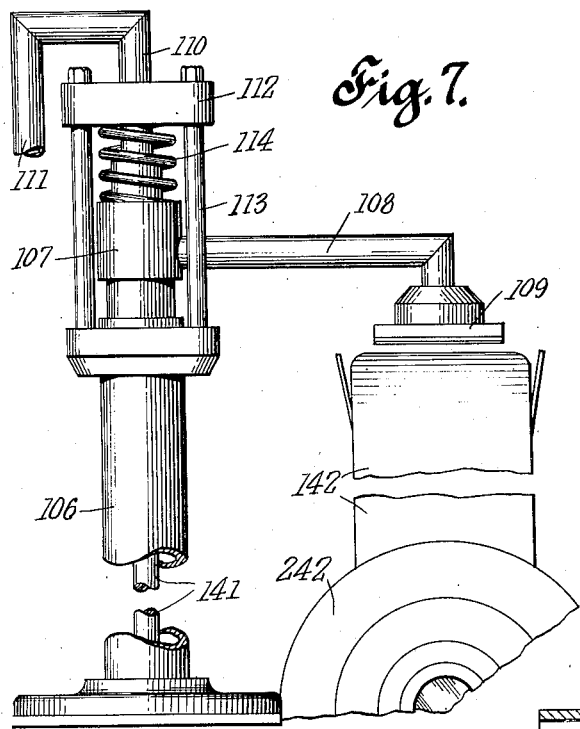
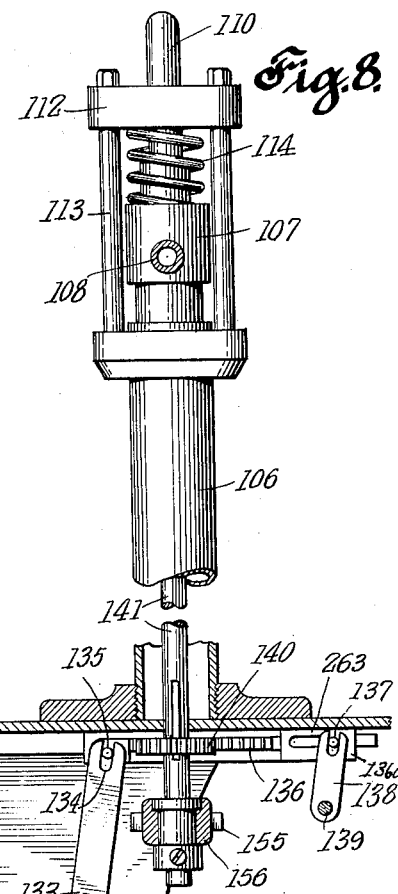
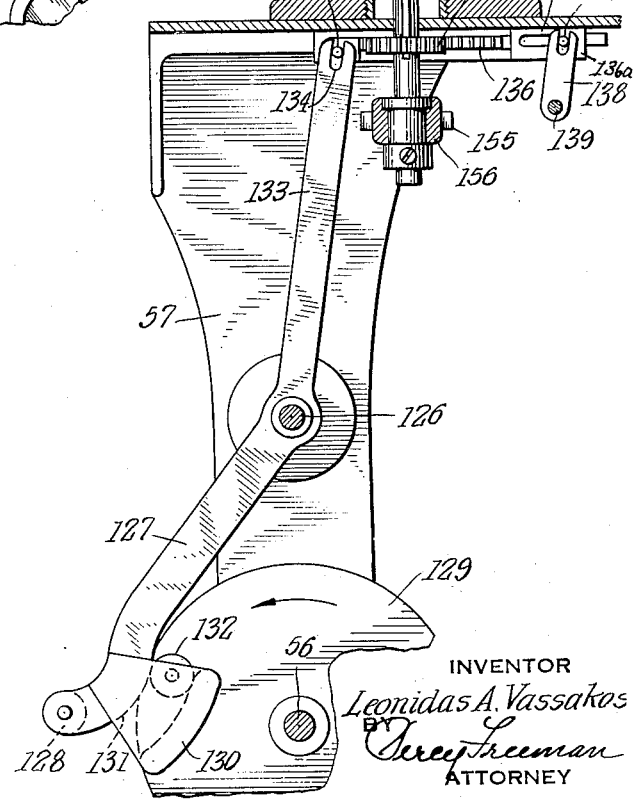
INVENTOR
Leonidas A. Vassakos
BY Percy Freeman
ATTORNEY Oct. 1, 1935.　　　　　L. A. VASSAKOS　　　　　2,016,029
AUTOMATIC PHOTOGRAPH STUDIO
Filed June 8, 1931　　　47 Sheets-Sheet 8
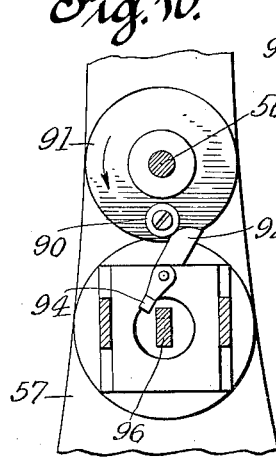
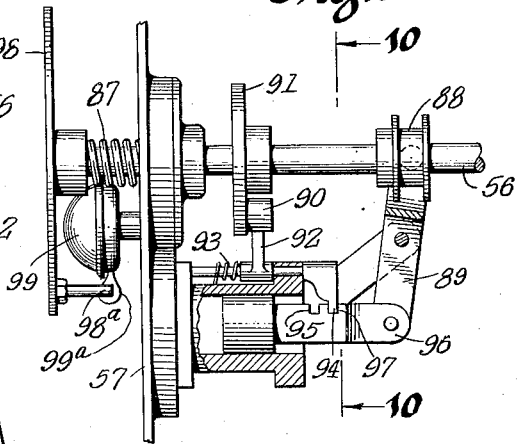
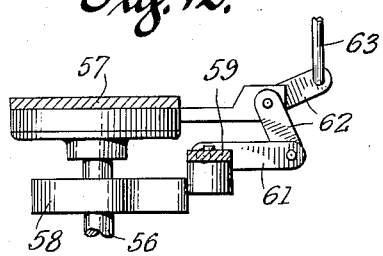
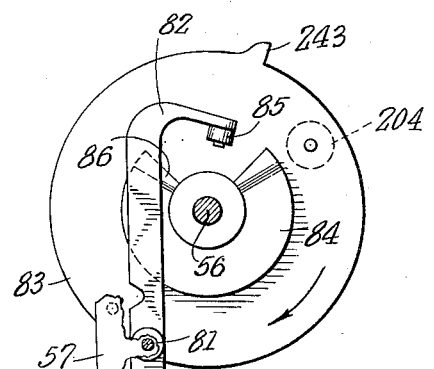
INVENTOR
Leonidas A. Vassakos
ATTORNEY Oct. 1, 1935.  L. A. VASSAKOS  2,016,029
AUTOMATIC PHOTOGRAPH STUDIO
Filed June 8, 1931  47 Sheets-Sheet 9

INVENTOR
Leonidas A. Vassakos
BY
Percy Freeman
ATTORNEY

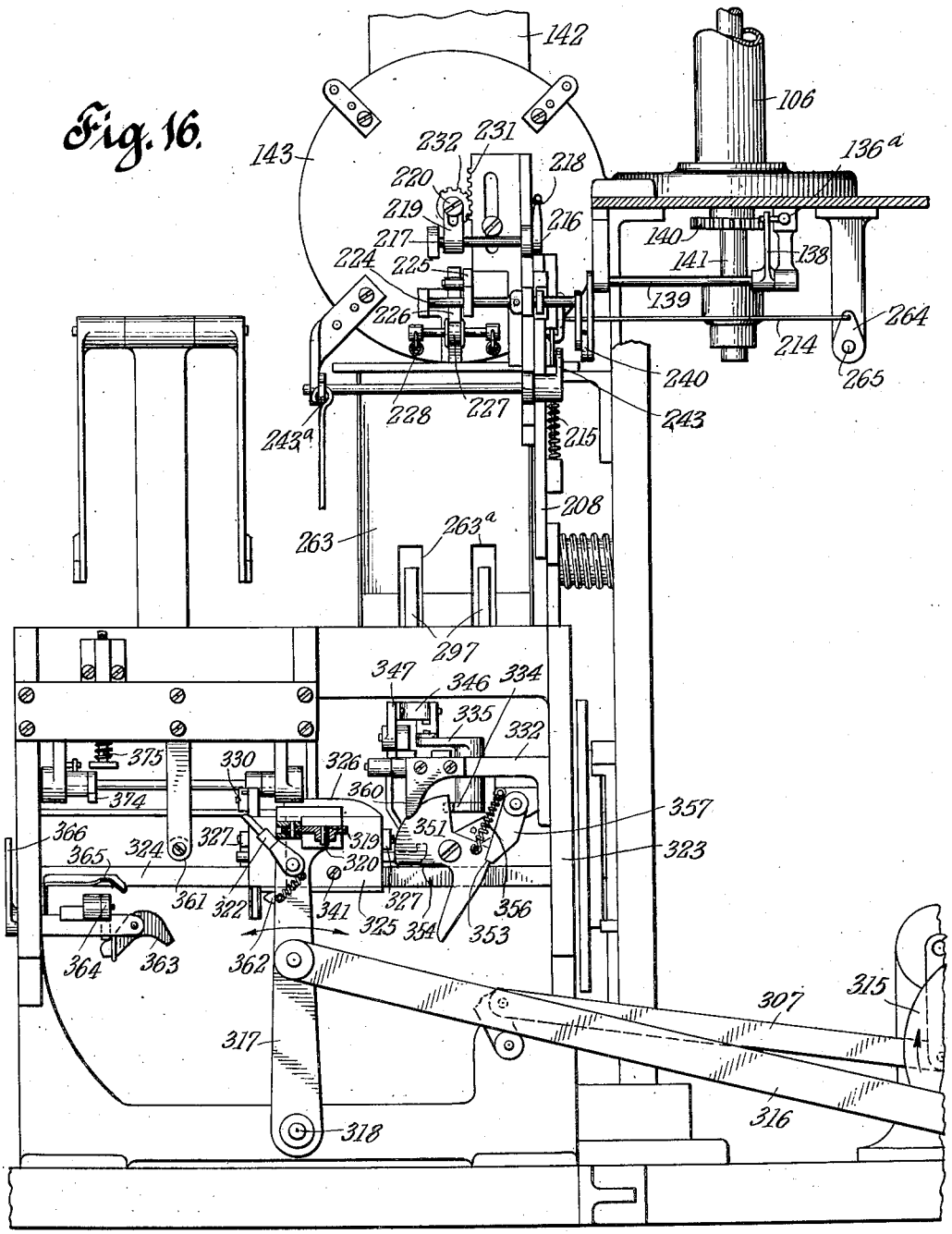

Oct. 1, 1935.  L. A. VASSAKOS  2,016,029
AUTOMATIC PHOTOGRAPH STUDIO
Filed June 8, 1931  47 Sheets-Sheet 11
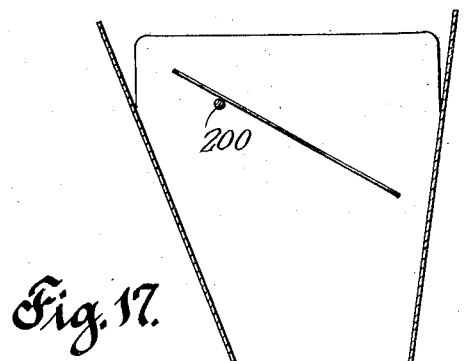
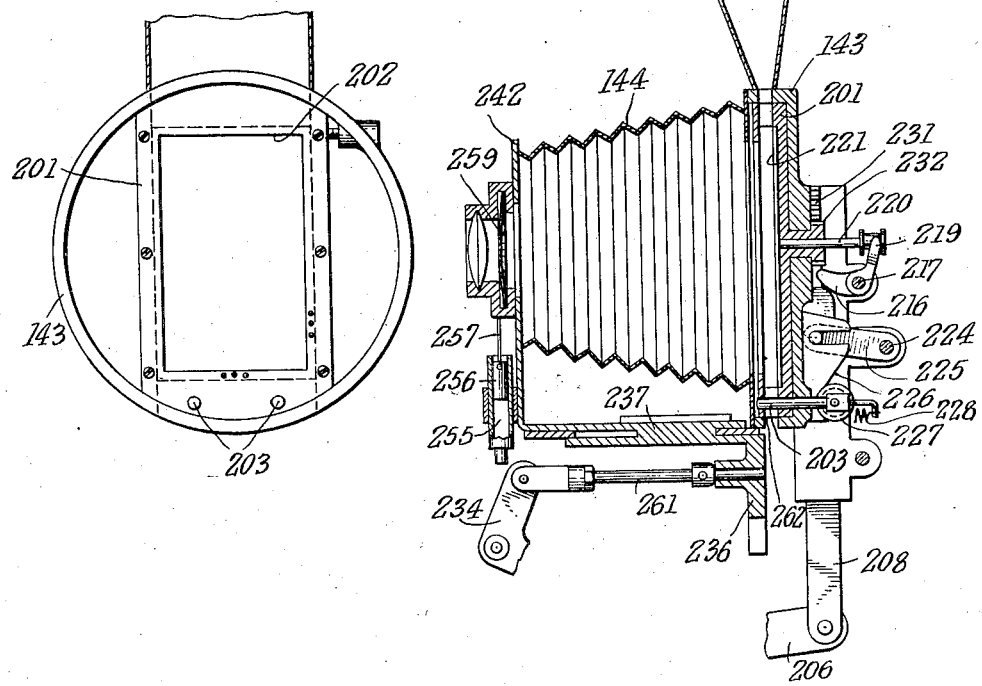
INVENTOR
Leonidas A. Vassakos
BY
ATTORNEY

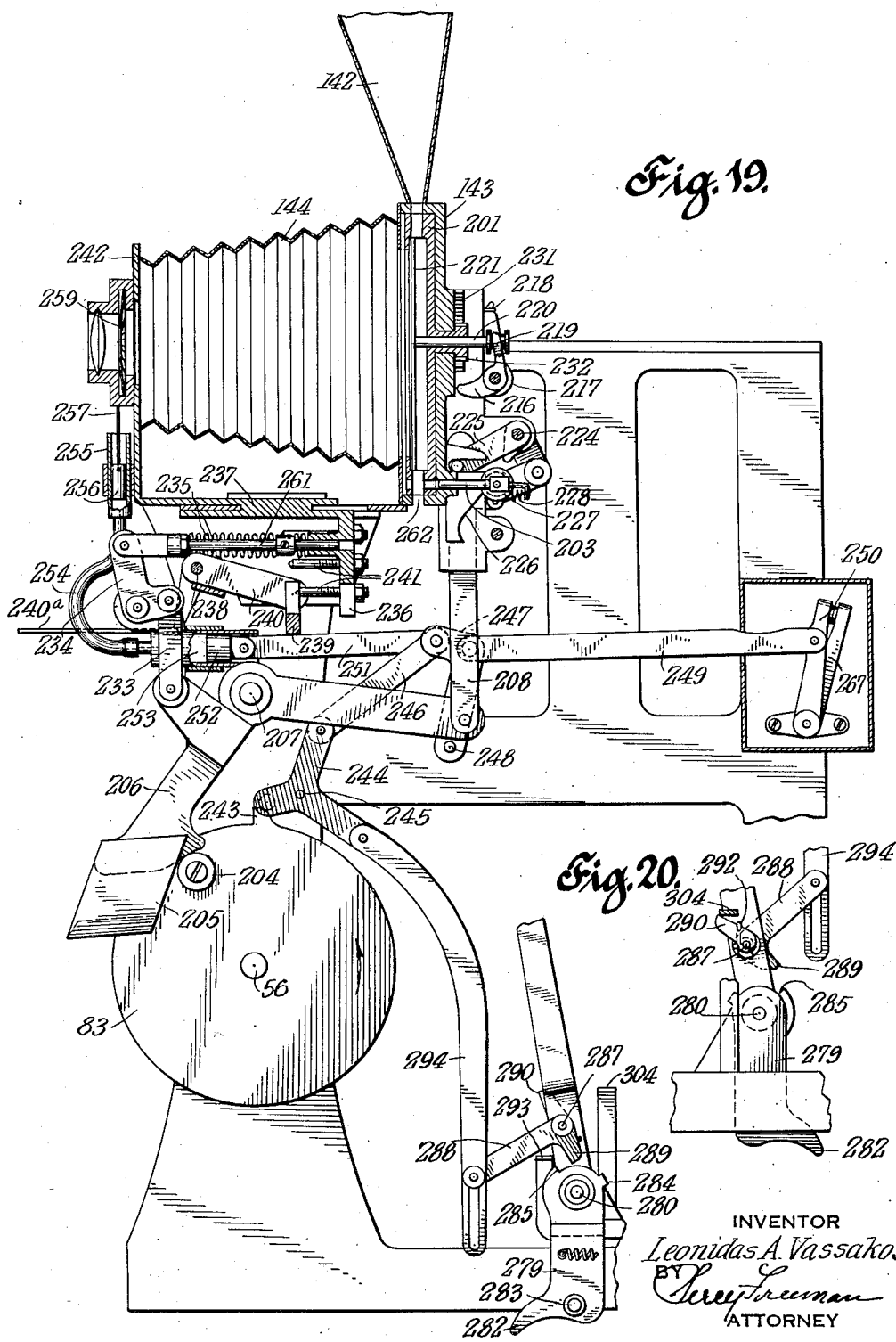

Oct. 1, 1935.  L. A. VASSAKOS  2,016,029
AUTOMATIC PHOTOGRAPH STUDIO
Filed June 8, 1931   47 Sheets-Sheet 13
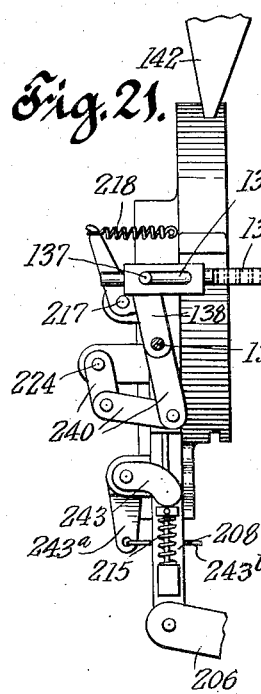
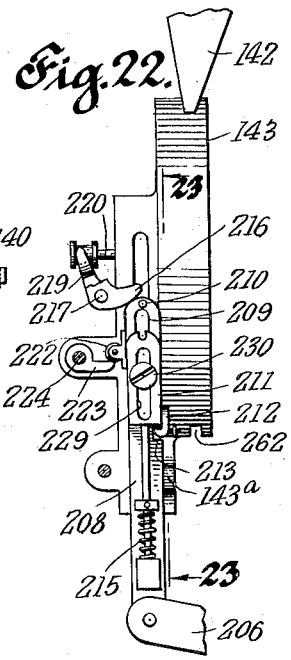
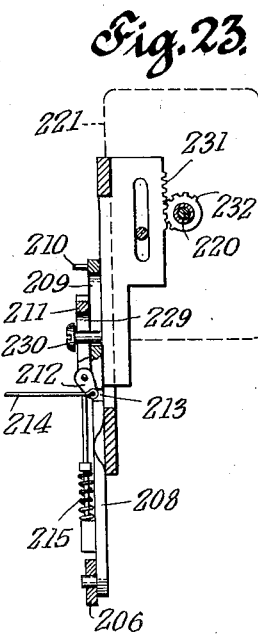
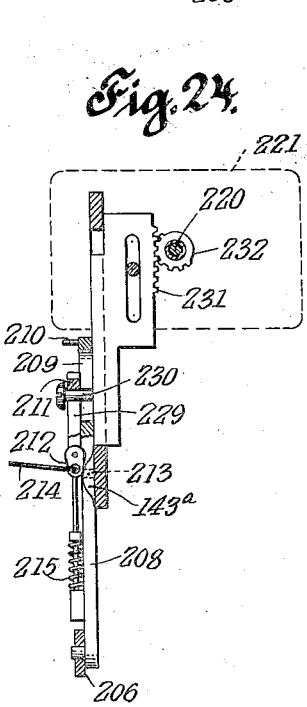
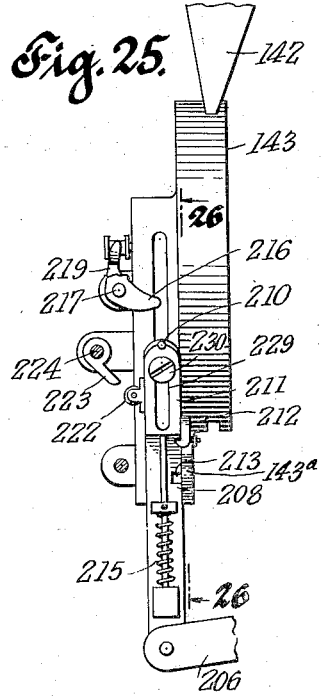
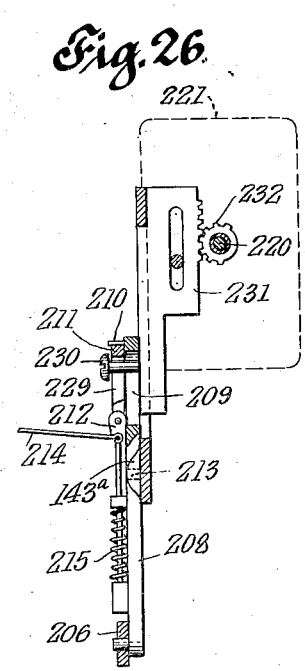
INVENTOR
Leonidas A. Vassakos
BY
ATTORNEY Oct. 1, 1935.  L. A. VASSAKOS  2,016,029
AUTOMATIC PHOTOGRAPH STUDIO
Filed June 8, 1931  47 Sheets-Sheet 14

INVENTOR
Leonidas A. Vassakos
BY
ATTORNEY

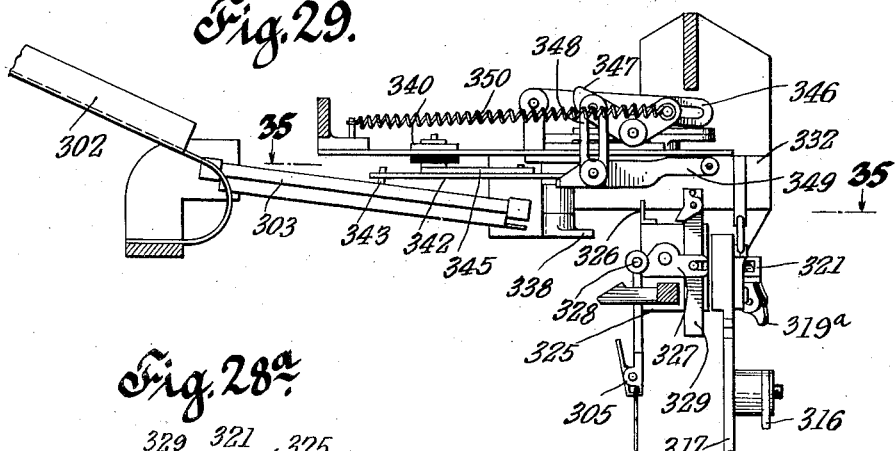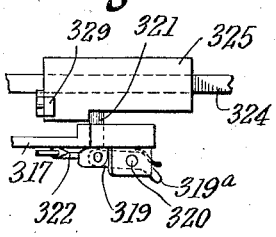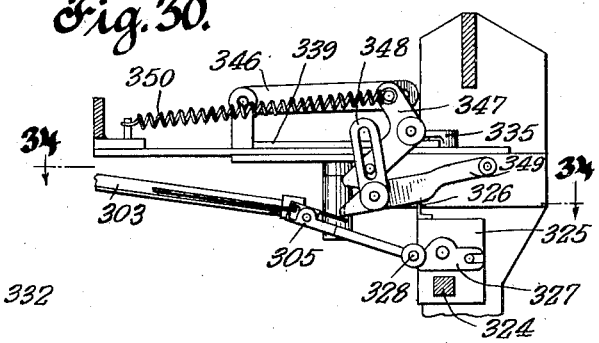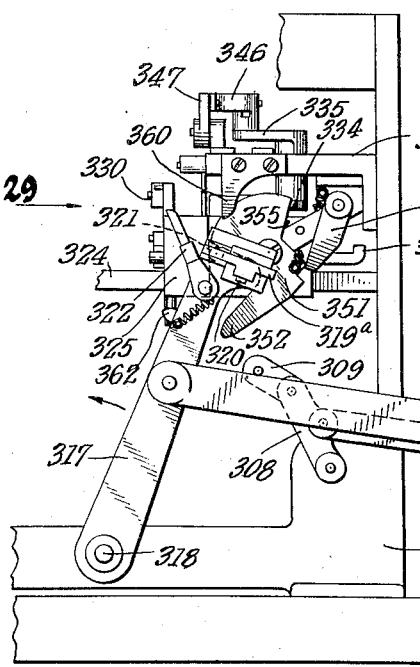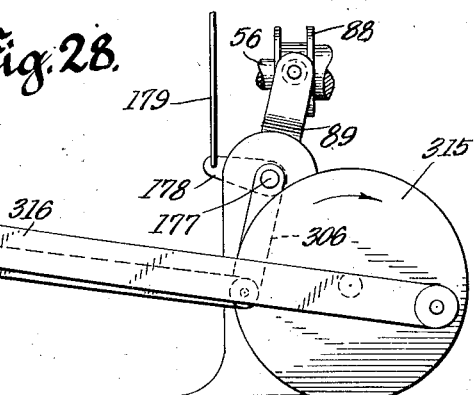

Oct. 1, 1935.  L. A. VASSAKOS  2,016,029
AUTOMATIC PHOTOGRAPH STUDIO
Filed June 8, 1931   47 Sheets-Sheet 16
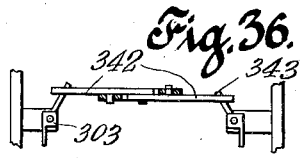
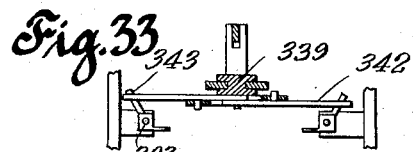
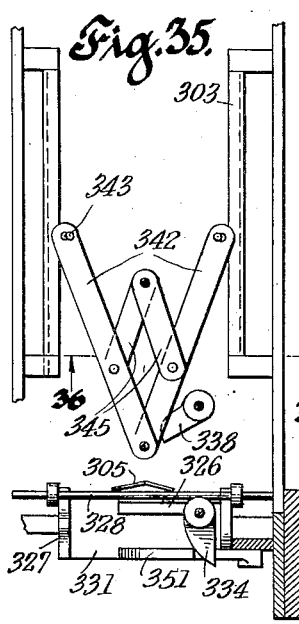
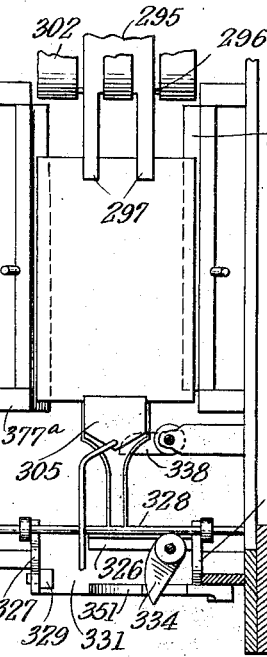
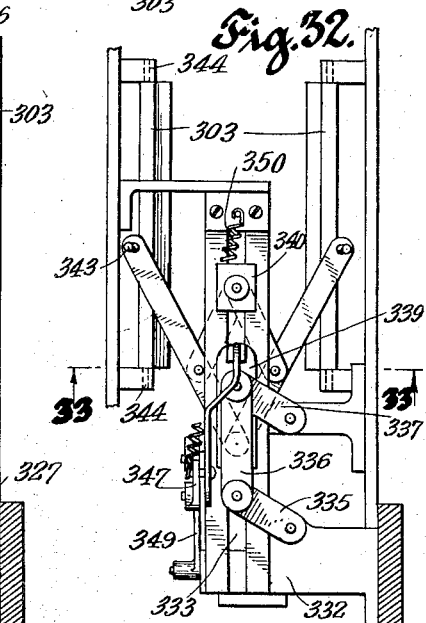
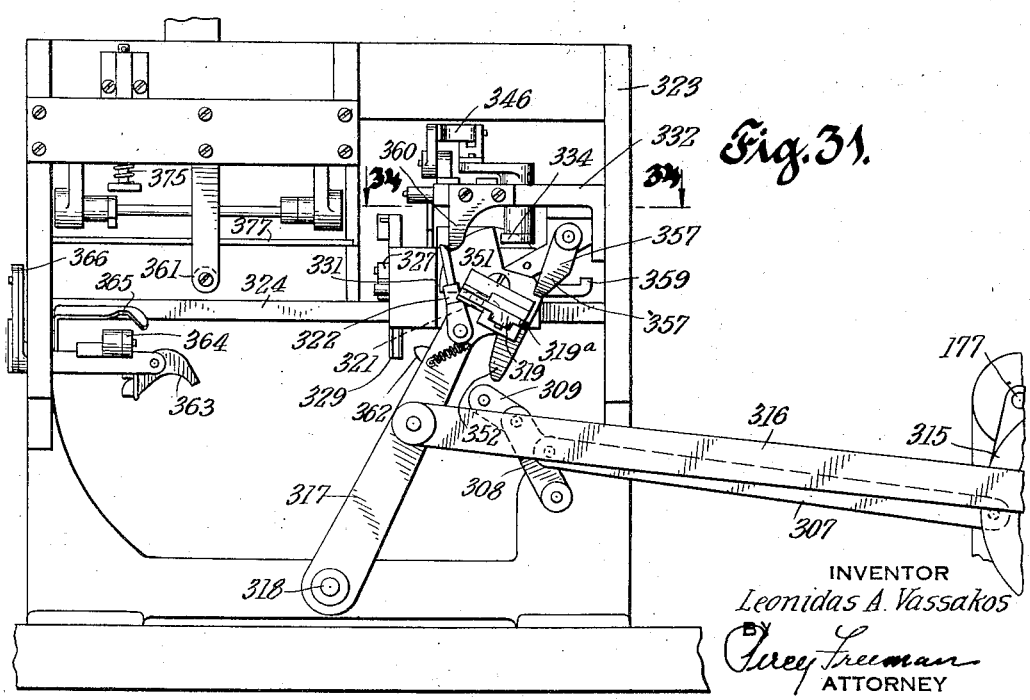
INVENTOR
Leonidas A. Vassakos
BY
ATTORNEY Oct. 1, 1935.  L. A. VASSAKOS  2,016,029
AUTOMATIC PHOTOGRAPH STUDIO
Filed June 8, 1931   47 Sheets-Sheet 17
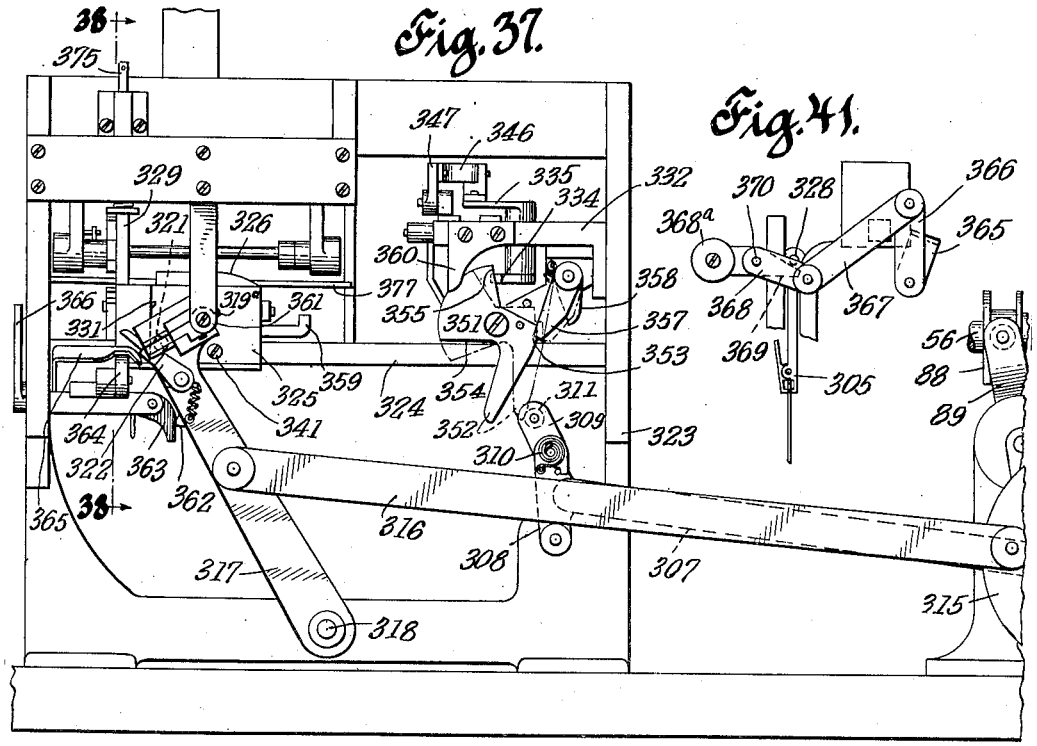
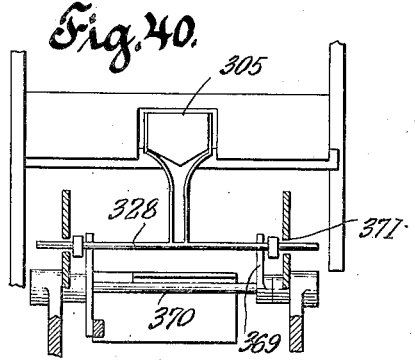
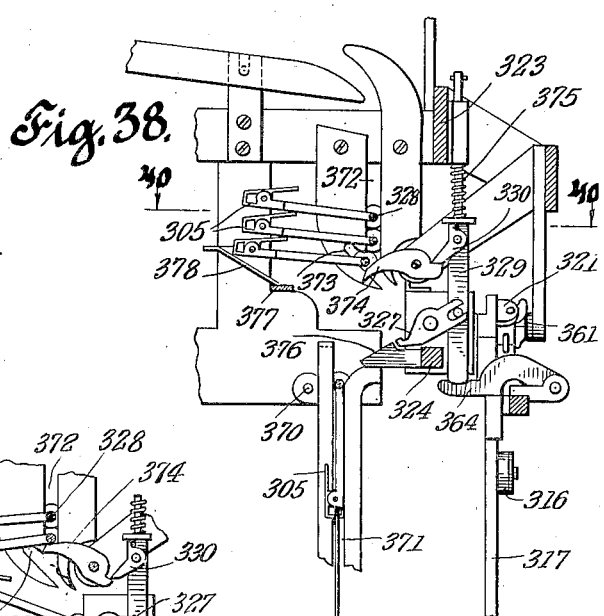
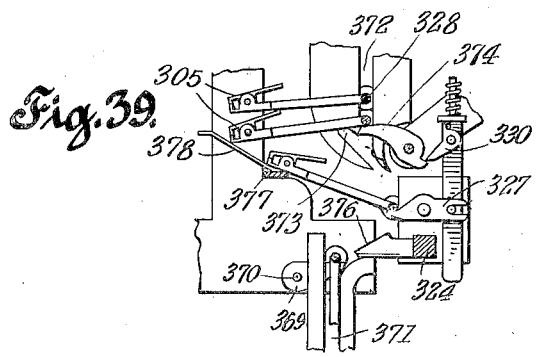
INVENTOR
Leonidas A. Vassakos
ATTORNEY

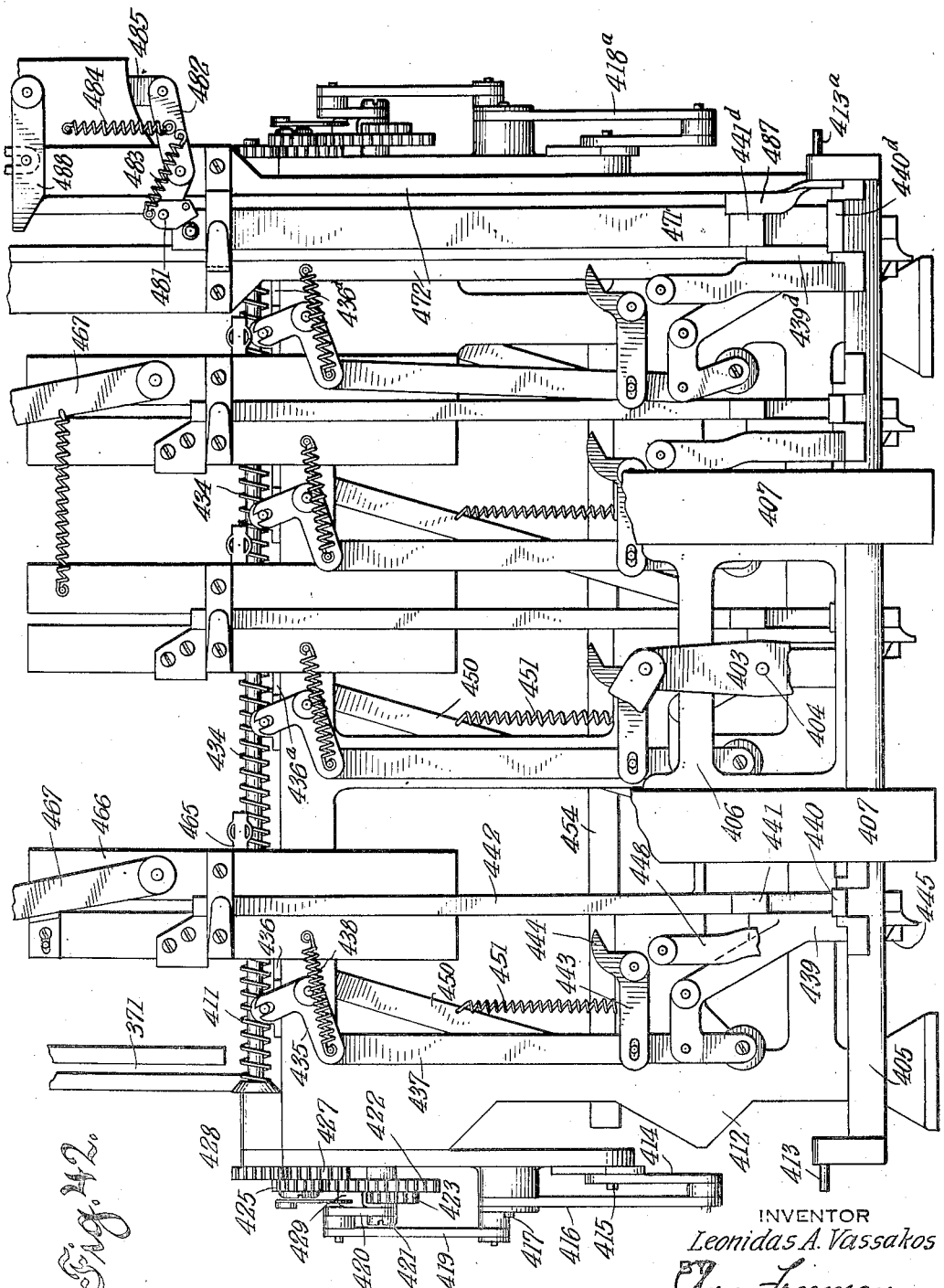

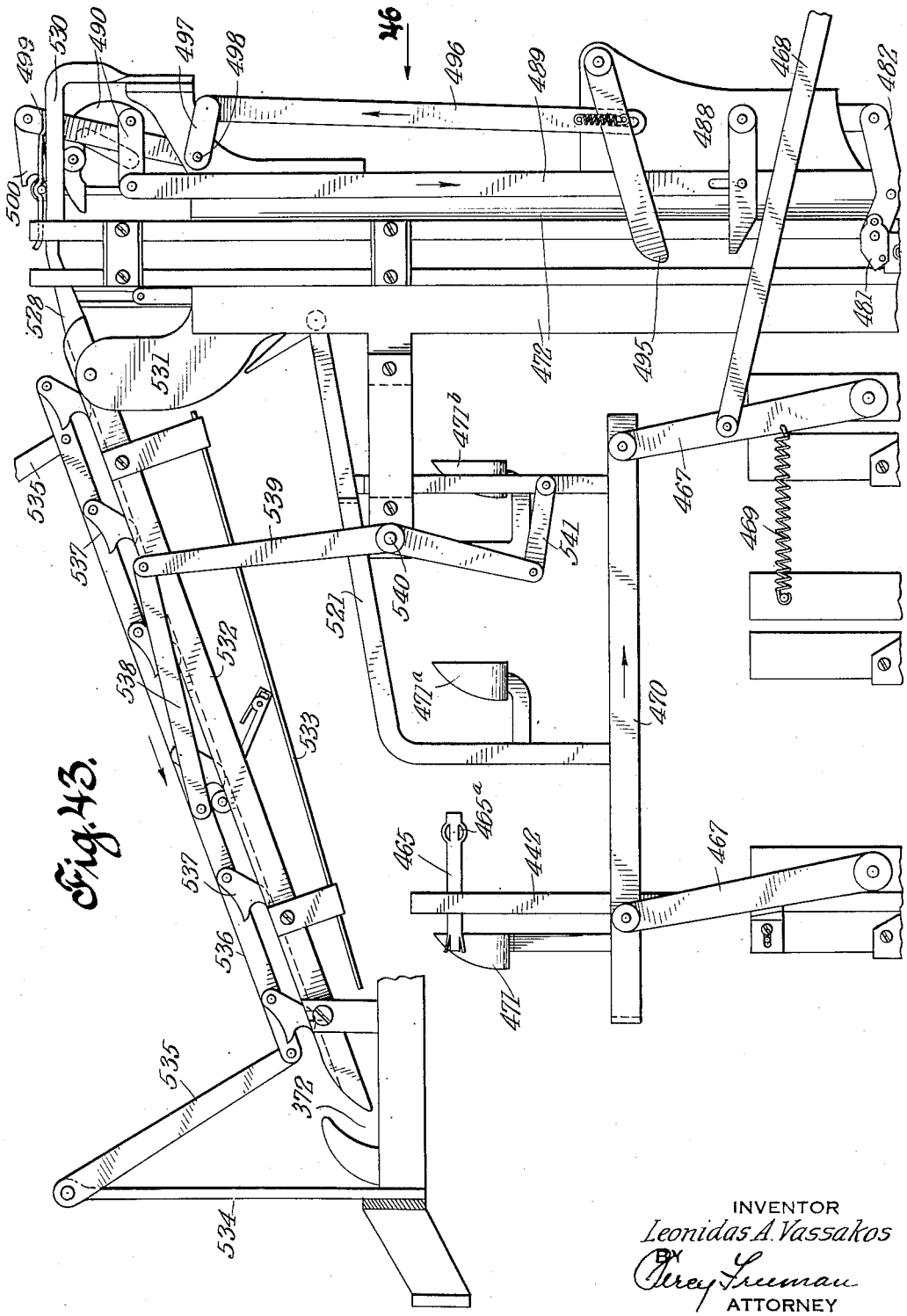

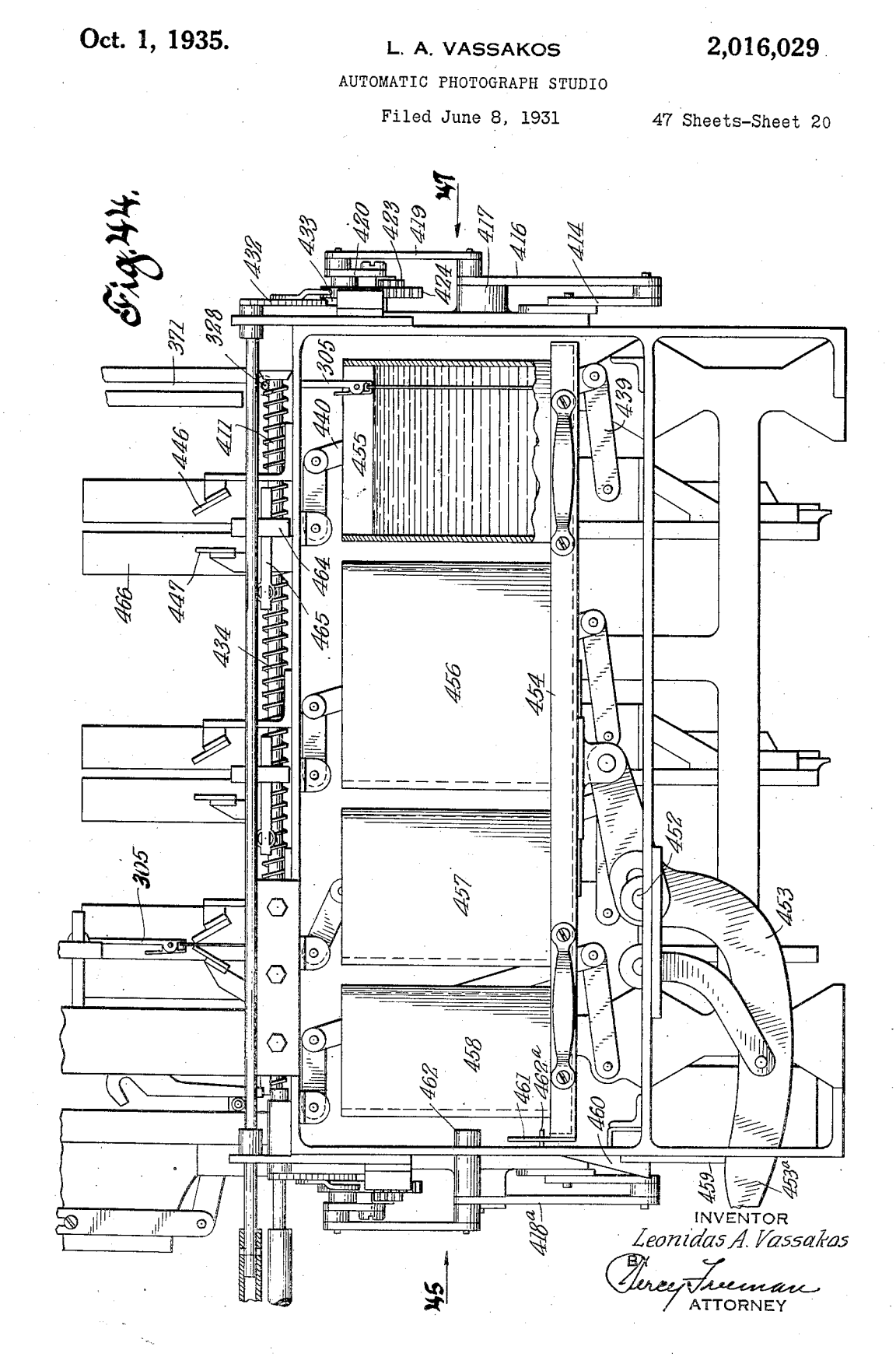

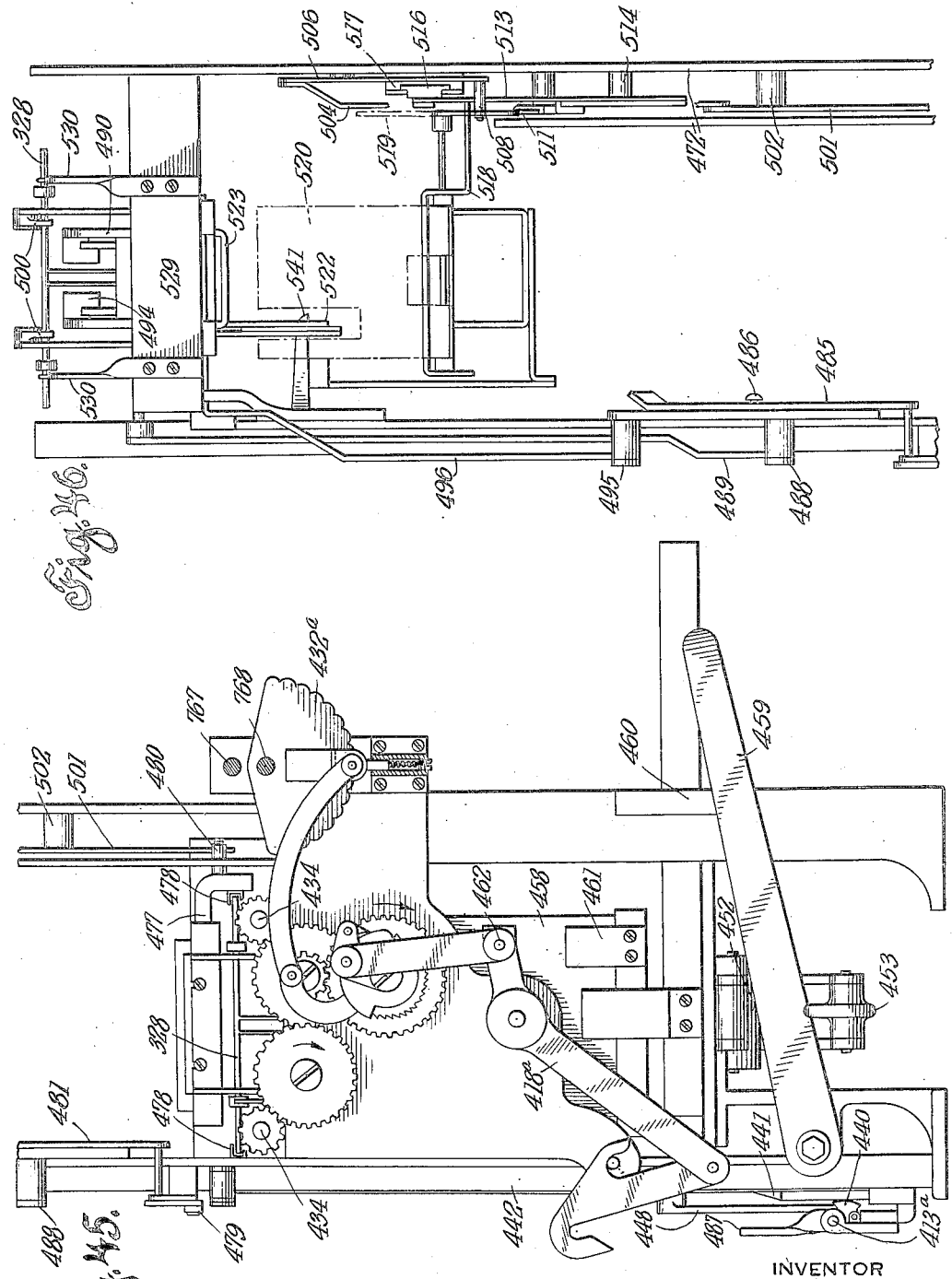

INVENTOR
Leonidas A. Vassakos
BY
ATTORNEY

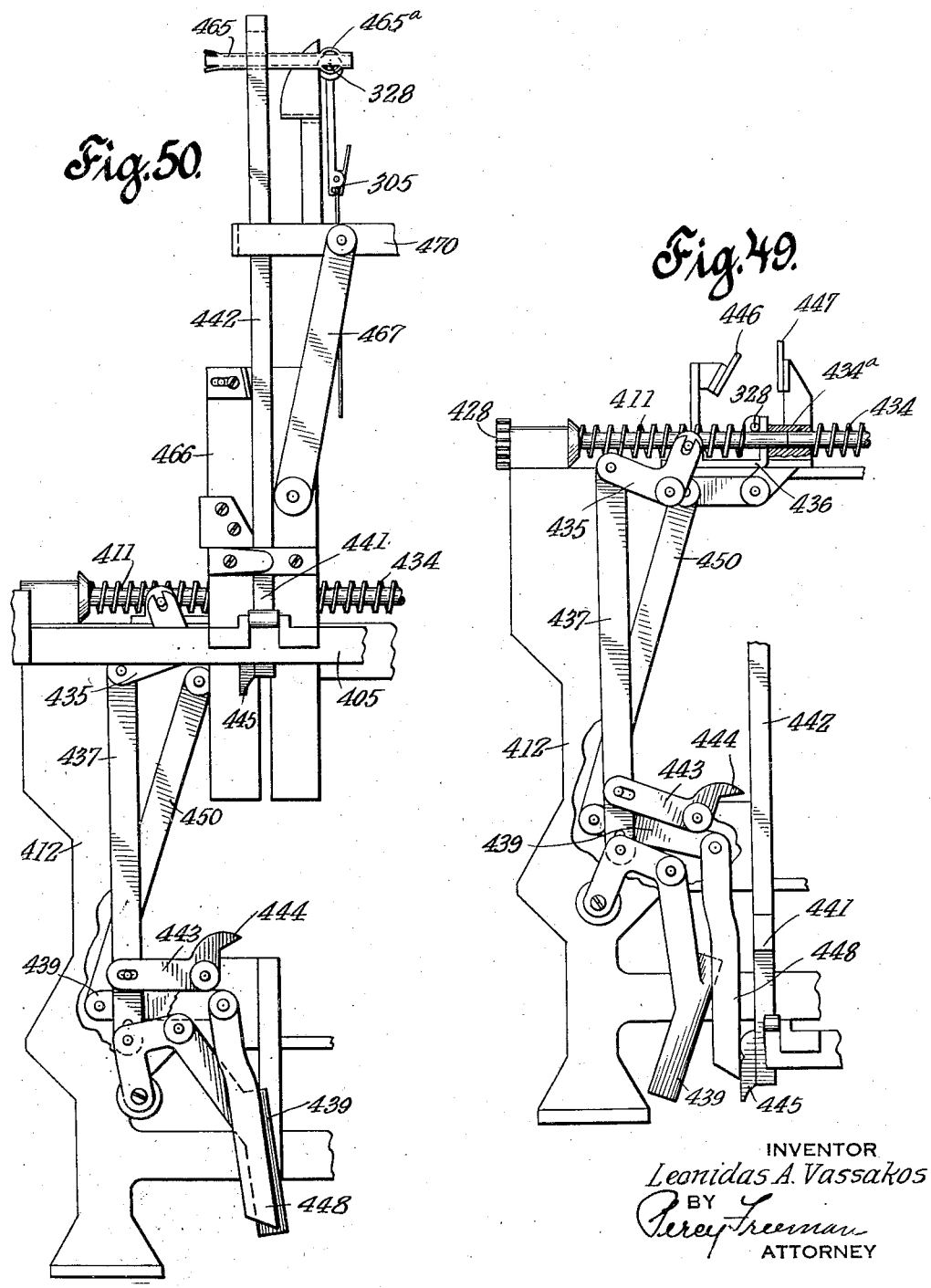

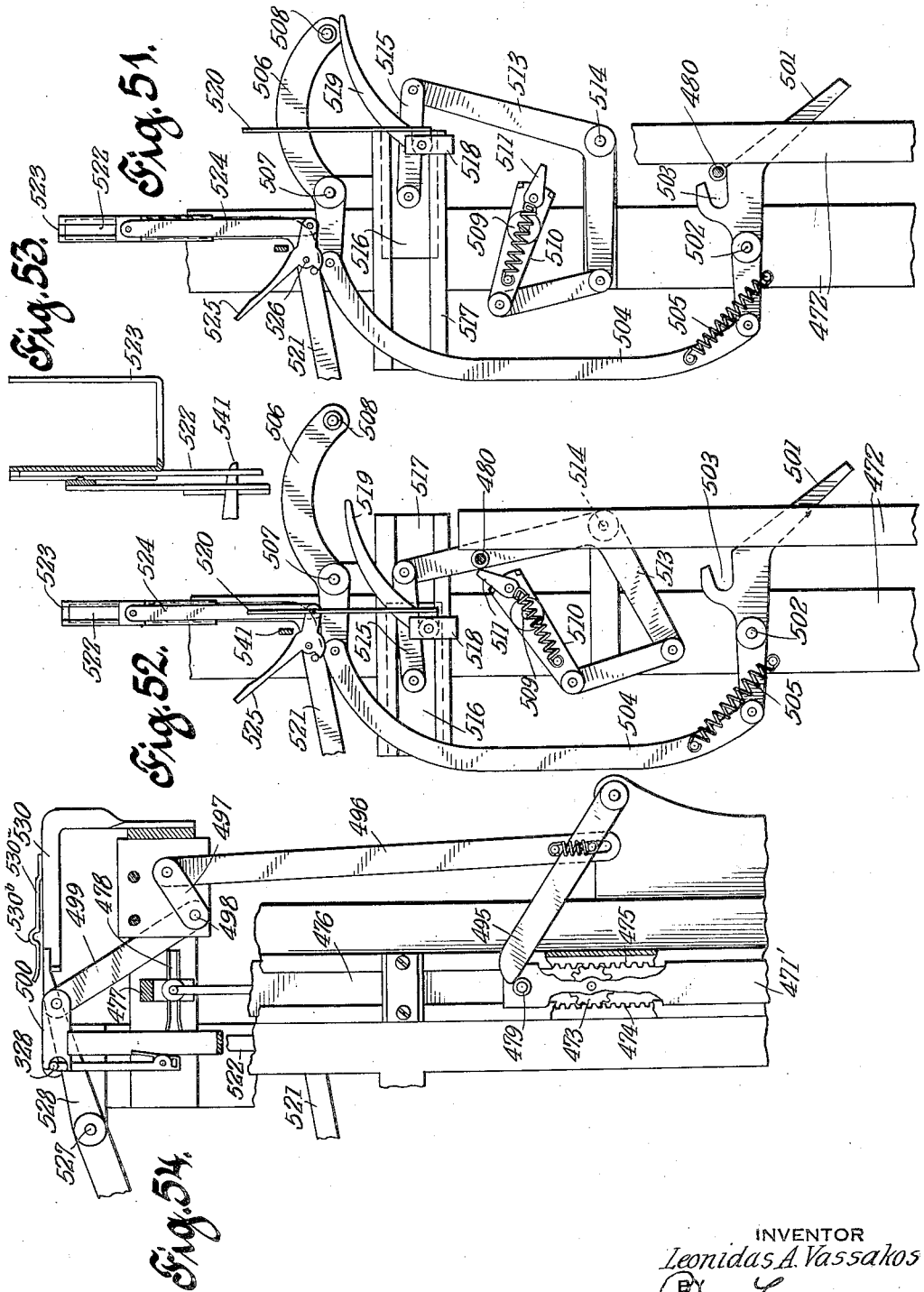

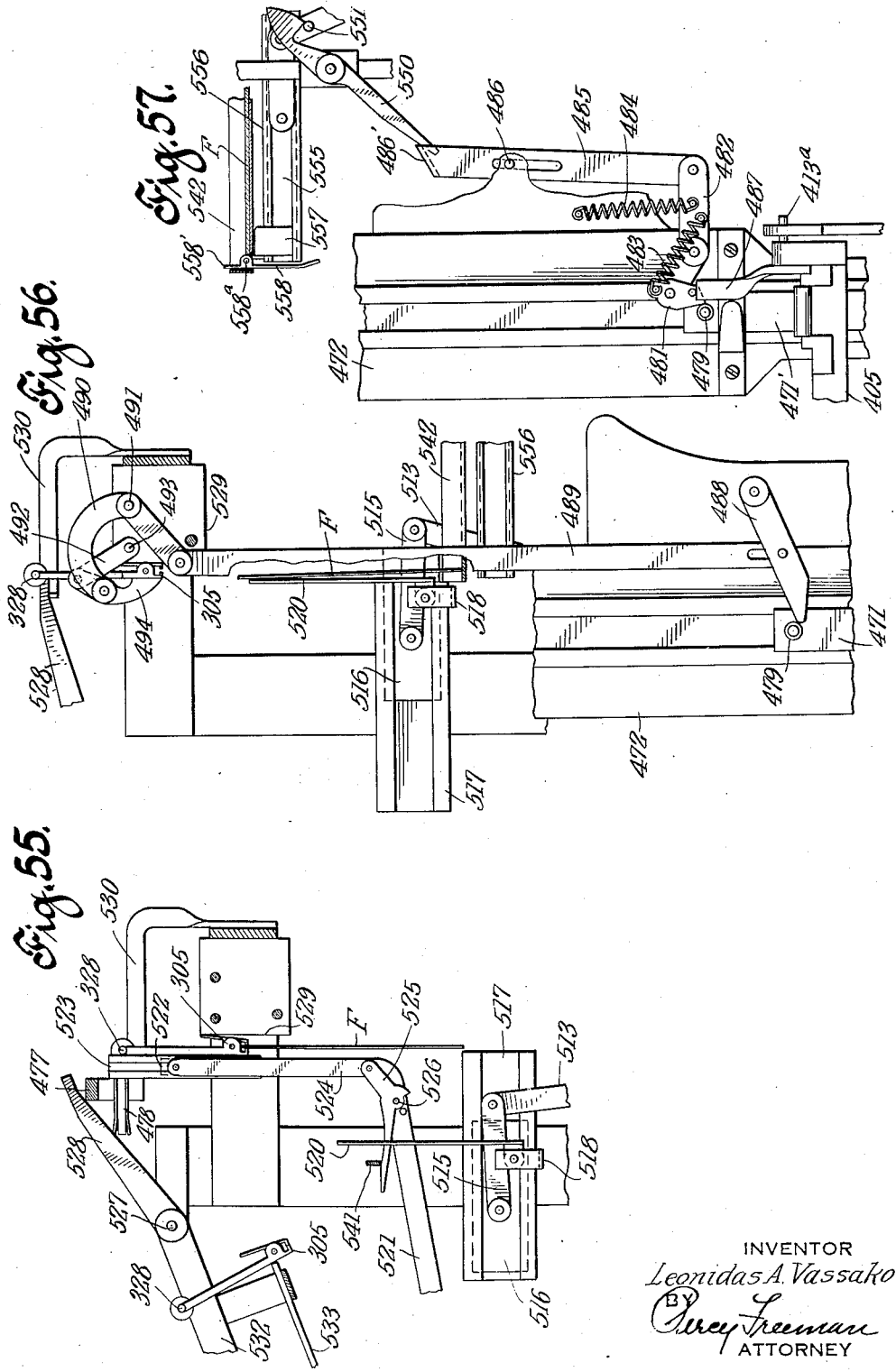

Oct. 1, 1935.  L. A. VASSAKOS  2,016,029
AUTOMATIC PHOTOGRAPH STUDIO
Filed June 8, 1931   47 Sheets-Sheet 26

INVENTOR
Leonidas A. Vassakos
BY
Percy Freeman
ATTORNEY

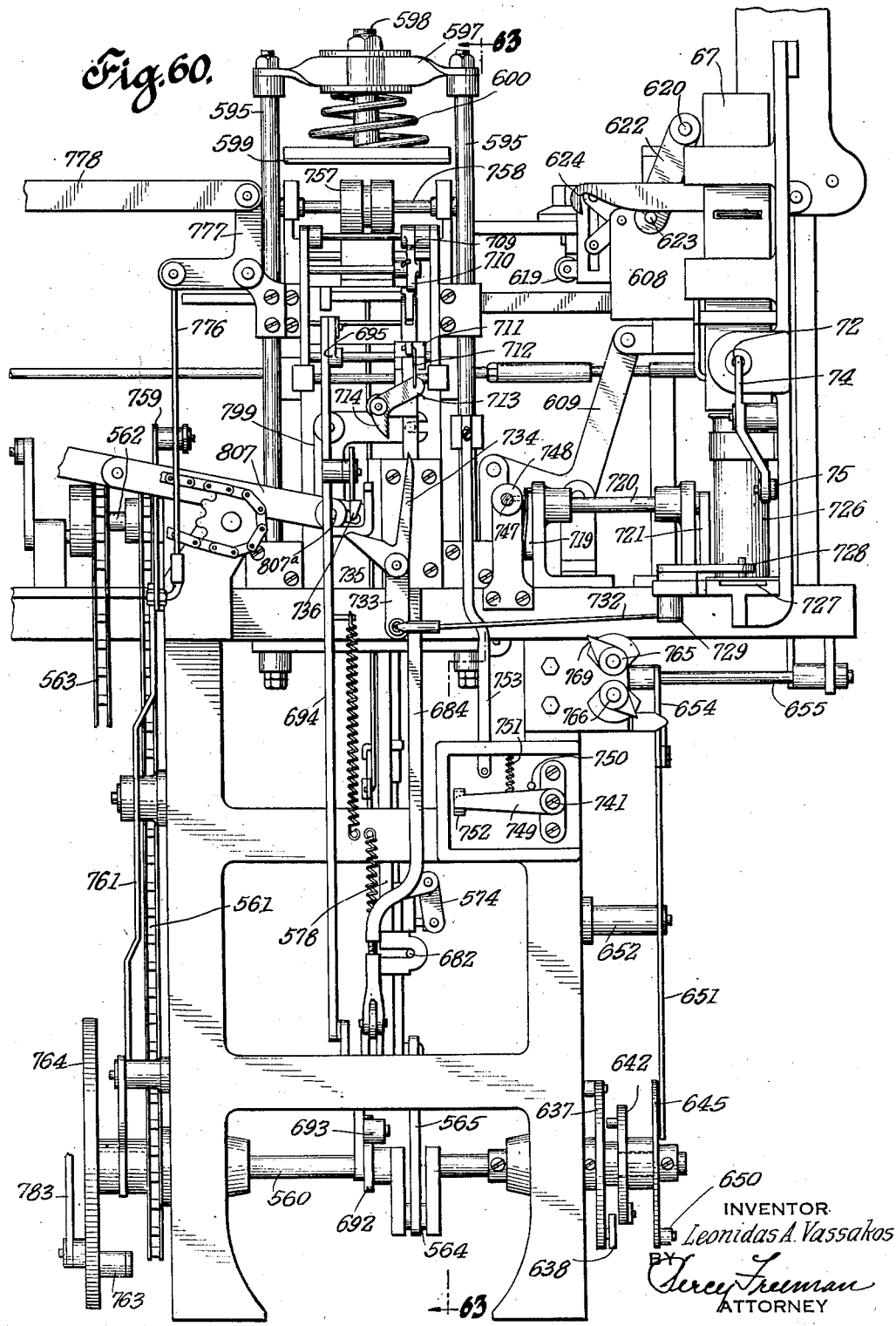

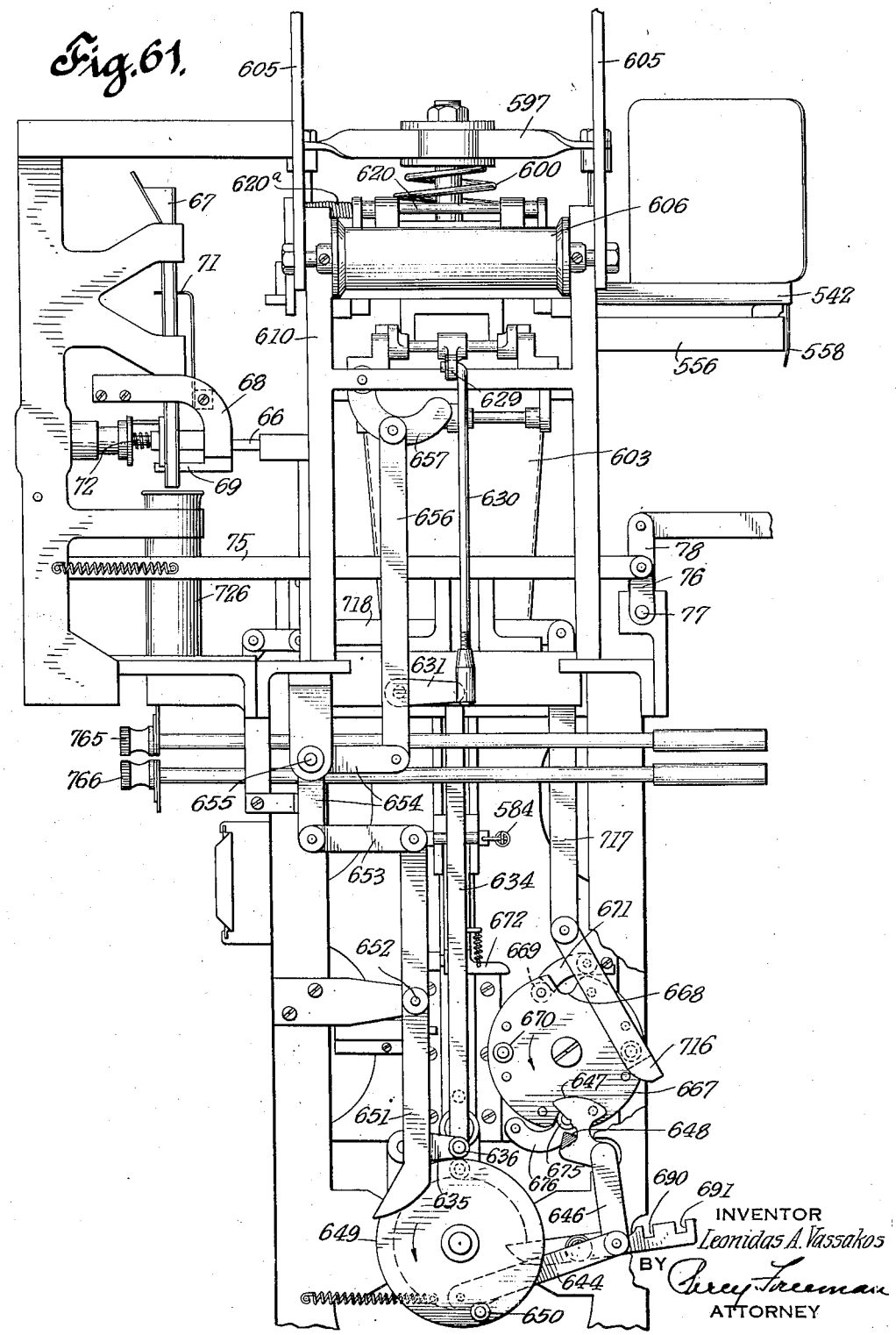

Oct. 1, 1935.  L. A. VASSAKOS  2,016,029
AUTOMATIC PHOTOGRAPH STUDIO
Filed June 8, 1931    47 Sheets-Sheet 30
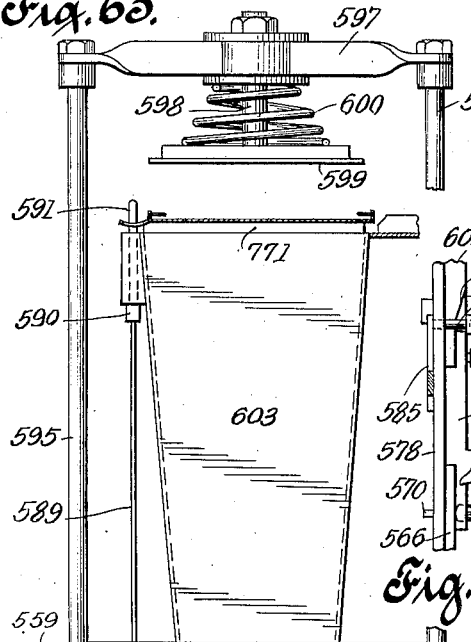
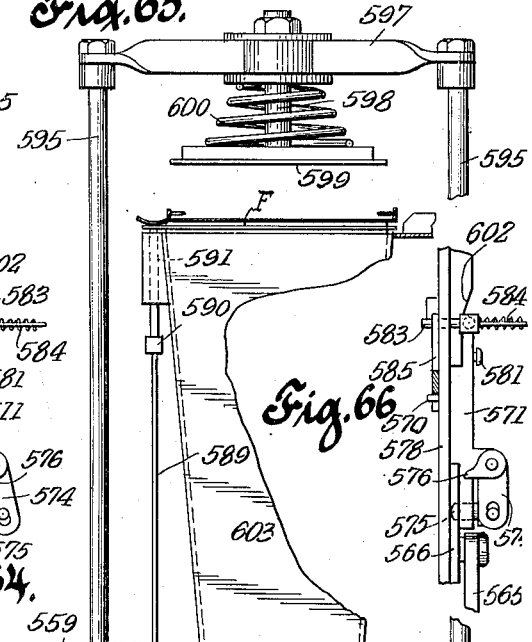
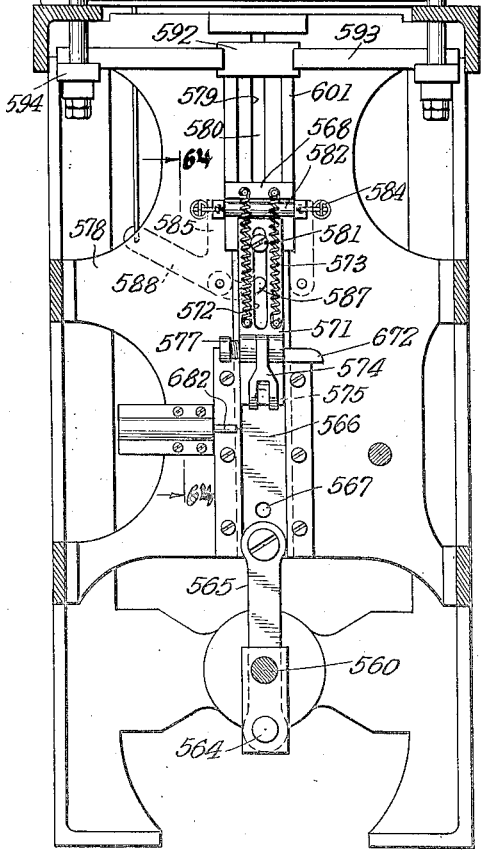
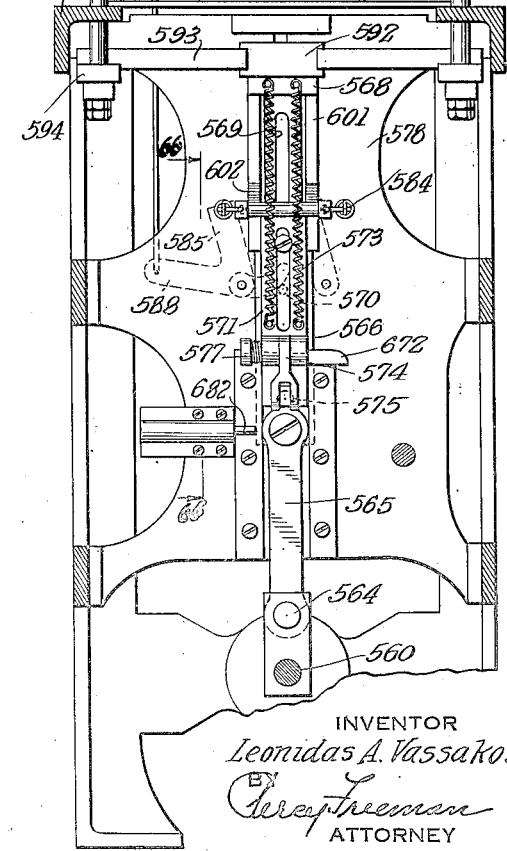
INVENTOR
Leonidas A. Vassakos
ATTORNEY Oct. 1, 1935.  L. A. VASSAKOS  2,016,029
AUTOMATIC PHOTOGRAPH STUDIO
Filed June 8, 1931   47 Sheets-Sheet 31
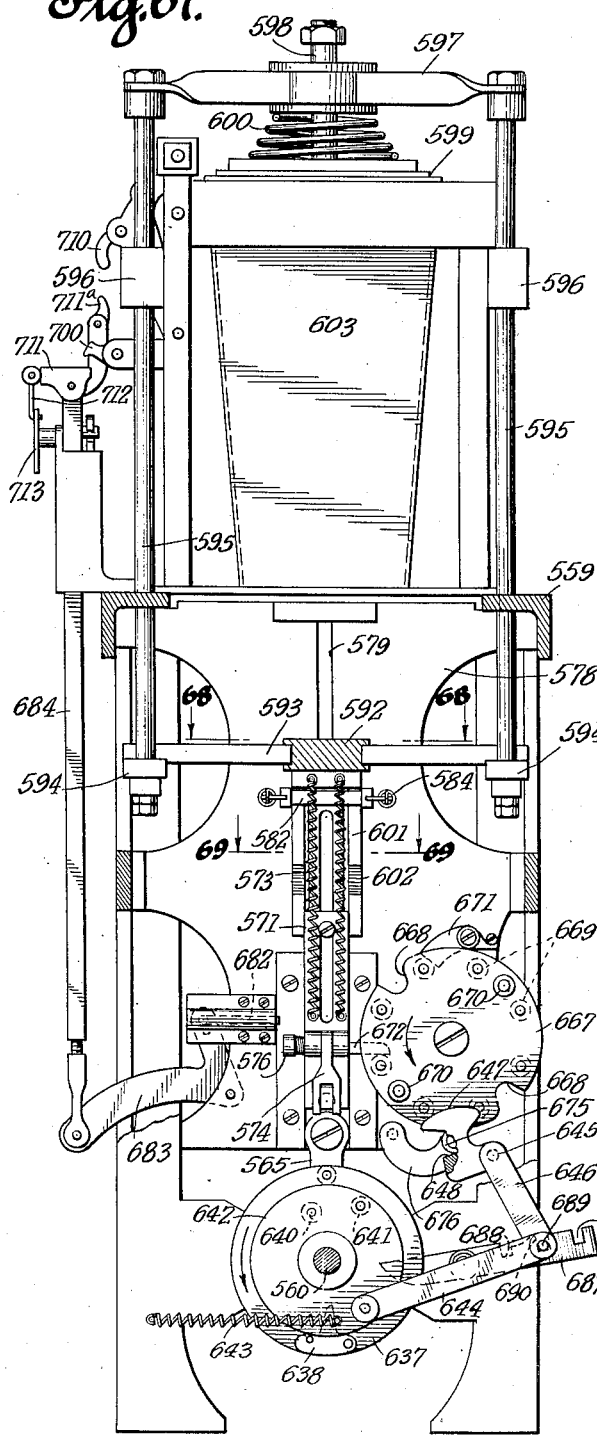
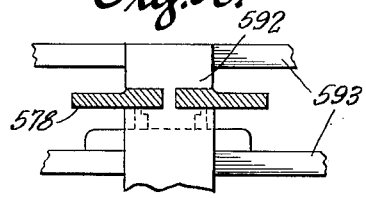
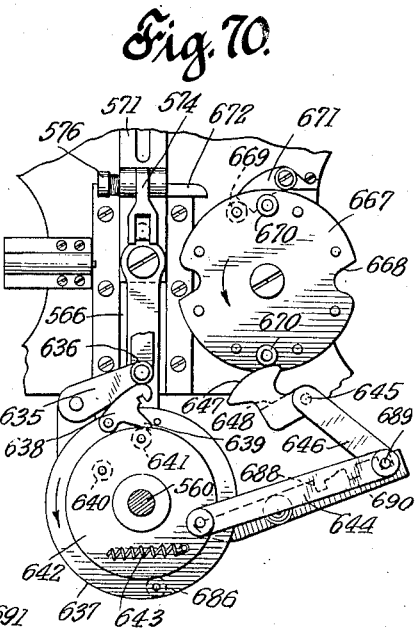
INVENTOR
Leonidas A. Vassakos
BY
ATTORNEY

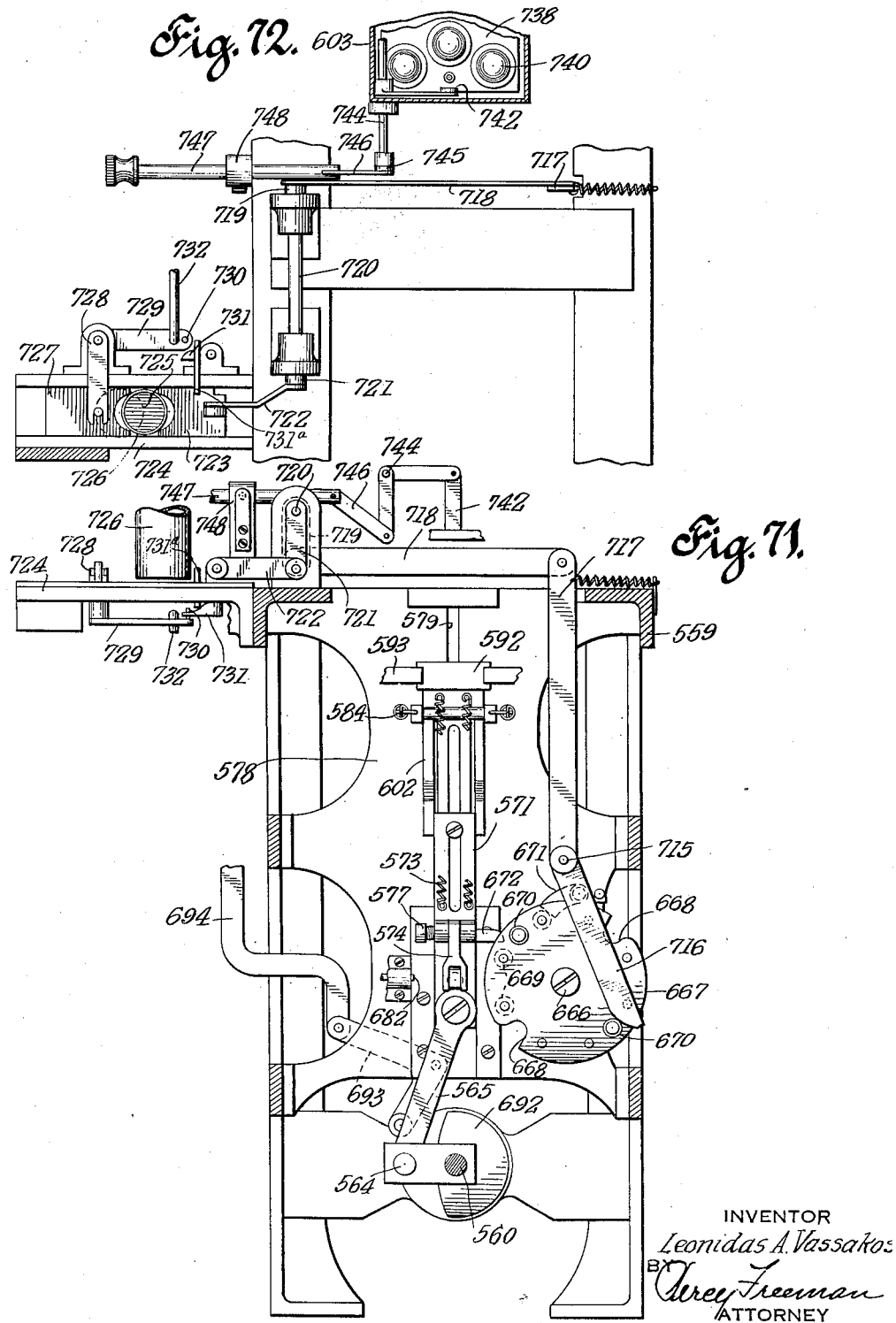

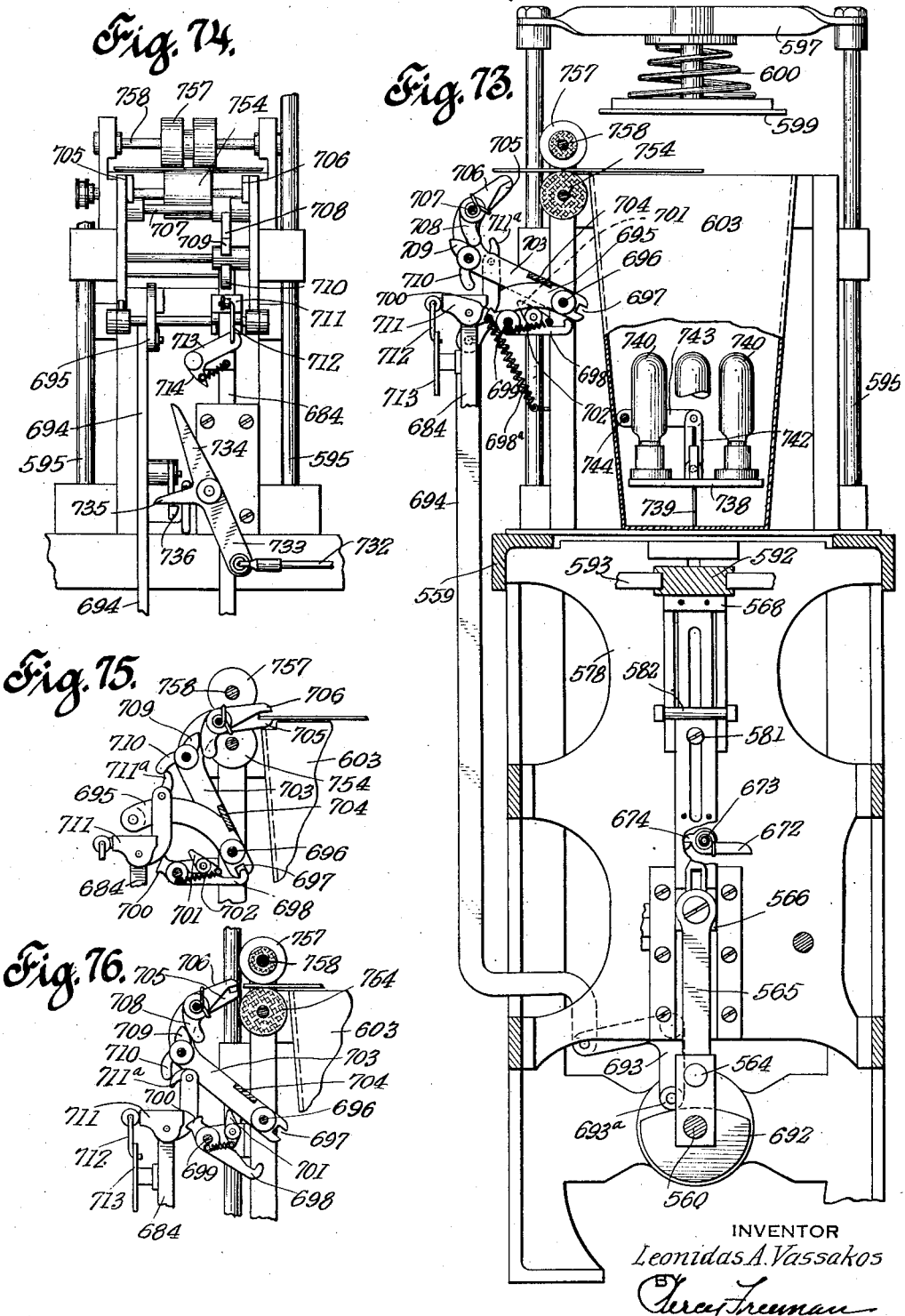

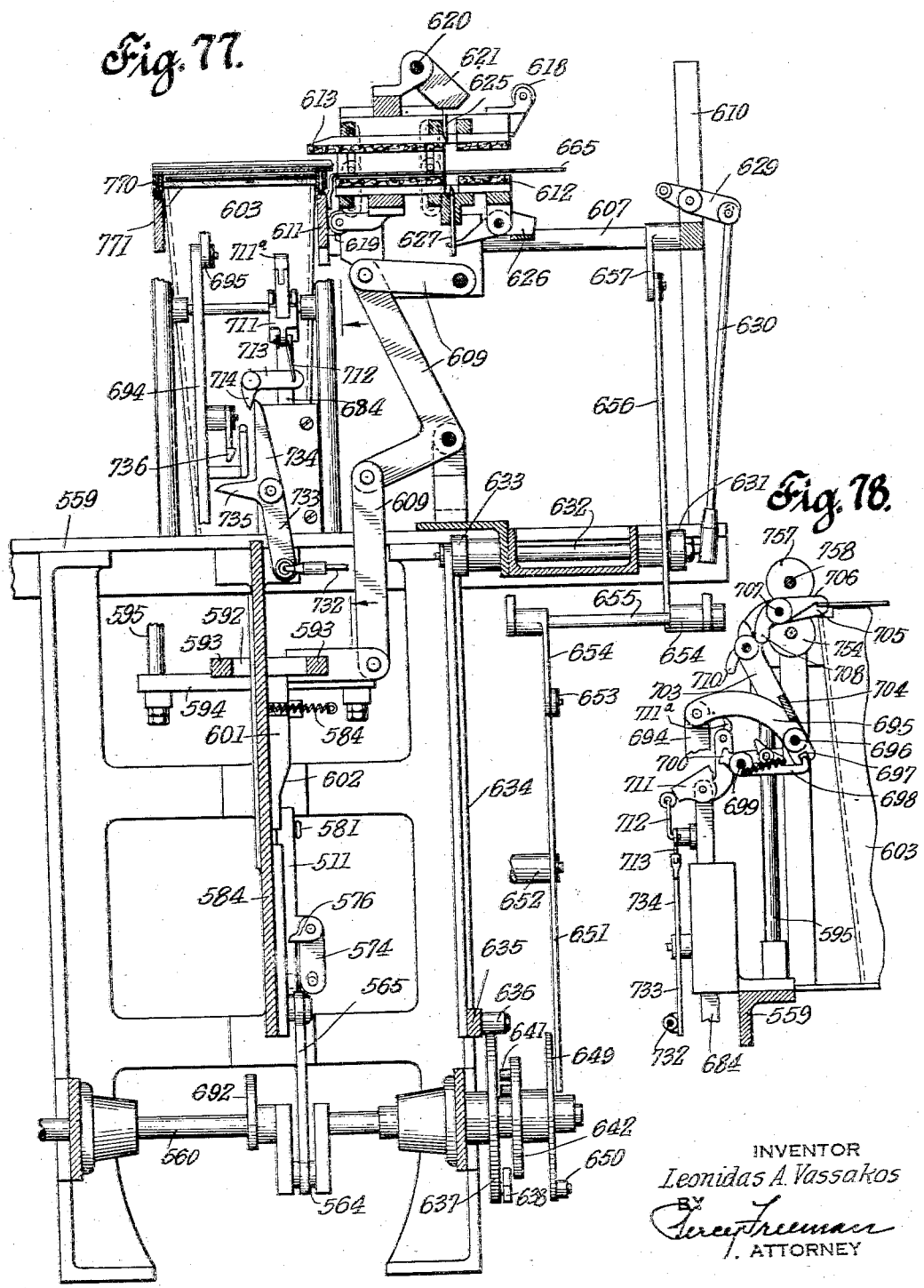

Oct. 1, 1935. L. A. VASSAKOS 2,016,029
AUTOMATIC PHOTOGRAPH STUDIO
Filed June 8, 1931 47 Sheets-Sheet 35
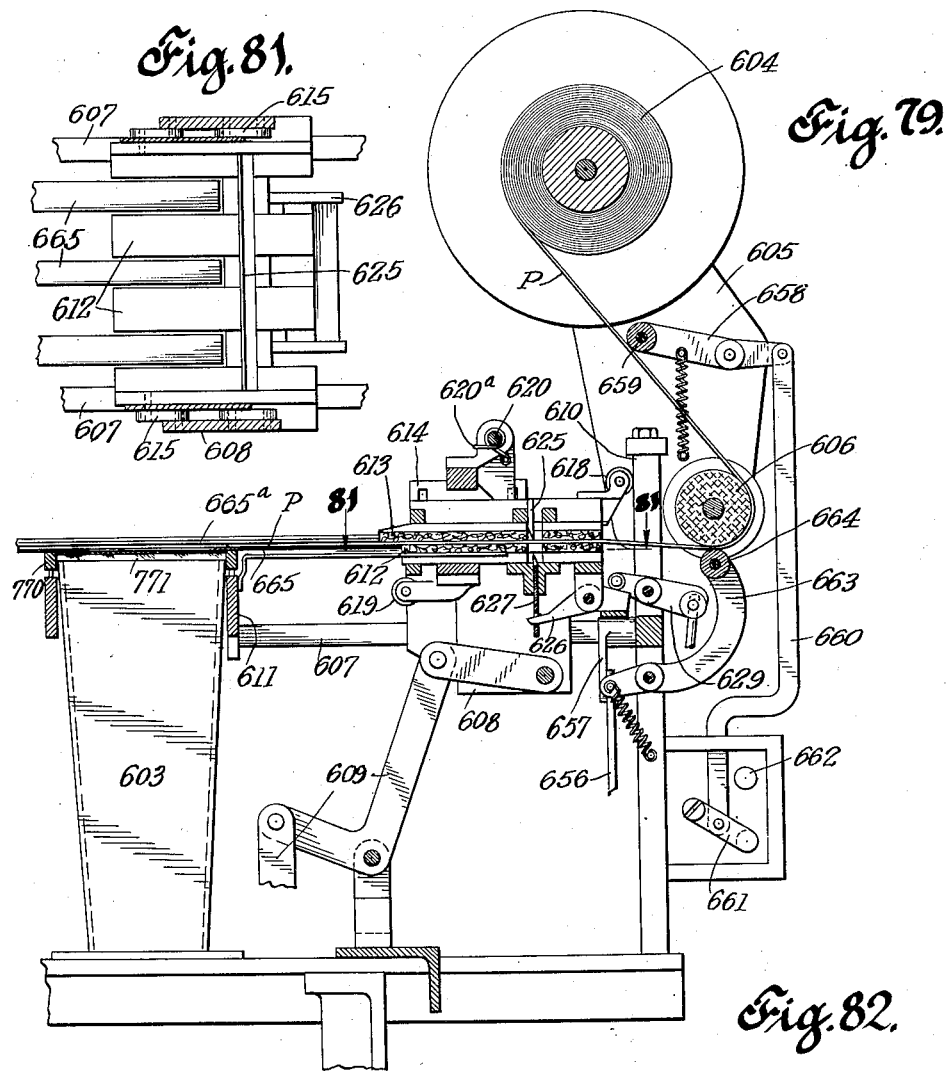
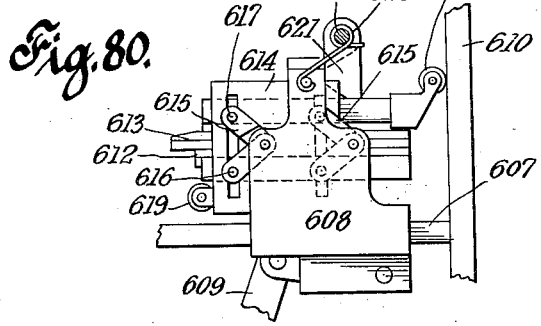
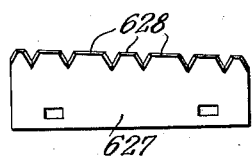
INVENTOR
Leonidas A. Vassakos
BY
Percy Freeman
ATTORNEY Oct. 1, 1935.   L. A. VASSAKOS   2,016,029
AUTOMATIC PHOTOGRAPH STUDIO
Filed June 8, 1931    47 Sheets-Sheet 36
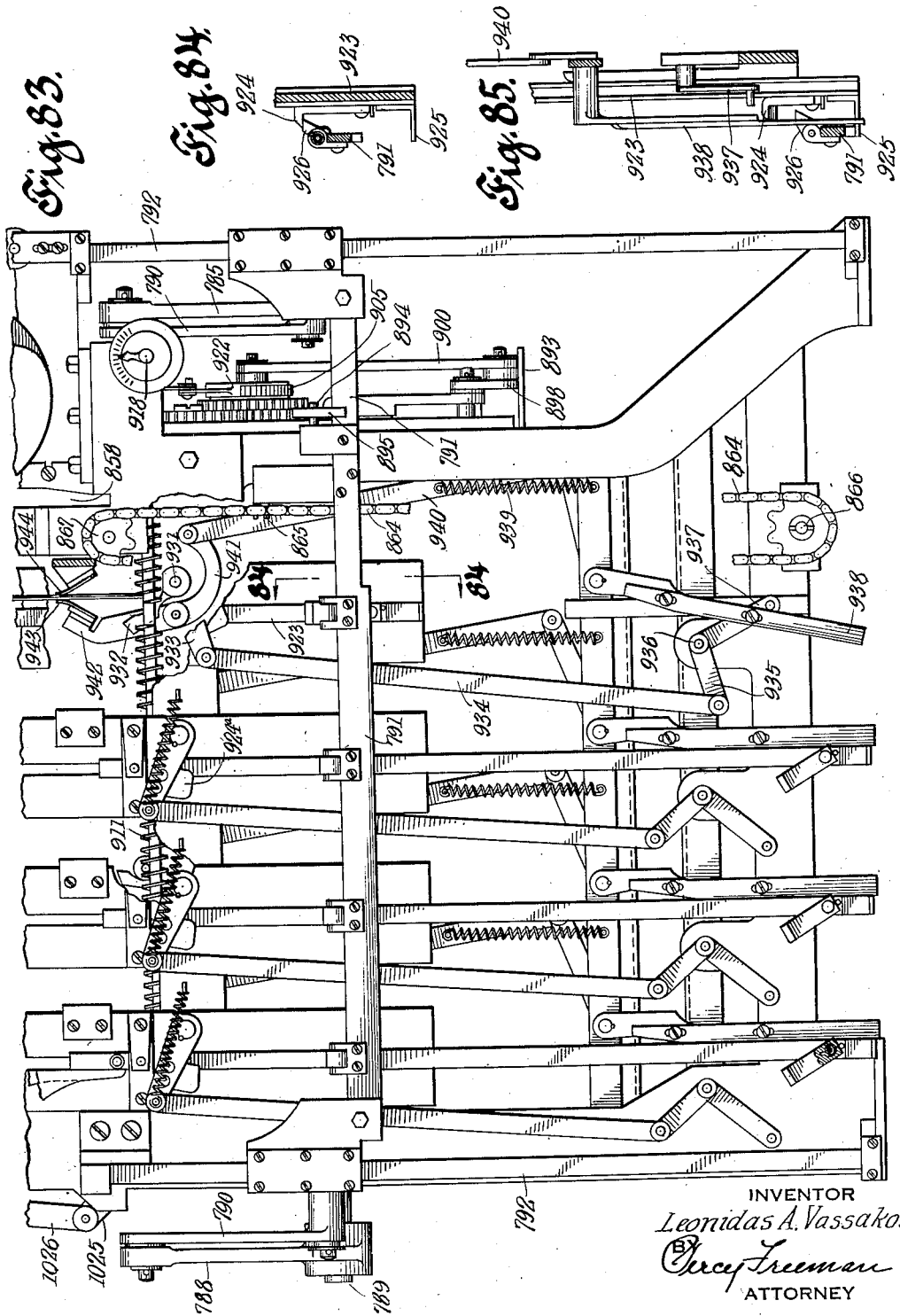
INVENTOR
Leonidas A. Vassakos
BY Percy Freeman
ATTORNEY Oct. 1, 1935.　　　　L. A. VASSAKOS　　　　2,016,029
AUTOMATIC PHOTOGRAPH STUDIO
Filed June 8, 1931　　　47 Sheets-Sheet 37
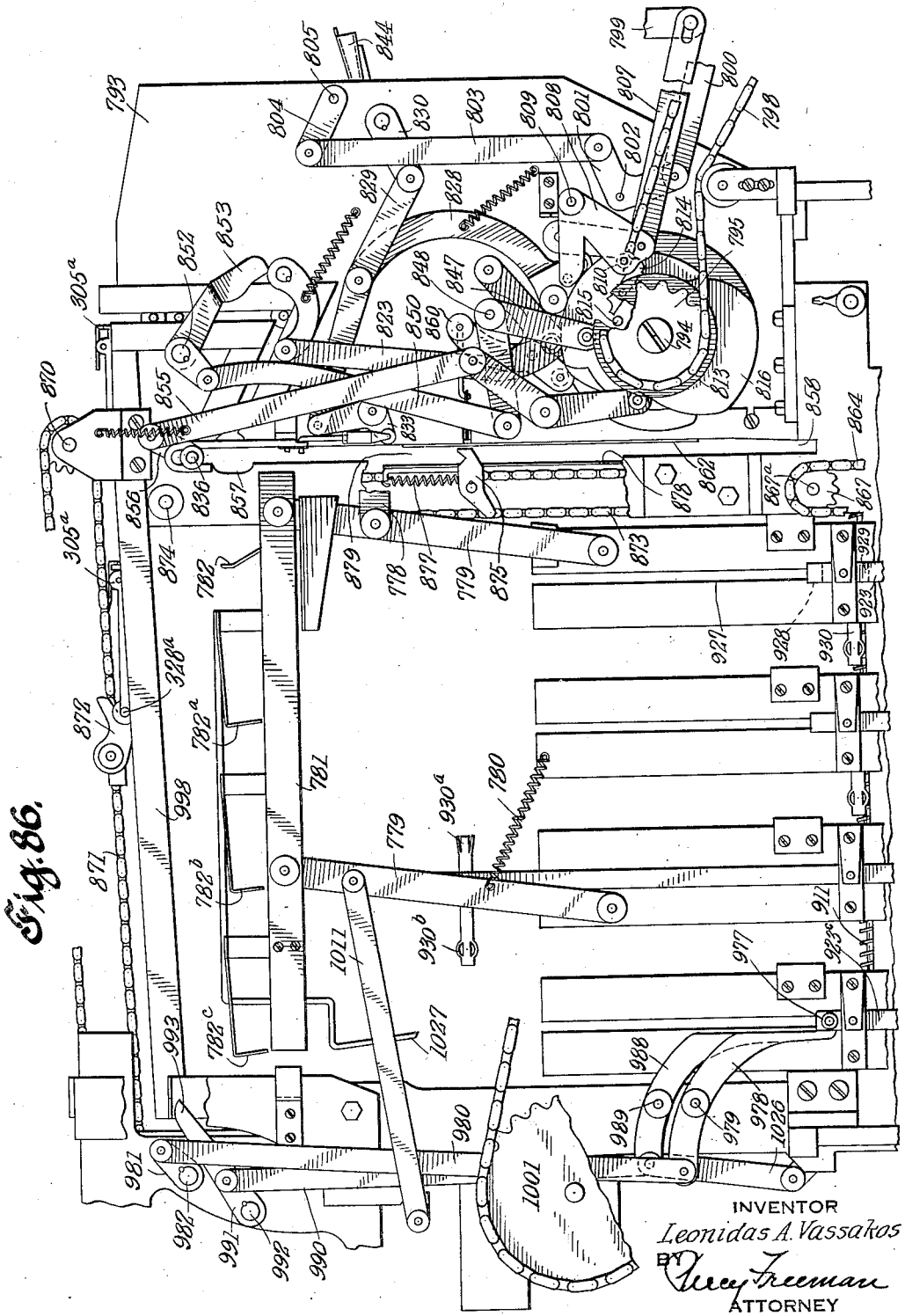

Oct. 1, 1935.  L. A. VASSAKOS  2,016,029
AUTOMATIC PHOTOGRAPH STUDIO
Filed June 8, 1931   47 Sheets-Sheet 38
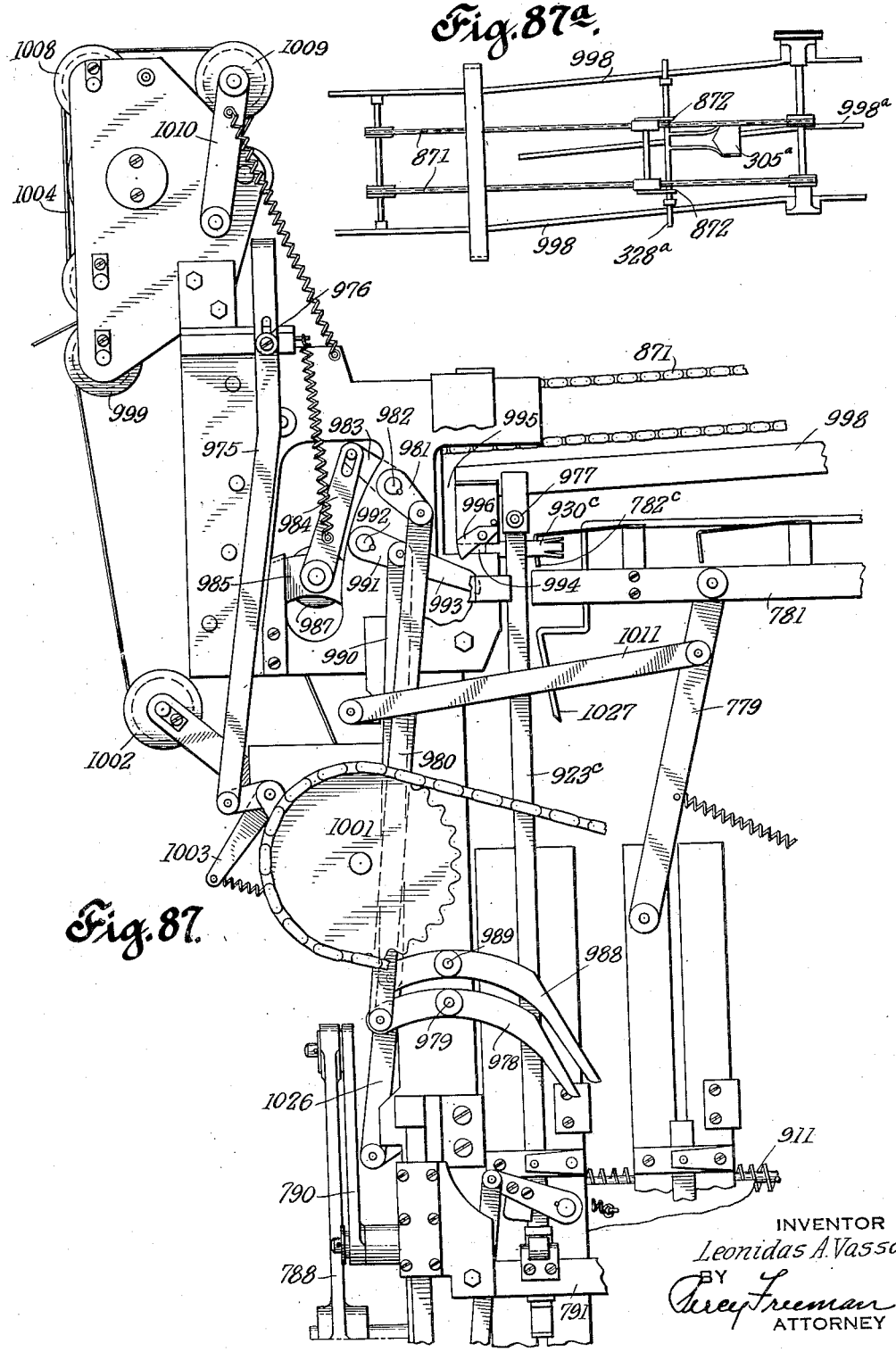
INVENTOR
Leonidas A. Vassakos
BY
Percy Freeman
ATTORNEY

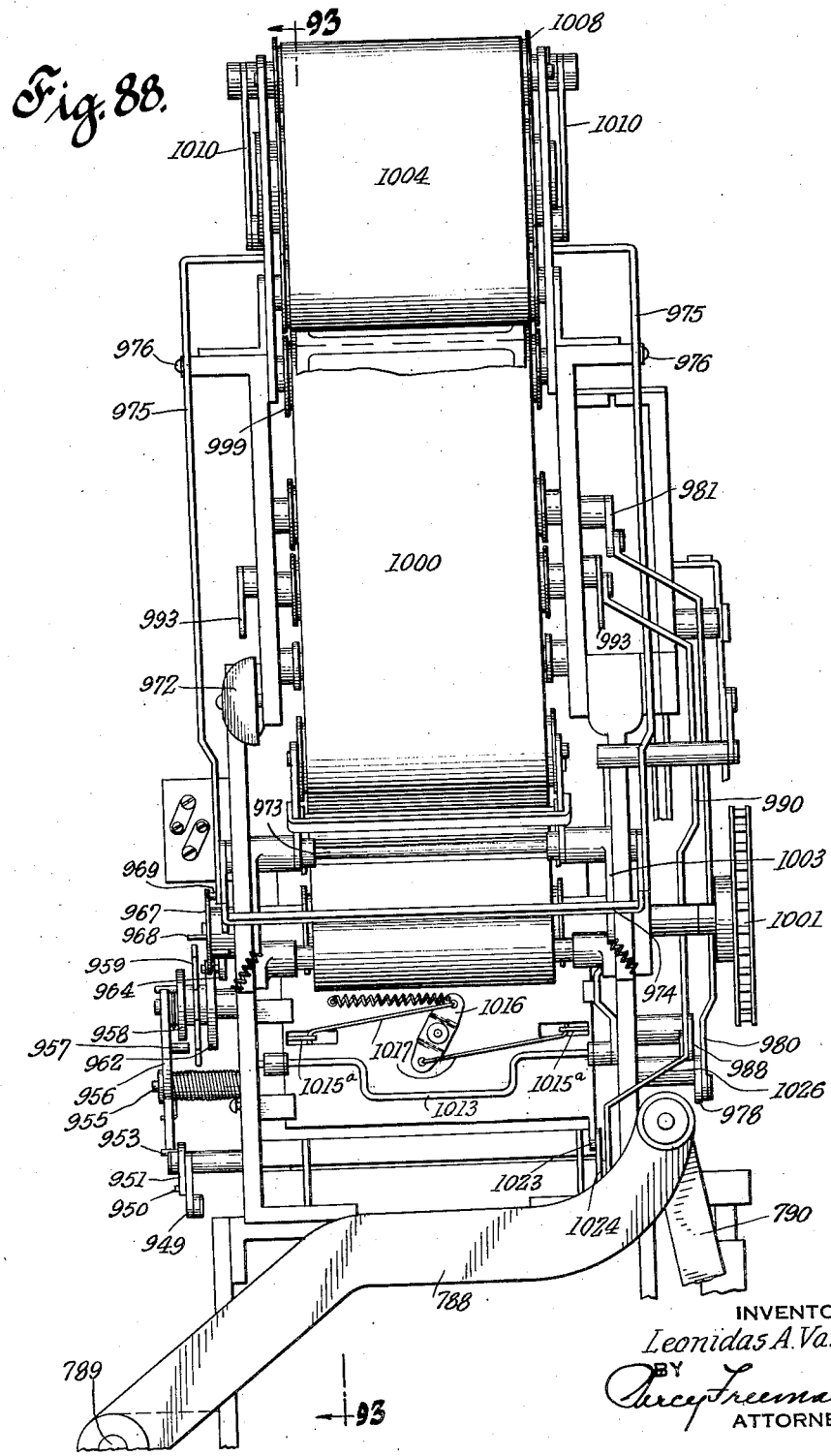

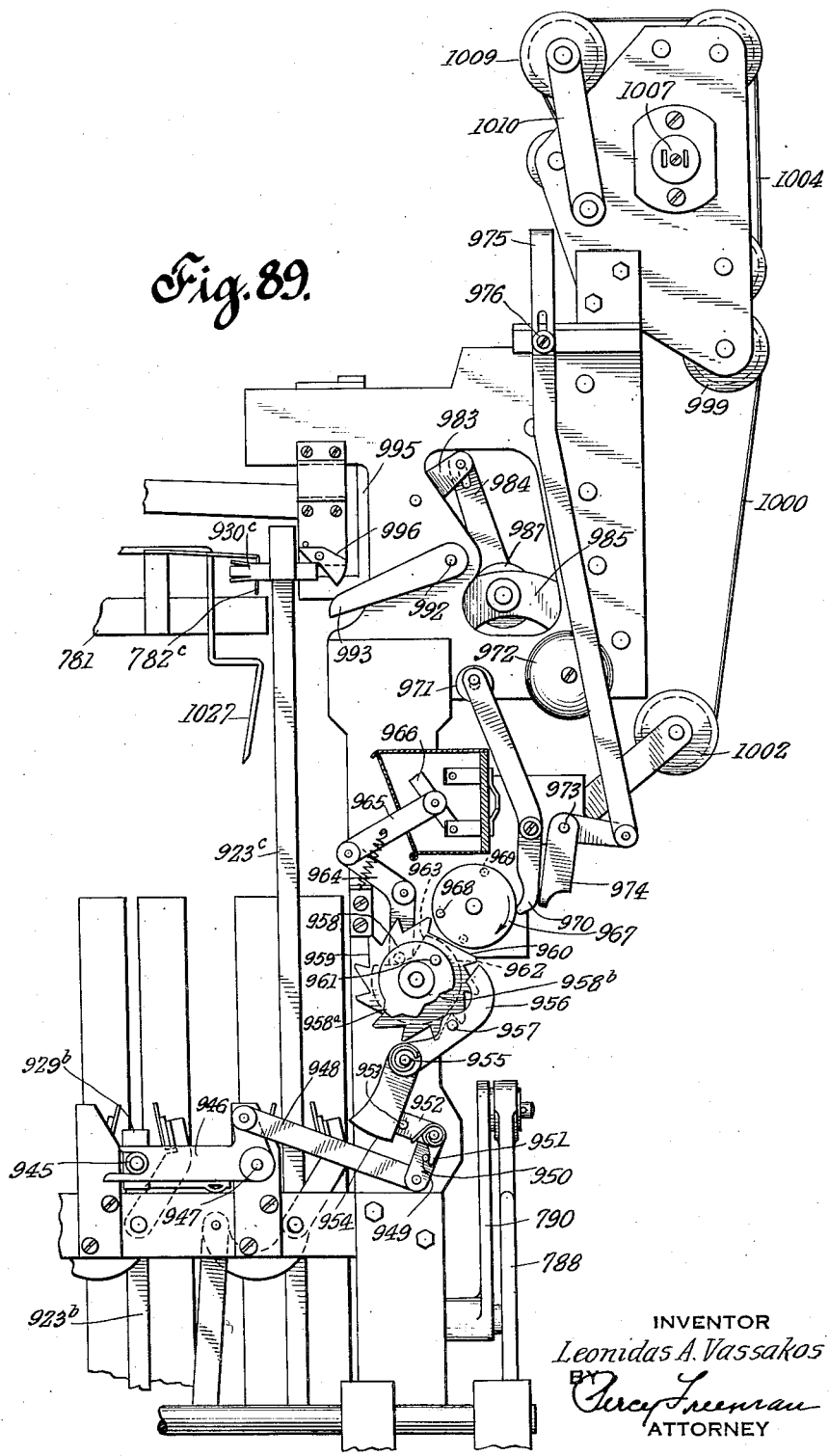

Oct. 1, 1935.  L. A. VASSAKOS  2,016,029
AUTOMATIC PHOTOGRAPH STUDIO
Filed June 8, 1931  47 Sheets-Sheet 41
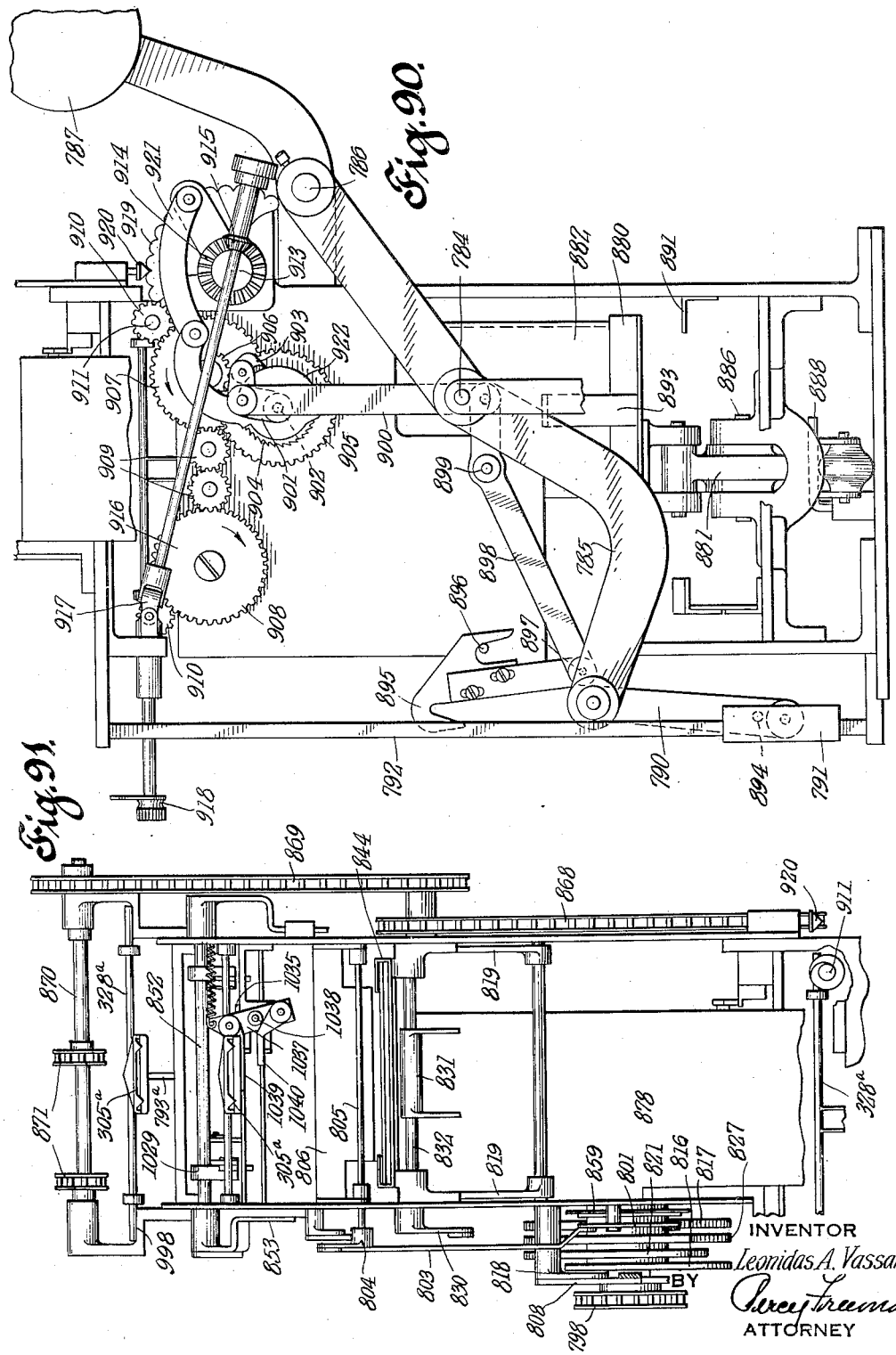

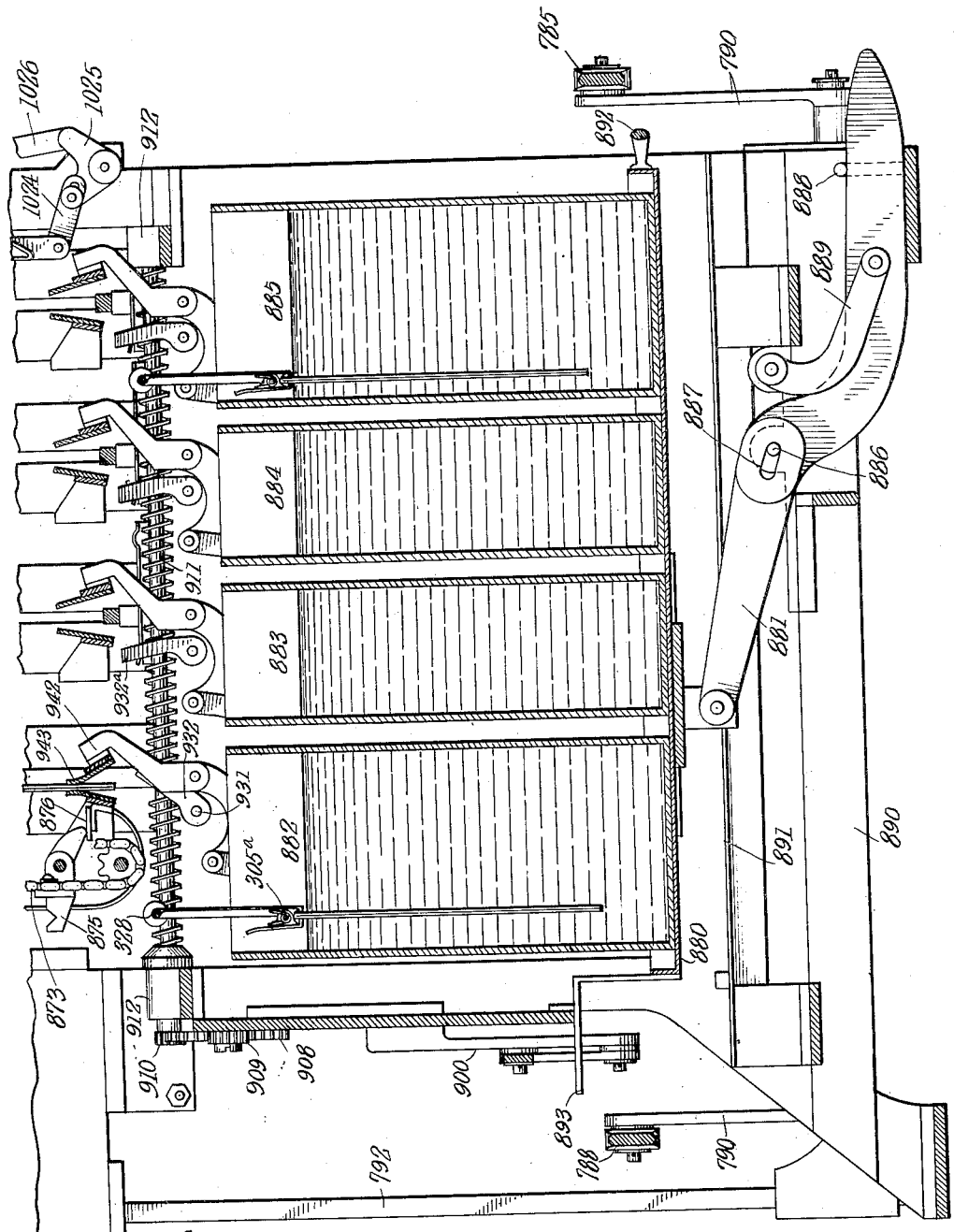

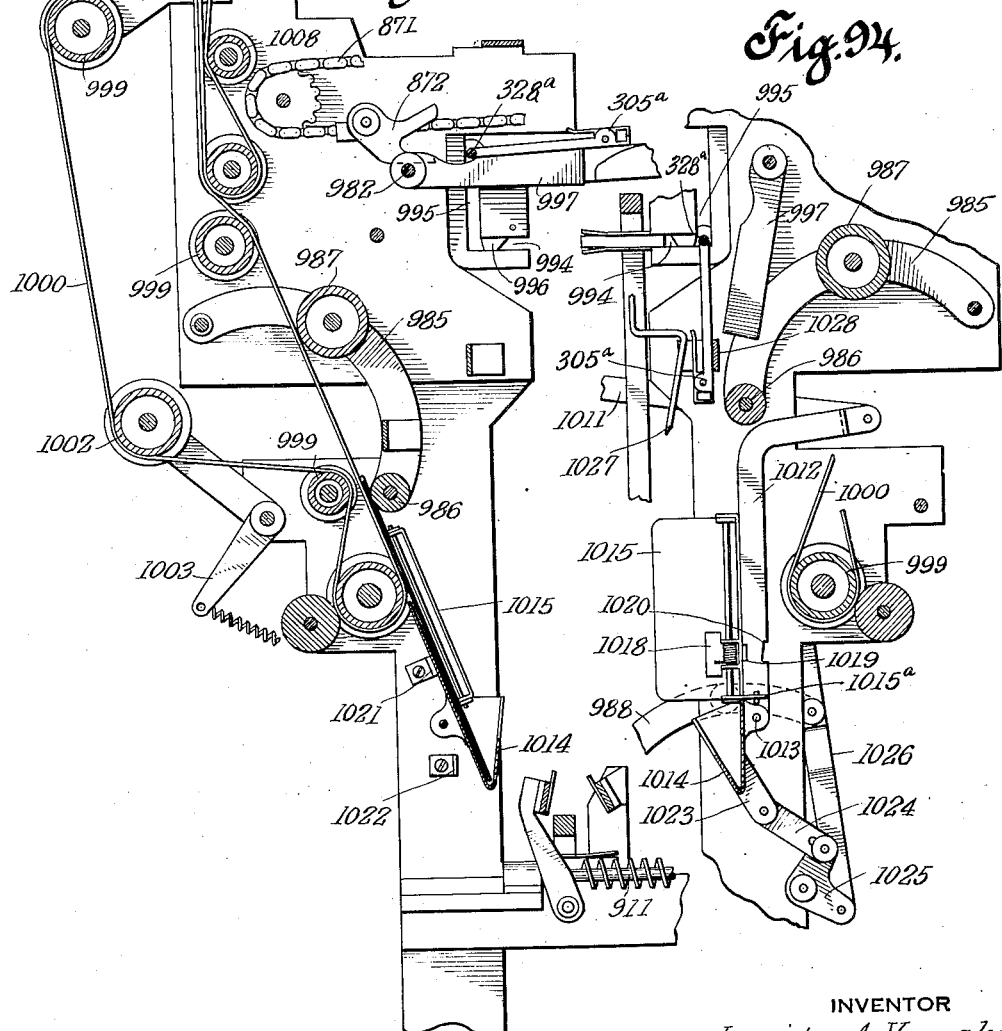

Oct. 1, 1935.　　　L. A. VASSAKOS　　　2,016,029
AUTOMATIC PHOTOGRAPH STUDIO
Filed June 8, 1931　　　47 Sheets-Sheet 44
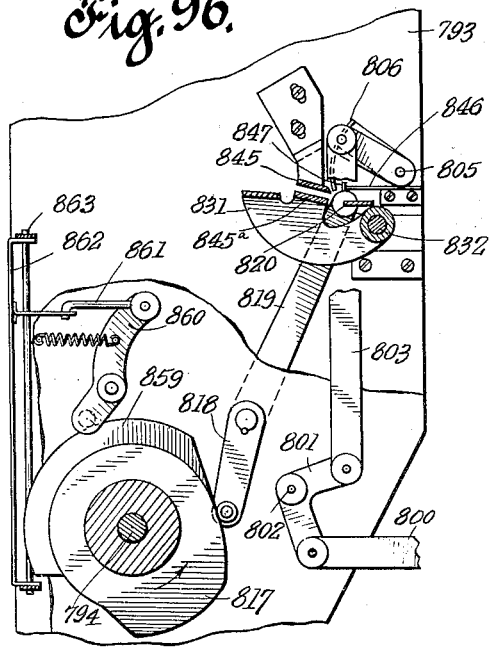
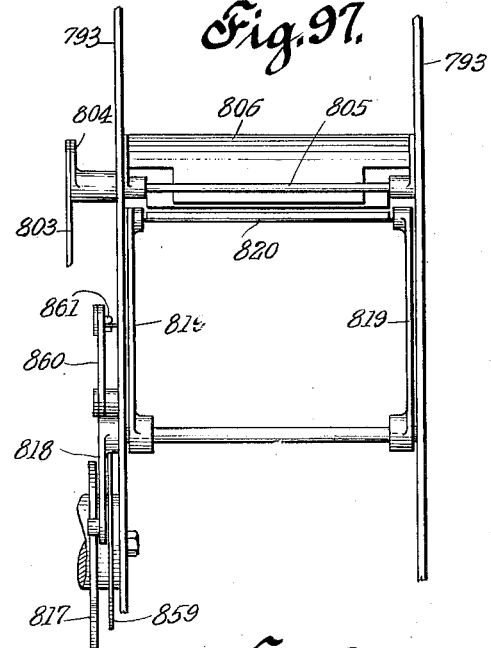
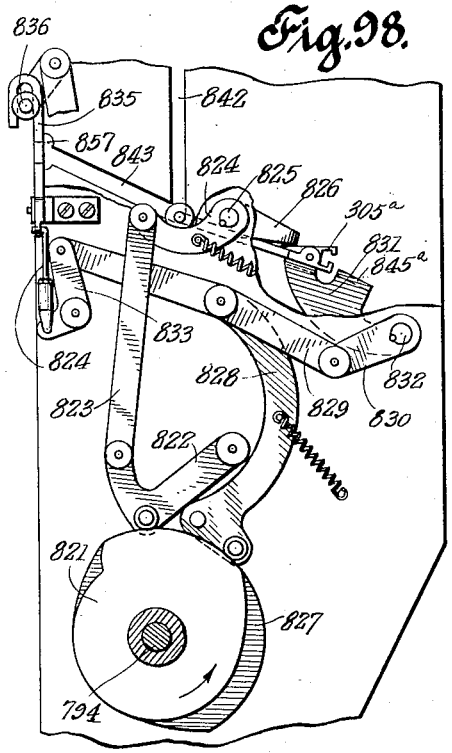
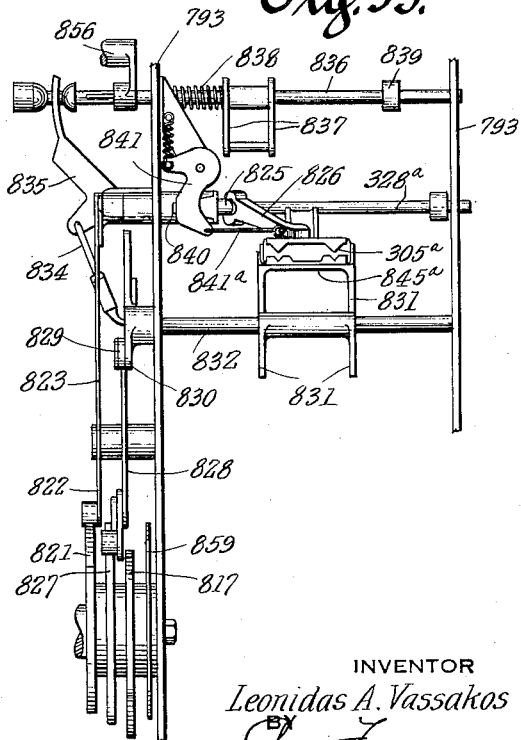
INVENTOR
*Leonidas A. Vassakos*
BY
ATTORNEY

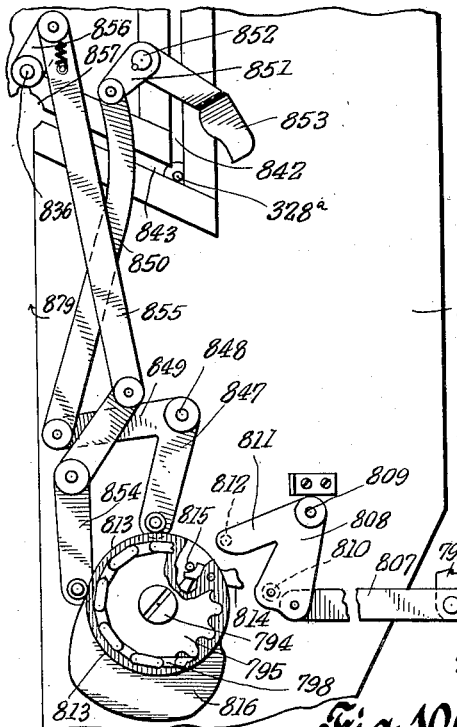

Oct. 1, 1935.　　　L. A. VASSAKOS　　　2,016,029
AUTOMATIC PHOTOGRAPH STUDIO
Filed June 8, 1931　　　47 Sheets-Sheet 46

INVENTOR
Leonidas A. Vassakos
BY
ATTORNEY

Oct. 1, 1935.　　　　L. A. VASSAKOS　　　　2,016,029
AUTOMATIC PHOTOGRAPH STUDIO
Filed June 8, 1931　　　47 Sheets-Sheet 47

INVENTOR
Leonidas A. Vassakos
BY
ATTORNEY

Patented Oct. 1. 1935

2,016,029

UNITED STATES PATENT OFFICE 2,016,029

AUTOMATIC PHOTOGRAPH STUDIO

Leonidas A. Vassakos, New York, N. Y.

Application June 8, 1931, Serial No. 542,850

7 Claims. (Cl. 95—14)

This invention relates generally to automatic photographing apparatus and particularly to apparatus adapted to automatically photograph an object or person upon a film or plate to form a negative, develop the negative, form a plurality of positives in sequence from said negative, develop the positives, and deliver the negative and positives from the machine, all automatically in a short space of time.

Several attempts have previously been made to produce automatic photographing machines, but in all such cases the devices were inefficient and not adapted to produce the results desired by a purchaser. For example, one such device consisted of a case, housing a camera and other apparatus by which an exposure may be made on a plate, and the plate developed and delivered outside of the machine. This device required the subject to pull a cord to operate the device. It required the use of flash light powder with ignition means and flash pans within the casing. It then delivered a single negative plate but no positive picture.

Another such device used a drum for holding sensitized plates upon which an exposure was made to produce a negative. It required the subject to lift a lever after he inserted a coin, to start operation of the mechanism. This device included developing, fixing and washing pans, all of which were successively raised to reach and immerse the plate and its holder and then the developed plate only was "dumped" to the outside of the machine. No positive picture was produced.

Another such device contemplated the production of a photograph from a sensitized plate but a means for obtaining a negative plate only was provided and no provision was made for obtaining positives from said plate. It included a camera for exposing the plate and a means for moving a series of baths below said plate, into each of which the plate was successively immersed by raising the bath pans and then lowering them.

Still another such device contemplates a machine for automatically photographing an object or person upon a plate, developing the exposed plate and delivering same to the purchaser, but here the printing process is eliminated and the customer receives a direct positive as to color but an otherwise reversed picture, similar to the old well known daguerreotype.

Another such device contemplates a machine adapted to take a plurality of exposures of a person so as to register different expressions upon a continuous strip of sensitized paper and developing the strip to make a direct positive as to color but otherwise a negative picture—that is reversed as to position.

An attempt has been made to provide a machine to produce unreversed photographs by first forming the negative and from the latter the positive, with the necessary steps of developing, washing and fixing all automatically produced, but such device was commercially inoperative and impractical in operation and construction. It was neither suited nor adapted to produce and deliver a true cabinet photograph; the methods used were cumbersome and crude—the developing, fixing and washing was done by atomized or vaporized solutions being sprayed upon the positive and negative. The negative was a film strip on a reel, as in motion-picture machines and after exposure of a portion of the film strip the same was sprayed with solution, to develop it; then a positive was made by photographing through a lens onto a sensitized card and then spraying the exposed positive with solutions to develop, fix and wash it.

These various attempts have been empirical resulting in very poor pictures amounting to nothing more than proofs, and a consequent waste of materials, etc.

Former machines were limited to a single focus, that is to say, the subject was always required to be positioned at a fixed distance from the lens—the lens was fixed for a single focus— the distance or length of focus permitted a bust picture only—lighting means was fixed as to intensity and duration. Capacity of such former machines was limited to photographing a single individual and in such cases the head only or at most the bust of the subject.

It is often desirable, and sometimes necessary to have privacy in obtaining a photograph, and a large percentage of the public generally are sensitive and self-conscious when appearing in a studio before an attendant or photographer while they are preparing to pose and actually having a photograph taken. Many people express the self-consciousness by the expression "I feel silly posing before any man." Besides, women particularly often desire to see a photograph of themselves in various positions of undress or arranged with a draped figure, or even in the nude, and have been unable to procure such photograph for themselves because of their dislike of the presence of an attendant, operator or photographer. In such cases it is not only desirable, but necessary to have absolute privacy in posing for the photograph and also have the assurance that no one but the subject shall see or receive the negatives or positives.

Hence, a primary object of the present invention is to overcome all the difficulties enumerated above, eliminate waste of time and materials and to provide a complete automatically operated photograph studio, including a substantially light tight booth in which the subject may pose in absolute privacy if desired and in which the subject may when he is ready, set in motion the apparatus which automatically photographs the subject and then automatically develops a negative, prints and develops a plurality of positive pictures and delivers the finished negative and the finished positives outside the apparatus.

A further object is to provide a complete automatically operated photograph studio in which a single individual or a large group of individuals may pose or be posed for a photograph, and in which provision is made for focusing the camera to take bust, three-quarter or full size photographs of the subject or group with the necessary variations in lighting, all automatically controlled to produce the desired result.

A still further object is the provision of a machine which will automatically photograph an object or person upon a film or plate to form a negative; develop, fix and wash the negative; form a series of positives in sequences of a predetermined number from said negative, develop, fix, wash and dry said positives, and deliver the negative and said positives to a chute to fall outside of the machine, and to do all of this automatically in a comparatively short space of time.

A still further object is to provide an automatic photographing machine including a light tight booth in which the subject may be posed, and apparatus, set in motion by the deposit of a coin, adapted to load a film or plate into a camera plate holder, focus the camera, signal or warn the subject that the shutter is about to be opened, automatically flood the booth with light at the proper moment when the exposure is to be made, open the shutter to make the exposure, develop the negative, print positive pictures from said negative, develop and dry the positives and then deliver the positives and negatives outside the machine.

The foregoing objects and many other objects which will become more apparent as the description proceeds, may be attained by the construction of a machine such as is illustrated in the accompanying drawings, which is shown for the purpose of easier understanding as a group of co-related units. The first of these which is denominated the Negative delivery unit is illustrated in Figs. 1 to 15 inclusive. The second, which is denominated Mechanical camera, is shown in Figs. 16 to 26 inclusive. The third, which is termed Negative transfer unit is illustrated in Figs. 27 to 41 inclusive. The fourth, is termed the Negative developer is illustrated in Figs. 42 to 57 inclusive. The fifth, which is termed the Printer, is illustrated, in Figs. 58 to 82 inclusive, and the sixth, termed Positive developer and drier, is shown in Figs. 83 to 102.

It has been necessary of course to overlap the illustrations of these various groups and several portions of one group will be found among various views of the others so as to more clearly depict the correlation of the units.

The last figure illustrates diagrammatically one manner in which the units may be grouped and indicated how in this case the negative travels from a supply stack to the printer where it crosses the path of the photographic print paper or sensitized positive to its ultimate delivery point. The path of the positive print paper is also indicated from its source of supply to the point where it is ultimately delivered after developing and drying.

In order to more clearly describe the machine as a whole, the specification will be divided into groups accordingly.

In the accompanying sheets of drawings wherein I have shown the preferred embodiment of the invention:

Fig. 1 is an elevational view of the film delivery mechanism, the film transfer head being broken away. The upper right hand portion of the figure depicting the front of the camera and the lower portion illustrating the cam shaft and co-acting levers.

Fig. 2 is a vertical sectional view taken on line 2—2 of Fig. 1, and shows the film stack counterweights and a portion of the cam shaft and its co-acting levers.

Fig. 3 is a side elevational view of the film stack and transfer head and forms the upper continuation of Fig. 4.

Fig. 4 is a side elevational view showing the section pump, a portion of the mechanism for operating the exposed film transfer chute and a portion of the empty carrier return chute.

Fig. 5 is a side elevational view as seen from the right of Fig. 1, the lower portion of the camera being shown at the top, and the film elevator mechanism at the bottom.

Fig. 6 is a broken vertical section of the film transfer head and its attending linkage.

Fig. 7 is a broken elevation of the film transfer head, the transfer arm being in a delivery position.

Fig. 8 is a broken elevation, parts being in section, taken at right angles to Fig. 7, and showing cooperating linkage.

Fig. 9 is a fragmentary elevational view of the cam shaft locking mechanism with the cam shaft in its operating position.

Fig. 10 is a sectional view taken on line 10—10 of Fig. 9.

Fig. 11 is a sectional view of the coin controlled shifting plate taken on the line 11—11 of Fig. 1.

Fig. 12 is a plan section of coin operated linkage as related with the cam shaft.

Fig. 13 is a vertical section of the parts shown in Fig. 12.

Fig. 16 is a rear elevational view of the camera and exposed film transfer mechanism, the transfer arm and carriage being shown in a midway position.

Fig. 17 is a vertical sectional view through the camera and film receiver hopper.

Fig. 18 is a detail view of the film receiving frame.

Fig. 19 is a vertical sectional view through the camera in an extended position with the linkage in the position assumed during the film exposure.

Fig. 20 is a rear view of the linkage (shown in the lower portion of Fig. 19) which transfers the exposed film from the receiving chute to the film carrier.

Fig. 21 is a fragmentary side view of the rear of the camera with parts in position just after the delivery of a film.

Fig. 22 is a similar view, portions being removed and ready for rotating the film to a lengthwise position.

Fig. 23 is a sectional view on the line 23—23 of Fig. 22.

Fig. 24 is a similar view to Fig. 23, the film having been rotated to its lengthwise position.

Fig. 25 is a view similar to Fig. 22, but arranged to leave the film in an upright position.

Fig. 26 is a sectional view on the line 26—26 of Fig. 25.

Fig. 28 is a partial rear elevational view of the film carrier transfer mechanism, the transfer arm being about to move the cross-carriage.

Fig. 28a is a fragmentary plan view of the transfer carriage shown in Fig. 28, and shows its engagement with the transfer arm.

Fig. 29 is a sectional view looking in the direction of the arrow of Fig. 28.

Fig. 30 is a view showing a portion of Fig. 29 with the film carrier in a position to receive the film.

Fig. 31 is a rear elevation of the film transfer mechanism, the transfer arm being shown about to release the film carrier from the position shown in Fig. 30 to the one shown in Fig. 29.

Fig. 32 is a plan view of the film carrier releasing mechanism.

Fig. 33 is a sectional view on line 33—33 of Fig. 32.

Fig. 34 is a plan section on line 34—34 of Fig. 30.

Fig. 35 is a plan section on line 35—35 of Fig. 29.

Fig. 36 is a sectional view on line 36—36 of Fig. 35.

Fig. 37 is a rear elevational view of the film carrier transfer mechanism, the transfer arm having moved the carriage to its transferred position.

Fig. 38 is a sectional view on line 38—38 of Fig. 37, showing the magazine for empty carriers and the top of the carrier drop to the developing bath.

Fig. 39 is a similar view of a portion of Fig. 38, showing an empty carrier arranged to be moved to a position for receiving the next film.

Fig. 40 is a plan view taken on line 40—40 of Fig. 38.

Fig. 41 is a partial side elevation showing means for releasing a loaded carrier into the carrier drop leading to the developing bath.

Fig. 42 is an inside elevation of the lower portion of the developing baths elevator mechanism.

Fig. 43, forms an upper continuation of Fig. 42, showing the film shifting arrangements between baths and return chute to the magazine of empty carriers.

Fig. 44 is an outside elevation partly in section showing the developing tanks and supporting mechanism.

Fig. 45 is a front elevation as viewed when looking in the direction of the arrow 45, on Fig. 44.

Fig. 46 forms an upper continuation of Fig. 45 as viewed in direction of the arrow 46 on Fig. 43.

Figure 47:
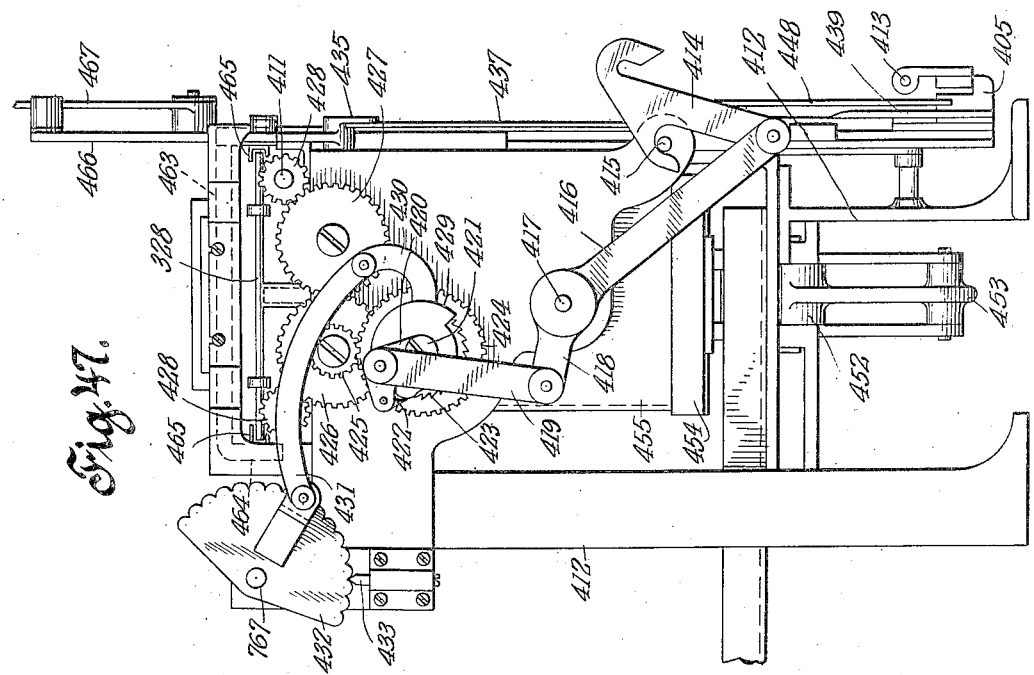

Fig. 47 is a similar view to Fig. 45, but viewed in the direction of the arrow 47, on Fig. 44.

Figure 48:
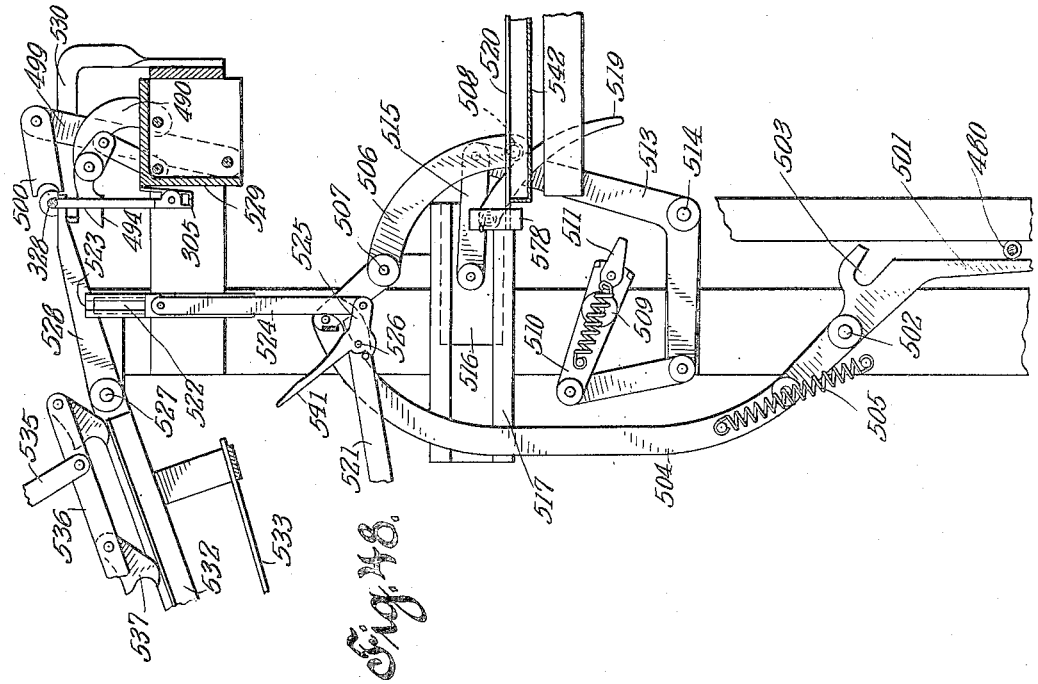

Fig. 48 is a detail view of the delivery mechanism to the printer of the developed film.

Fig. 49 is a detail view of the elevator linkage before the film has been raised out of the first bath.

Fig. 50 is a similar view after the raising of the film and its shifting to a position over the second bath.

Fig. 51 is a view similar to Fig. 48, parts being in intermediate position.

Fig. 52 is a similar view to Figs. 48 and 51 showing still another position.

Fig. 53 is a partial detail view showing the details of a slide member.

Fig. 54 is a broken elevational view partly in section of the final film elevator and empty carrier ejector.

Fig. 55 is a detail similar to the upper portion of Fig. 54, with the film about to be released from the carrier.

Fig. 56 is a view similar to Fig. 54, showing the film after its release from the carrier.

Fig. 57 is a broken detail view showing the slide and attending mechanism for placing the developed film over the printer light chamber.

Figure 58:
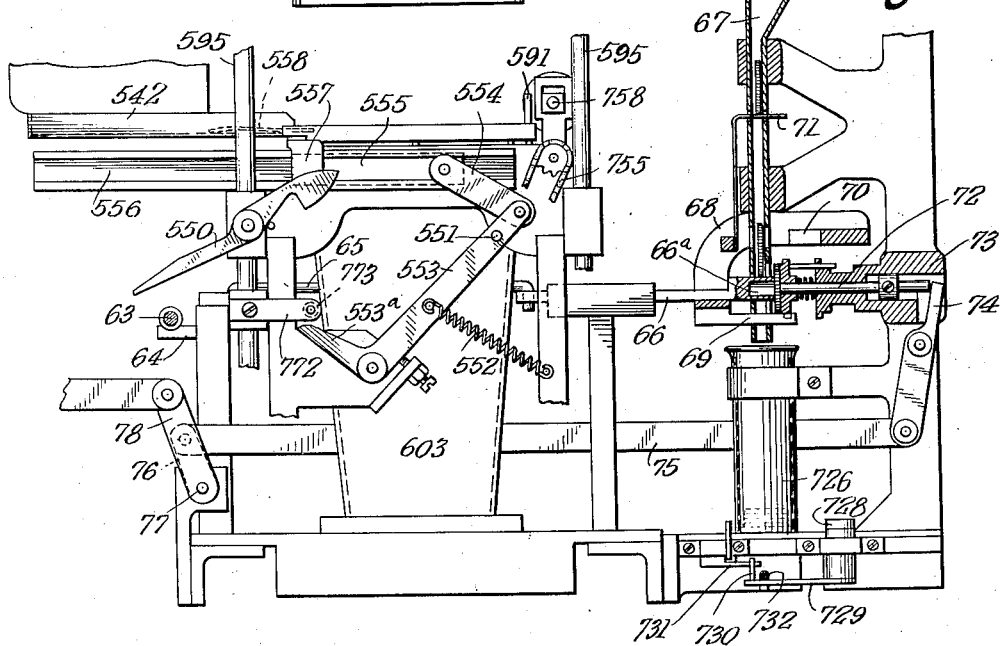

Fig. 58 is an inside elevational view of the film printer light chamber and also showing partly in section, the coin mechanism.

Figure 59:
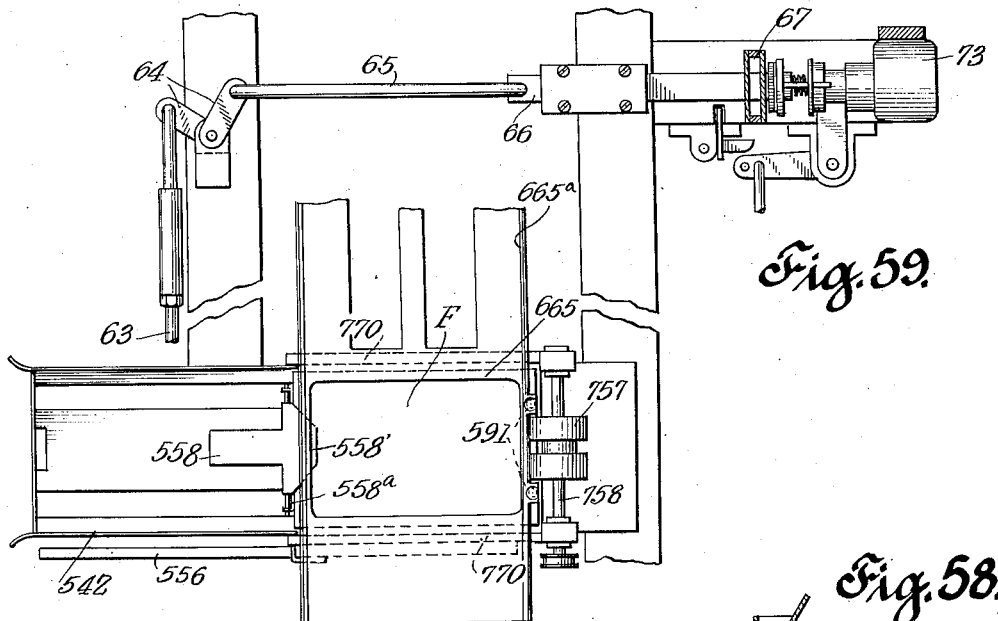

Fig. 59 is a plan view, partly in section of Fig. 58.

Fig. 60 is a front elevation of the film printer and of the coin mechanism.

Fig. 61 is a side elevation of the printer and the coin mechanism as viewed from the right of Fig. 60.

Figure 62:
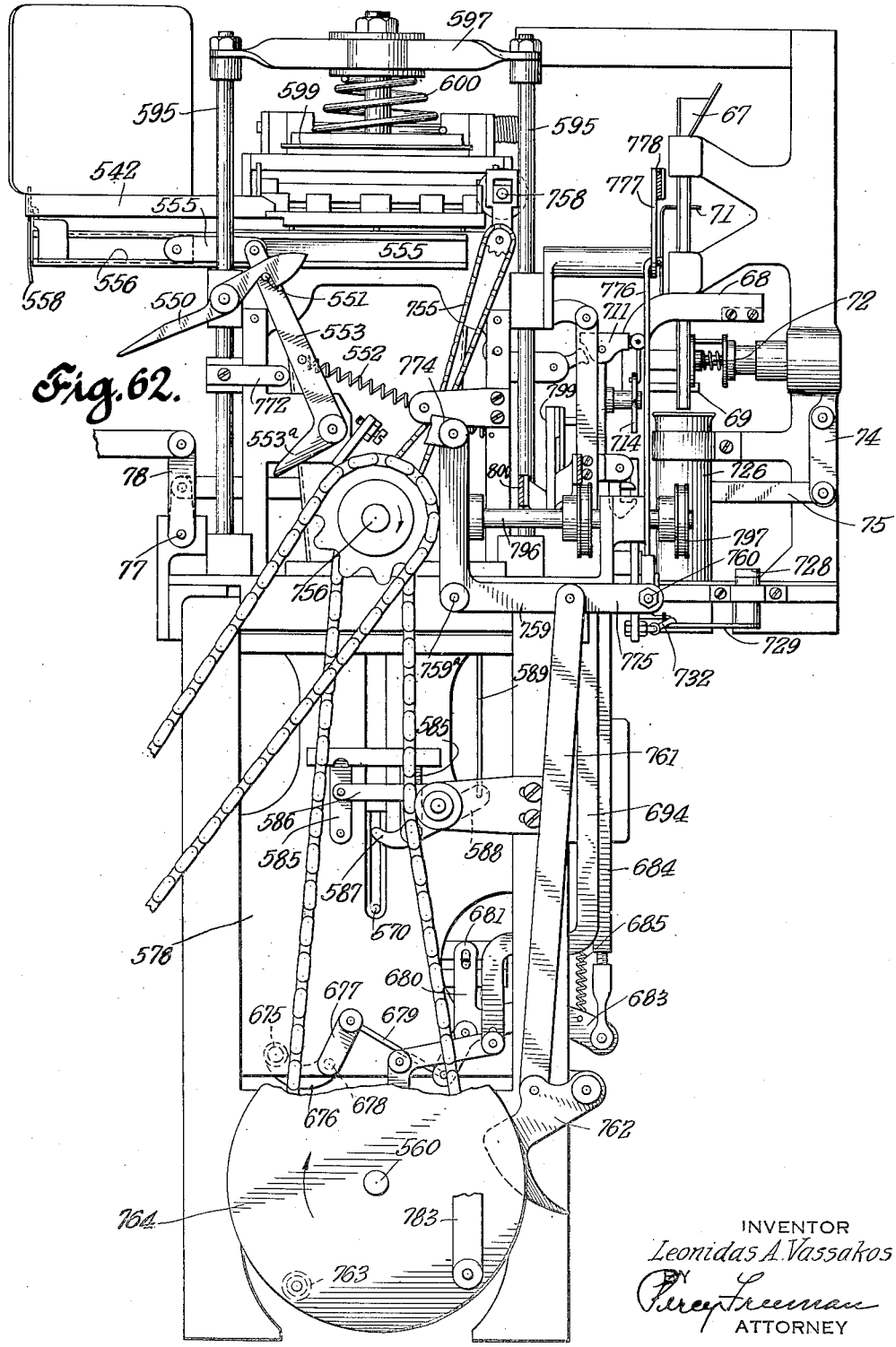

Fig. 62 is a similar view of printer and of coin mechanism as viewed from the left of Fig. 60.

Fig. 63 is a vertical sectional view through the printer on line 63—63 of Fig. 60.

Fig. 64 is a detail sectional view taken on line 64—64 of Fig. 63.

Fig. 65 is a vertical view similar to Fig. 63 but showing parts in position they assume when the film is fed to the printer.

Fig. 66 is a detail sectional view taken on line 66—66 of Fig. 65.

Fig. 67 is a view similar to Fig. 63 and showing the sensitized positive, cutting and perforating control mechanism.

Fig. 68 is a sectional detail view taken on line 68—68 of Fig. 67.

Fig. 69 is a detail sectional view on line 69—69 of Fig. 67.

Fig. 70 is a fragmentary elevational view of the sensitized positive perforating and cutting control mechanism in position for cutting.

Fig. 71 is a vertical sectional view similar to the lower portion of Fig. 67 and showing the association of the coin control mechanism with the sensitized paper control mechanism, and also showing a portion of the printing lamps elevating mechanism.

Fig. 72 is a plan view of Fig. 71.

Fig. 73 is a vertical sectional view similar to Fig. 63 showing the negative being ejected from the printer.

Fig. 74 is a partial elevation as viewed from the left of Fig. 73.

Fig. 75 is a fragmentary detail of the film ejector mechanism with the gripping jaws about to grip the negative film.

Fig. 76 is a similar view, partially in section, showing the relation of the parts after the film has been brought between the ejecting rolls.

Fig. 77 is a vertical sectional view taken on a plane parallel to plane of Fig. 60 and showing the unexposed positive feed carriage at extreme forward position.

Fig. 78 is a fragmentary detail of the film ejector mechanism with the gripping jaws engaging the film.

Fig. 79 is a vertical sectional view of the unexposed positive feed carriage at its extreme retracted position with its associated linkage.

Fig. 80 is a fragmentary detail of the rear of the positive feed carriage shown in Figs. 77 and 79.

Fig. 81 is a plan section taken on line 81—81 of Fig. 79.

Fig. 82 is a detail of the movable shear element.

Fig. 83 is a front elevation of the positive print elevating and developing mechanism.

Fig. 84 is a detail sectional view taken on line 84—84 of Fig. 83.

Fig. 85 is a fragmentary detail similar to Fig. 84, but with the elevating bar in its lowermost position.

Fig. 86 is a front elevational view forming an upper extension of Fig. 83, and showing mechanism for moving the positive through the developing baths.

Fig. 87 is a front elevational view being a left hand continuation of Figs. 83 and 86 and showing the drying unit and control linkage.

Fig. 87a is a diagrammatic plan of the empty carrier return mechanism drawn to reduced scale.

Fig. 88 is a side elevation of the drying unit as viewed from the left of Fig. 87.

Fig. 89 is a rear elevation of the drying unit and its associated linkage.

Fig. 90 is a side elevation of the positive print elevating and developing mechanism as viewed from right of Fig. 83.

Fig. 91 is a similar view forming the upper extension of Fig. 90 and showing the mechanism for moving the positive through the developing baths.

Fig. 92 is a vertical sectional view of the positive developing baths and showing carrier conveyer mechanism.

Fig. 93 is a vertical sectional view through the drying unit on line 93—93 of Fig. 88.

Fig. 94 is a vertical sectional view of a portion of Fig. 93, viewed from the opposite direction with the parts in position to receive the developed positive.

Fig. 95 is a longitudinal section of the drying heater unit taken on line 95—95 of Fig. 93.

Fig. 96 is a fragmentary elevational detail of the folding mechanism for the positive print and the swinging closure guide plate.

Fig. 97 is a side elevational view thereof.

Fig. 98 is a view similar to Fig. 96, and shows carrier jaw opening means and carrier shifting means.

Fig. 99 is a side view thereof.

Fig. 100 is a view similar to Fig. 98 but showing coupling means operable from the printer to render operative the positive developing unit and also showing supporting arms for movement of the carrier.

Fig. 101 is a side view thereof.

Fig. 102 is a fragmentary elevational view partially in section of the positive folding mechanism and also showing the empty carrier magazine.

Fig. 103 is a detail of a portion of Fig. 2, just prior to the lifting of the carrier from the hanger levers.

Figure 104:
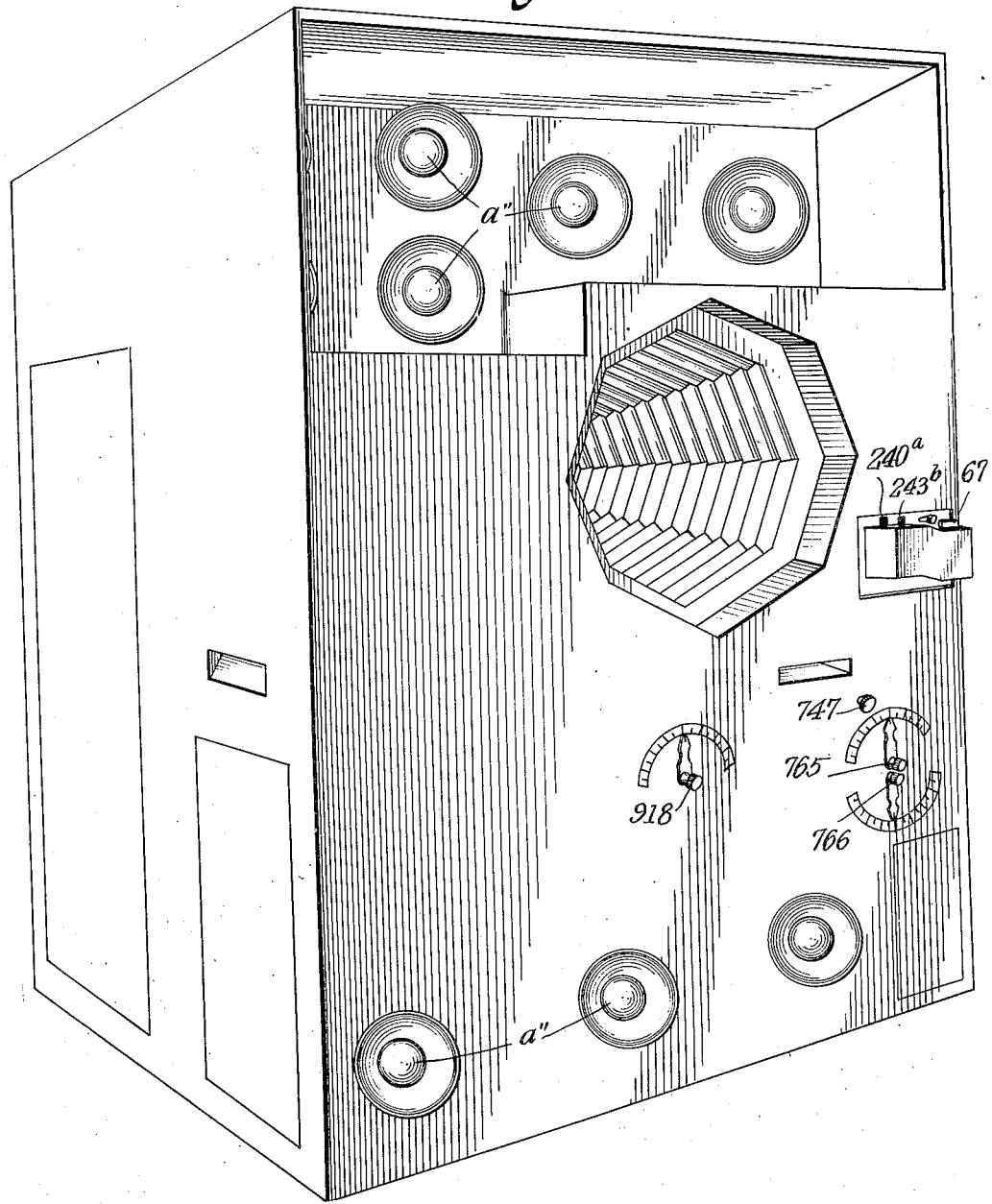

Fig. 104 is a perspective view of an embodiment of the invention.

Figure 105:
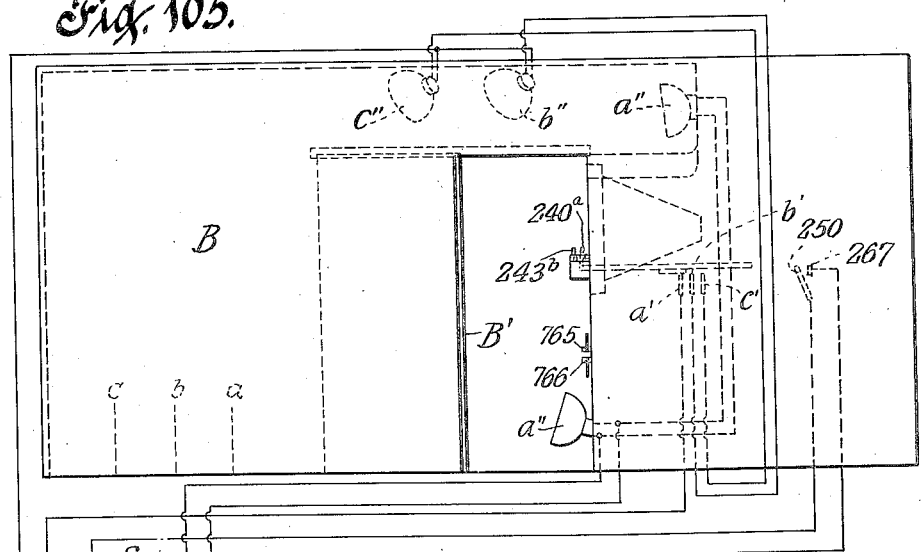

Fig. 105 is a semi-schematic side elevation of an embodiment of the invention and showing in diagram a preferred form of electric wiring and illumination system.

Figure 106:
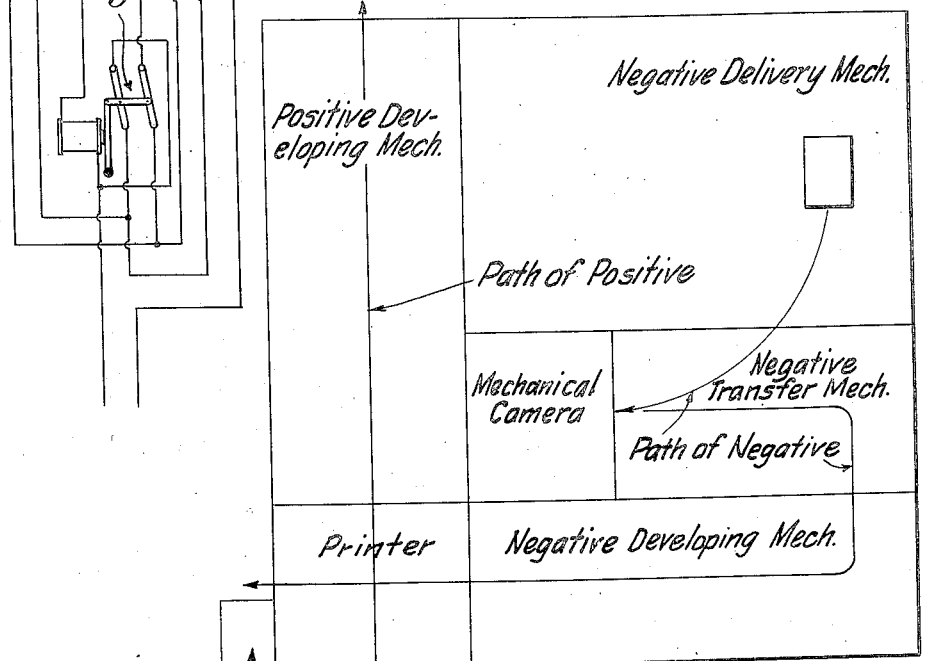

Fig. 106 is a schematic plan view showing an arrangement of the several units and indicating the respective paths of the negatives and positives therethrough.

Negative delivery mechanism

This mechanism controls the initial movements of the blank negative film or plate from a stack to the mechanical camera. In the present case it is shown as coin controlled and constantly ready for operation. To this end a motor 50 (Fig. 27) is arranged, through a speed reducer 51 and chain 52, to drive a sprocket 53 on the shaft 54. Referring now to Fig. 1, constant rotary motion through gearing 55 may then be imparted to the shaft 56 which like the shaft 54 is mounted for rotation in the rigid frame 57.

A cam 58 (Figs. 1, 12 and 13) causes oscillation of the spring tensioned arm 59 pivoted to the frame 57 at 60. Connections including a link 61, bellcrank lever 62 and connecting rod 63 cause oscillation of the bellcrank lever 64 (Figs. 58 and 59). Another connecting link 65 may impart this same oscillatory movement to a guided slide 66. The end of the guide 66 reciprocates through an opening in the lower portion of a coin drop 67 (Fig. 58) and is recessed at 66a. Carried with the slide 66 is a member 68 having a coin rest 69, a lug 70 operating through an aperture in this coin drop immediately above the slide aperture and a member 71 passing through still another opening in the coin drop.

Normally, rotation of the cam 58 (Fig. 13) would cause merely the reciprocation of the slide 66, the recess 66a telescoping over the end of the rod 72, but, when a coin is inserted in the coin drop and comes to rest at 69, it will push against the end of the resiliently held rod 72 guided in the bracket 73. This movement will tip a lever 74 and through a long link 75 push another short lever 76 and rock the shaft 77. A longer lever 78 is carried on the other end of this shaft, and through a link 79 (Figs. 1 and 11) the lower end 80 of a rocking member pivoted at 81 may be pushed, causing the longer hooked upper end 82 to move inwardly and downwardly as from the position shown in Fig. 5 to the one shown in Fig. 11.

On the end of the shaft 56 is provided a disc 83 on the inner face of which is an arcuate abutment 84. As the shaft 56 is constantly rotating, and, if at the proper time the longer hooked end 82 of the rocking member is moved inwardly and downwardly, the roller 85 carried on it, will come into the path of the incline 86 at one end of the abutment 84 and cause endwise displacement against a spring 87 of the shaft 56, (as for instance from the position shown in Fig. 1, to the position shown in Fig. 9).

A spool 88 provided on the shaft 56 is coupled with the lever 89 and as the roller 90 on the disc 91 is arranged to tip a lever 92, torsionally held by a spring 93, and as the tip 94 of the lever 92 will move out of the notch 95 in the top of the member 96, the endwise movement of the shaft 56 will rock the lever 89 placing the notch 97 in the path of the tip 94, and as the roller 90 releases the lever 92, the shaft will be held in this position. In a similar manner, when the roller again comes in the path of the lever 92 the tip 94 will be rocked out of the notch 97, permitting the spring 87 to move the shaft 56 into its non-operating position which is maintained until another coin is inserted in the coin drop 67.

When the shaft 56 is moved to its operable position, a pin 98a on the plate 98 engages an arm 99a on the bell 99 and as the pin releases the arm 99a, the spring in the bell will operate its clapper.

A stack of unexposed negatives 100 (Figs. 2 and 3) may be supported on a platform 101 carried on a vertical stem 102. The stack 100 is normally urged upward by weights 103 suspended by cords 104 trained over pulleys 105.

Adjacent the negative stack and supported on the frame 57 is a pedestal 106 in which is slidably carried a head 107 having a hollow horizontal extension 108, at the extreme end of which is provided a downwardly facing suction head 109. The head 107 is hollowed for an extension 110 of a suction line 111. The extension 110 is supported in a block 112 which is spaced from the top of the pedestal by bolts 113. The block also serves as an abutment for the coil spring 114.

Suction is applied to the head 109 by a pump 115 having a reciprocating piston 116 driven by a connecting rod 117 pivoted to the crankplate 118 on the shaft 56. See Figs. 3 and 4. The suction line 111 is connected to the head of the pump 115. A lever 119 is pivoted at 120 and its lower end is provided with a roller to engage the cam portion 121 on the crank plate 118. The upper end of the lever 119 carries a valve rod 122 sliding in a horizontal opening 123 in the pump head. A vertical opening 124 intersects the horizontal opening 123 and connects the inside of the pump cylinder with the atmosphere. Normally the valve 122 is held in a retracted position by a spring 125. As the shaft 56 is constantly rotating, suction is applied to the head 109 through the horizontal arm 108, head 107 pipe 110 and 111 by the downward movement of the piston 116.

On a fixed rod 126 mounted between the walls of the frame 57 are a number of levers. One of these 145 (Figs. 1 and 6) having a roller 146 coacting with the edge of a disc 147 is formed with a curved portion 148, which when the shaft 56 is shifted endwise (as before explained), is raised by the rollers 149, tilting the upper end of the lever, which has a roller 150 against the arm 151 pivoted at 152. A forked angular extension 153 is slotted at 154 for engagement with blocks 155 mounted on the collar 156 of the vertical rod 141. Movement of the lever 145, rocks arm 151 around its pivot 152, throwing the extension 153 upward and through the blocks 155 and collar 156 elevates the rod 141, head 107 and suction head 109 against the coil spring 114.

Another lever 127 (Figs. 1 and 8) has on its lower heavier extension a roller 128, which ordinarily rides on the edge of the disc 129. A curved shoe 130 is also affixed to the lever 127 and the lower portion of the lever is curved at 131, so as to form an arcuate channel between itself and the shoe 130. When the shaft 56 is shifted endwise a roller 132 on the face of the disc 129 will be moved into the path of the channel, and rotation of the disc in the direction of the arrow will move the upper portion 133 of the lever 127 into the position shown in Fig. 8.

The upper end of this lever is slotted as at 134 to engage with a pin 135 of a rack 136. The rack abuts a slide 136a provided with a pin 137 to engage with the slotted end of a short lever 138 on the shaft 139. A gear 140 is mounted to rotate with the vertical rod 141 in the pedestal 106 and yet permit the rod to be moved upwardly. Movement of the rack rotates the gear 140 through an arm of 90° and through the rod 141, which is fixed to the head 107, swings the suction head 109 to and from a position over the negative stack 100 and a hopper 142 leading to the back portion 143 of the camera 144, (as shown in Fig. 7).

Figure 14:
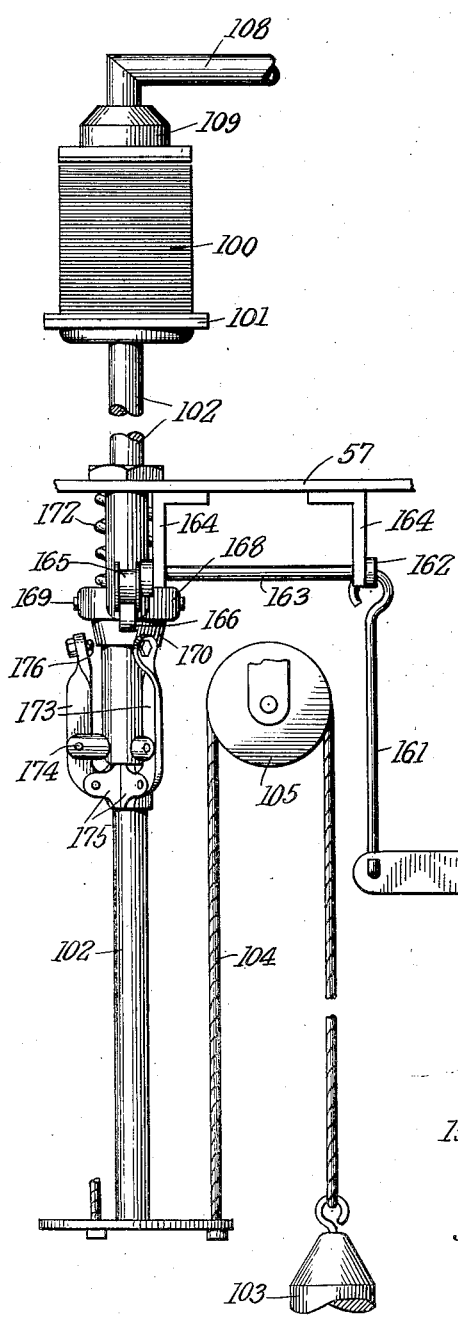
Fig. 14 is a broken side elevation of the film stack raising mechanism.
Figure 15:
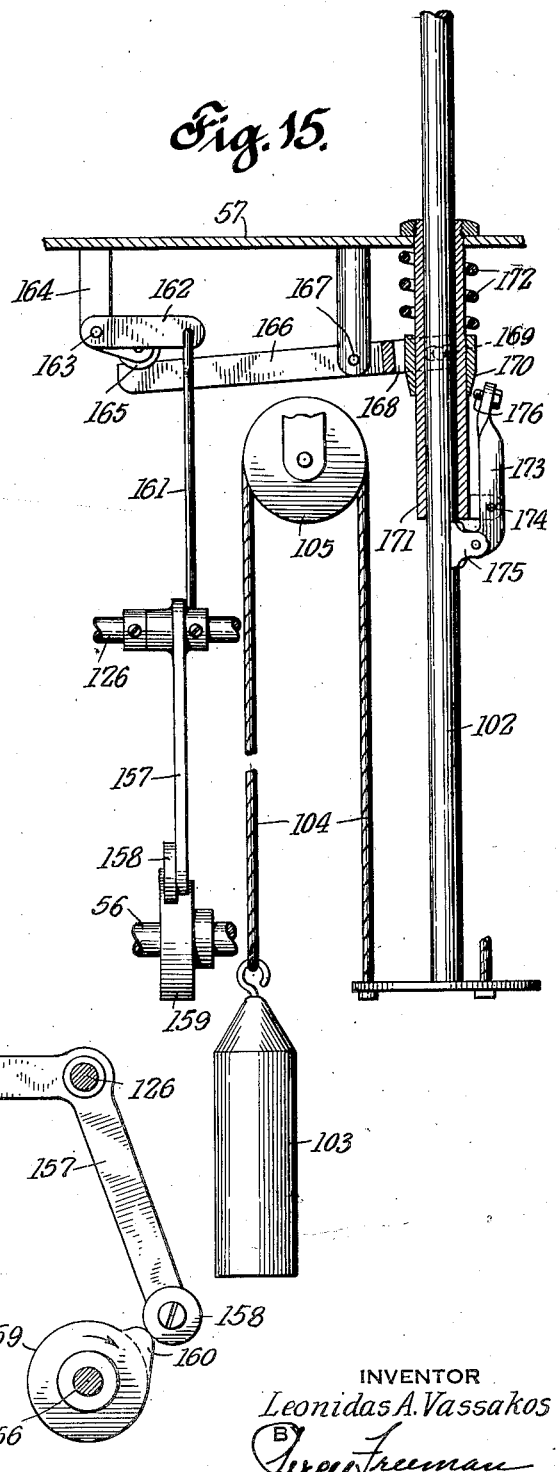
Fig. 15 is a broken front view of Fig. 14 partly in section.

A bellcrank lever 157 (Figs. 1, 14 and 15) also mounted to rock on the rod 126, has at its lower end a roller 158 which normally engages the circular periphery of a cam disc 159, but when the shaft 56 is shifted endwise the cam lug 160 engages the roller 158 causing a pull on the link 161 which is transmitted to the arm 162 mounted on the pivot rod 163 carried in brackets 164. The other end of the pivot rod has an arm with a roller 165 which acts against the end of a long lever 166 fulcrumed at 167. Beyond the fulcrum the shorter formed end 168 of the lever 166 is slotted to engage pins 169 in a tapered collar 170 sliding on the tube 171 in which moves the vertical stem 102 supporting the film pack 100. A spring 172 is mounted around the tube 171 and between the frame 57 and the collar 170. A plurality of arms 173 are pivoted to the tube at 174 having shoe members 175 at one end to engage the stem 102 and at the other adjustable projection 176 for engagement with the tapered collar 170. Movement of the bellcrank 157 caused by the cam lug 160 will raise the collar 170 out of engagement with the projections 176 on the arms 173, easing the pressure of the shoes 175 on the rod 102 and permitting the weights 103 to raise the stem 102, pressing the film stack 100 against the under face of the suction head 109. In this manner the top of the film stack maintains a fixed relation with the suction head. As the cam lug 160 rides by the roller 158 the spring 172 forces the collar 170 down into engagement between the projections 176 and again causing the shoes 175 to grip the stem 102.

From the foregoing it can be seen that the shaft 56 is normally in constant rotation and held by the spring 87 in a position towards the left as viewed in Fig. 1. Insertion of a coin in the drop 67 will cause the shaft 56 to shift to the right, closing the valve 122. The suction head 109 will then move upward, and as the piston 116 is on the downward or suction stroke in the cylinder 115, it will raise the topmost film with it. The suction head 109 will then swing through an arm of 90° over the hopper 142 of the camera and as the cam portion 121 on the pump crank plate has then passed by the roller on the lever 119, the valve 122 will be retracted, opening the cylinder to atmosphere, breaking the suction in the line 111 and permitting the negative to drop from the suction head 109 into the camera hopper 142.

The suction head will then return to a position over the stack 100 and will drop until the shoulder 107a on the head 107 will rest on the top of the pedestal 106. The shoes 175 will be released from the stem 102 and the weights 103 will raise the stack against the head 109. A short time thereafter the shoes 175 will again grip the stem 102 so as to prevent the stack from moving upwardly with the suction head.

The pin 98a will have reached the arm 99a and will cause the bell to ring as a signal to the subject to be photographed. (see Fig. 9.)

Immediately preceding the upward movement of the suction head 109, the shaft 177 is rocked by the lever 89 and an arm 178 on the shaft pulls the wire link 179. The upper end of the wire link is attached to one arm of a bellcrank lever 180, the weighted end 181 of the other resting on the film stack 100. A contact point 182 is provided on the lever to coact with a fixed contact 183 on the pedestal.

The suction head 109 is notched at 109a to permit the weighted end 181 of the lever 180 to rest on the stack. When the wire 179 is pulled the end 181 will be lifted from the stack and so allow the suction head to move up with the topmost negative. When the head returns to a position over the stack and the shaft 56 returns to its non-operating position, the end 181 will again drop onto the top of the stack (the stack being kept at a constant level).

When the stack has become depleted, the end 181 of the lever 180 will drop through the notch 101a, making contact between points 182 and 183 closing an electrical buzzer circuit, giving an audible signal that the film stack needs replenishing.

*Mechanical camera*

The mechanical camera is arranged to receive a blank negative film or plate and expose it either vertically or horizontally. It can be properly focused. The shutter is automatically and pneumatically operated simultaneously with the lighting of flood lights and the exposed negative is then automatically dropped from the camera onto a unit conveying it to the developing tanks.

Referring now to Figs. 1, 5, 16 to 19, 21 to 26 when the negative is dropped from the suction head 109 into the camera hopper 142, a pin 200 tips the negative so it will fall into the back portion 143, of the camera, in an upright position, the narrow sides being at the top and bottom. It comes to rest in the circular frame 201 having a rectangular opening 202 with pins 203 forming a rest for the film.

At the right end of the shaft 56 is affixed the disc 83 (Figs. 5 and 19) provided with roller 204. As the shaft 56 is shifted endwise the roller will come into the path of the depending arm 205 of a bellcrank lever 206 pivoted at 207, and depress the link slide 208. The upper end of the slide is slotted at 209 and is provided with a pin 210. A subslide 211 is carried by the link slide and is provided with a slot 229. The subslide is equipped with a latch 212 engageable with a notch 213 in the link slide. A manual control rod 214, is attached to the latch 212. A compression spring 215 is arranged between the two slides. The control rod is attached by means of a lever 264 to an operating handle 265 and is weighted as at 266.

Normally, the slides 208 and 211 are in the position shown in Figs. 25 and 26, i. e., with the top of the subslide 211 held against the pin 210 on the link slide 208 by the spring 215. Now as the horizontal arm of the bellcrank lever 206 moves downward, the top of the link slide will free the arm 216 pivoted at 217 and the spring 218 (see Fig. 21) will move the fork 219 in the spool on the stem 220 from the position shown in Fig. 17 to the one shown in Fig. 19. A plate 221 attached to the stem will then clamp the negative between itself and the front of the frame 201.

The rack 136 having been moved to swing the suction head 109 to its delivery position, the slide 136a has placed the arm 138 in the position shown in Fig. 21 and through linkage 240 and rock shaft 224, the arm 223 will be placed in the position shown in Fig. 22. Further downward movement of the slides 208 and 211 will cause the roller 222 on the slide 208, to rock the arm 223 and arm 138 fulcrumed at 224. Another arm 225 (Figs. 16, 17 and 19), carried on this fulcrum is provided with a pin to engage a slide cam 226, the downward movement of which retracts the roller 227 and so also the pins 203 against the tension springs 228.

When the arm 223 is rocked by the roller 222, the arm 138 will assume a position with its pin 137 in the right hand end of the slot shown in Fig. 21, the slide 136a moving with it. This is permitted because the rack 136 has been previously retracted. Now the arm 223 may be reset and pins 203 again placed to intercept the falling film at a time just previous to the delivery of a negative to the camera by the end of the rack pushing against the slide 136a.

The tops of the slots 209 and 229 in the slides 208 and 211 respectively are long enough to permit full downward movement of the slides without causing movement of the pin 230 attached to the rack plate 231 and so no rotation is imparted to the mutilated gear 232 fixed with the plate 221. The negative will therefore remain in its original vertical position in the camera.

Should a horizontal exposure of the negative be desired, a rod 243b attached to the lower end of the depending arm 243a is pushed by the operator. The finger 243 on the same pivot acts to compress the spring 215 moving the subslide 211 down so that the latch 212 carried with it, finds the notch 213 in the slides moved downward. The same initial operations, such as clamping the negative between the frame 201 and plate 221 and retracting the pins 203, will occur, but the top of slot 229 in slide 211 now being lowered, the rack plate 231, through the pins 230 will move downward rotating the gear 232 and so turn the plate 221, frame 201 and the negative, 90° as seen in Fig. 24.

The latch 212 is attached to a wire link 214, which is connected at its other end to an arm 264 secured to the handle 265 and counterweighted at 266. This counterweight is arranged so that the latch 212 is maintained in the notch 213. Should the operator, after setting the camera for a horizontal exposure, decide for a vertical one, a pull on the handle 265 will remove the latch from the slot and permit the spring 215 to again elevate the subslide 211 to its original position.

If the camera has been arranged for a horizontal exposure, the final downward movement of the slides 208 and 211 will bring the latch 212 opposite the fixed cam shoe 143a which will rock the latch out of the slot 213 and the subslide will return to its original position with its notched top portion against the pin 210, the negative remaining in its horizontal position.

Simultaneously with this action of caring for the negative in the camera, an extension of the bellcrank 206 through a link 233, actuates a bellcrank lever 234, and pulls through springs 235, on a depending lug 236 of the camera slide 237. The levers 240 having been manually set by the radial movement around rod 238 the stop member 239 carried on the levers will be in the path of one of the pins 241, the pull of the springs 235 will extend the camera front and lens 242 until a pin abuts the stop 239. As the pins 241 are of varying lengths, the desired focus may be attained. One of the levers 240 is a bellcrank and has attached to its free end a rod 240a accessible from outside for focus adjustment.

Now that the negative is in the camera and is properly focused, it is ready to be exposed. The disc 83 is provided on its periphery with a tooth 243 which rocks one arm of a three-armed lever 244 pivoted at 245. Through a link 246 a bellcrank lever 247 moves about its fulcrum 248. The lever 247 has attached to it a link 249 moving one member 250 of an electric switch. Another link 251 attached to the lever 247 actuates a piston 252 in the cylinder 253. From the head of the cylinder, a flexible tubular connection 254 is made to another cylinder 255 in which is a piston 256 having a connecting link 257 to the shutter lever 258.

In this way as the lever 247 is moved, the switch is closed operating a flood light circuit, suction of the piston 253 caused a pull on the piston 256, operating the camera shutter 259. As the tooth 243 frees itself from the lever 244, the torsional spring 245a, will immediately open the flood light switch 250 and return the shutter operating pistons to their original positions.

As the roller 204 continues on its circular path it will free itself from the arm 205, the torsional spring 260 on the pivot 207 will move the arm 206 back to the position shown in Fig. 5, the push rod 261 will return the lens of the camera to its retracted position, the slides 209 and 211 will move upwardly and if the camera frame has been rotated for a horizontal exposure, the lower end of the slot 209 will raise the rack 231 to again place the negative in a vertical position, and the top of the slide 208 will act against the arm 216 to remove the clamping action of the plate 221, on the negative, permitting the negative to drop from the camera to an opening 262 onto a chute 263.

The flood light switch having one moveable member 250 has another arm 267 which by means of a spring 268 is held against a pin 269 on the manually adjustable plate 270. Adjustment of the switch arm 267 determines the length of time the flood lights will be on.

It will be noted that the back of the camera remains permanently stationary and that all focusing is accomplished by moving the front or lens carrying end by extending and retracting the bellows.

*Negative transfer unit*

When the negative film or plate has been dropped from the camera after exposure, it becomes necessary to transfer it to the negative developing tanks. To this end, a chain and a sprocket drive 275 is taken off the shaft 54 to rotate a cam plate 276 which is provided with a pin 277 and a cam portion 278. A spring tensioned, depending arm 279 pivoted at 280 is held against a stop 281 and is provided with an extending toe portion 282 to coact with the pin 277 and a roller 283 for engagement with the cam 278. An offset lug 284 and tooth 285 are also provided on the arm 279.

Figure 27:
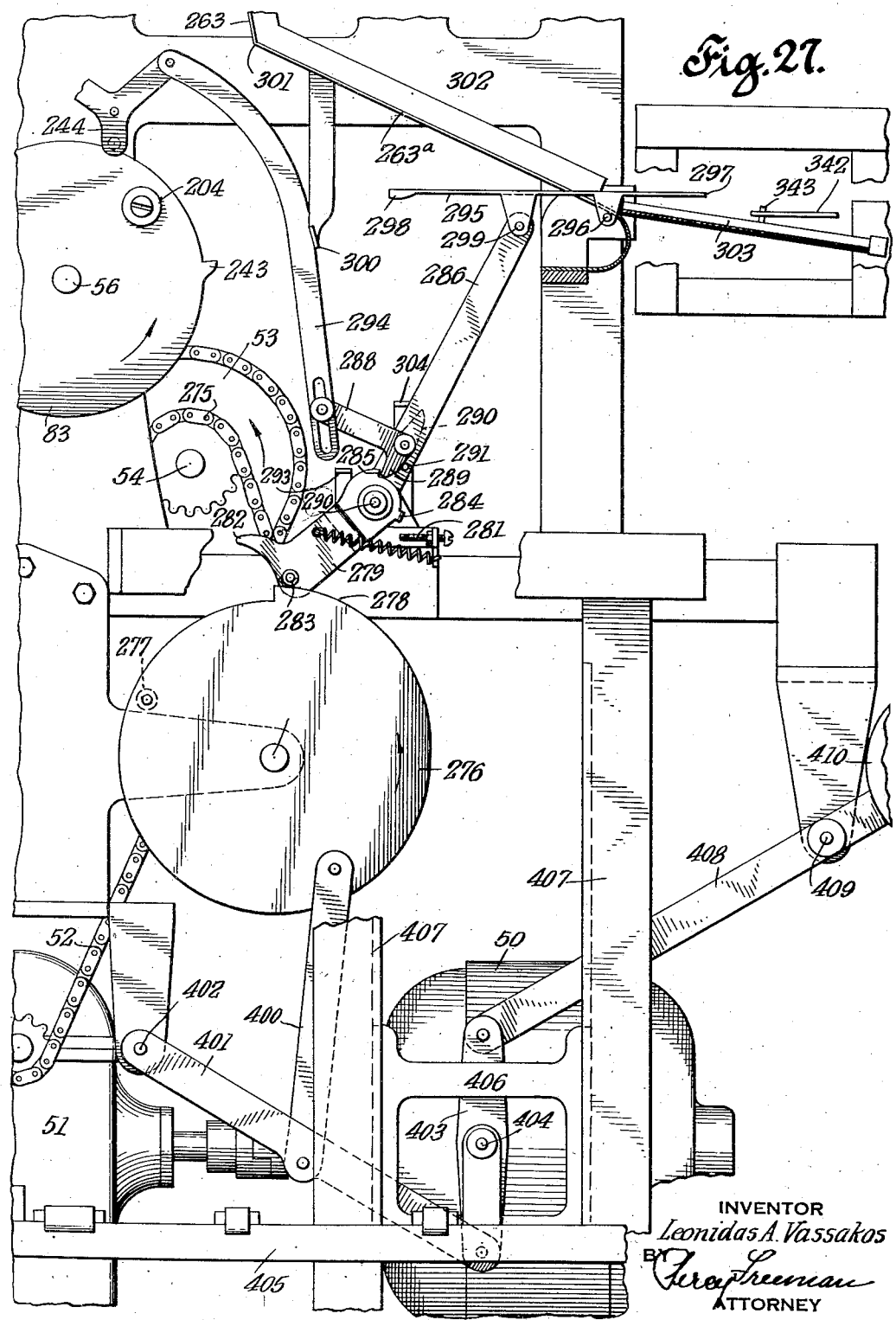
Fig. 27 is a side elevational view of the exposed film delivery mechanism and also showing the motor drive and speed reducer. A portion of the elevator mechanism for the film developing baths is also shown.

Mounted on the same center with the arm 279 Figs. 19, 20 and 27, is a long offset lever 286 having frictionally pivoted at 287 a bellcrank 288 with a depending arm 289 and a dog 290, the lever 286 having a stop 291. The lever 288 and dog 290 are yieldingly held together by a spring 292. (See Fig. 20). A fixed stop lug 293 is used to position the lever 286 in its "at rest" position.

Pivoted to the upper end of the lever 286 is a pusher member, 295 having a cross pin 296 and pusher fingers 297 arranged to operate through slot openings 263a in a chute 263. The portion of the pusher member at the end away from the pusher fingers is weighted at 298.

When the three armed lever 244 is rocked by the tooth 243 the slotted link 294 is depressed from the position shown in Fig. 5 to the one shown in Fig. 19, rocking the arm 289 so it will be in the path of the tooth 285 when the pin 277 raises the toe 282 of the arm 279. The lever 286 will then be moved toward the right and the pusher fingers 297 in a sharp arc around the pivot 299, being impelled in this direction by the weighted end 298 being raised when contacting with the abutment 300. This movement of the pusher fingers is necessary to dislodge a negative dropped from the camera that may come to rest at the point 301 of the chute instead of falling so as to lie flat in the portion 302.

As the pin 277 rides by the toe 282 all the parts acted upon will return to their original position but immediately thereafter the cam portion 278 will engage the roller 283 and all the members last moved will again be swung to the right, but this time to assume the position shown in Fig. 27, moving the negative from the chute 302 onto supporting members 303, as the cam gradually frees the roller 283 permitting the arm 279 to swing back under the tension of its spring, the lug 284 will pick up the lever 286, moving it towards the left. The dog 290 will abut the member 304 and rock the arm 289 out of the path of the tooth 285. This prevents movement of these members by the continuous rotation of the disc 276 until a coin has again been inserted in the coin drop. As the lever 286 is moved to the left the weighted end 298 of the pusher member will cause the pin 296 to ride under the chute 302 until the weighted end is beyond the abutment 300 and as the pin 296 comes away from the chute the pusher member 295 will again resume the position shown in Fig. 5.

Referring now to Figs. 16, 28 to 41, the negative has now come to rest on the supports 303 with the leading narrow edge between the open jaws of the negative carrier 305.

It will be remembered that when the shaft 56 is moved endwise the forked member 89 is moved to rock the shaft 177. An arm 306 is attached to this shaft and on the end of the arm is pivotally one end of the link 307, the other end being attached midway of an arm 308. Pivoted to the upper end of the arm 308 is a short link 309, resiliently held by a spiral spring 310. Fig. 37. The link 309 is provided with a roller 311.

Referring back to Figs. 1, 2 and 4, the shaft 54 is provided with a bevel gear 312 meshing with another gear 313 on the shaft 314. A crank plate 315 is provided at the other end of the shaft. A connecting link 316 is attached at one end to the crankplate and at the other to a swinging arm 317, pivoted at 318. The upper end of the arm is provided with a horizontal lever 319 pivoted at 320 with a pin 321 pivotally mounted at one end of the lever. A spring tensioned cam arm 322 is also provided on the arm 317.

Between the uprights of a frame 323 is arranged a slide bar 324 for a carriage 325. To the top of the carriage is secured a cam chute 326 and on both sides are pivoted links 327, the hooked ends of which serve to support the hanger rod portions 328 of the carriers 305. One of the links is forked to engage a pin on the vertical rod 329 at the upper end of which is a resiliently pivoted dog 330. The carriage is also provided on its face with an abutment and a stud 341.

At the right as viewed in Figs. 28, 31 and 37 and supported from the frame 323 is an inreaching platform 332 formed with a slideway 333. Pivoted to and under the platform is a cam arm 334 to which is secured the arm 335, which through a connecting link 336 is connected with a similar arm 337 which in turn is pinned with the lever 338. See Figs. 28, 32, 34, 35 and 37. In the slideway 333 is a main slide 339 and a subslide 340. To the main slide is attached a pair of links 342, the ends of each being engaged over divergently arranged pins 343 in the supporting members 303. These members are mounted for rotation in trunnions 344. Another pair of shorter links 345 are attached substantially midway of each of the links 342 and to the subslide 340.

Pivoted to a post on the main slide is a slotted link 346 engaging with a bellcrank lever 347 mounted for rotation on the platform 332. A pin in the bellcrank engages with a slotted lever 348 carried by the pressure lever 349. The bellcrank 347 is at all times held under tension by the helical spring 350.

A setting cam 351 is fulcrumed to a portion of the frame 323 and is provided with a depending leg 352, a notch 353 and two angular faces 354 and 355. The cam is normally held against a stop pin by a spring 356. Also fulcrumed in the frame is a latch 357 resiliently held with a releasing arm 358. Fig. 37. A projection 359 is provided on the carriage 325 for engagement with the releasing arm 358. A tripping lug 360 is provided for the cam arm 322 and cam chute 361 is arranged to engage the horizontal lever 319 for retracting the pin 321.

The swinging arm 317 is provided with a lug 362 which serves to raise the arm 363. The arm 364 in turn acts against rod 329 on the carriage to release the carrier from carriage 325 and permits the carrier to drop onto the fingers 369. The upper end of the arm is connected by a link 367 to a weighted releasing arm 368 which has releasing fingers 369 at each end of a supporting shaft 370. The releasing fingers are each adjacent to guided carrier drops 371. As seen in Fig. 37, when the carriage 325 is moved to its extreme left position, its face prevents movement of the offset lever 365 around its pivot and in this way permitting the supporting fingers 369 to support the carrier when released by the tilting of the levers 327 on the carriage. This momentary resting of the carriers on the fingers allows a short interval, so that any swing action of the carrier end of negative may cease. When the carriage starts its return toward the right, the offset lever 365 is freed and the weight of the carrier is sufficient to overbalance the counterweight 368a permitting the carrier to fall through the carrier drops 371.

A negative carrier magazine 372 is provided with escapement slots 373 and escapement pawls 374 one of which is acted on by the dog 330 on the vertical stem 329. The top of the vertical stem is engaged by a spring pressed pin 375 carried by the frame 323. The carriage 325 is provided on both sides and directly under the supporting levers 327 with inclined members 376 forming a runway for the hanger rod portions of the carriers 305. A cross bar 377 serves to support the clamping end of the empty carriers and an inclined plate 378 is used to support them while still in the magazine.

In operation the negative has been impelled to a position on the inreaching ledges of the supporting members 303 with its ends between the open jaws of the carrier 305 (Fig. 34). The slide 339 being in the position shown in Figs. 30 and 32, the toe of the bellcrank 347 is pressing against the pressure lever 349 the end of which in turn holds the jaws of the carrier open.

Constant rotation of the crank plate 315 due to its direct gearing with the shaft 54, causes the swinging arm 317 to continually swing in an arc as shown by the arrows in Fig. 16. The carriage 325 is to the right and the setting cam 351 is against its stop pin with the resiliently held arm 309 in its lowermost position. As the arm 317 swings free from side to side the pin 321 is retained in retracted position. At the completion of its swing to the right the cam arm 322 is tripped by the lug 360, but as the face of the setting cam prevents the pin 321 from getting in behind the abutment 331 of the slide, the end of the pin will ride on the faces of the setting cam and the carriage on its return movement, the pin being held in its retracted position when the spring tensioned cam arm 322 moves away from tripping lug 360 and gets behind the end of lever 319. This will be repeated as long as the setting cam is maintained in this position. With the parts in this relation and with the arm swinging from side to side no movement is effected in the film transfer unit.

When the shaft 56 is shifted endwise (as before explained) moving the forked lever 89 from the position shown in Fig. 28 towards the left, the arm 306, link 307 and arm 308 will swing the resiliently held arm 309 upwardly so it will cam behind the leg 352 of the setting cam. When the shaft 56 is reshifted to its normal or non-operating position, the arm 309 will engage the leg of the setting cam 351 and rock it so it is caught by the latch 357. (Fig. 31.)

Now when the swinging arm 317 arrives at its right hand position, the pin 321 will be permitted to fall in under the angular face 354 of the setting cam. As the arm now swings back towards the left, the pin 321 will act against the face 354 to further tilt the setting cam. The angular face 355 will then engage the cam arm 334 and through arm 335 retract the slide 339. Movement of the slide which carries the slotted link 346 will rock the bellcrank 347 against the pull of the spring 350, lifting the pressure lever 349 and permitting the jaws of the carrier 305 to grip the film.

Simultaneously, the links 342 will be moved by the slide 339 to rock the supporting members 303 from the position shown in Fig. 33 to the one shown in Fig. 36, and as movement of the arm 335 has been transmitted to the carrier supporting lever 338, that is, swinging it from under the carrier, the film and carrier will drop so as to hang by its rod 328 from the hooked ends of the links 327 on the carriage 325. The foregoing may clearly be seen in Figs. 29 and 30.

As the pin 321 rides by the angular face 354 of the setting cam, it will engage the abutment 331 of the carriage 325, Fig. 28, and move it with the carrier and film towards the left. At the extreme end of this movement, the lug 362 on the swinging arm will rock the cam lever 363 to raise the arm 364. The vertical stem 329 carried by the carriage now being in a position directly between the arm 364 and the spring pressed rod 375, it will be raised against this spring tension. The carrier supporting links 327 will be rocked to permit the carrier rod to drop from their hooked ends onto the inclines 376 and so come to rest on the fingers 369 at the mouth of the carrier drops 371.

With the arm towards the left (Fig. 37), the cam shoe 361 presses against the end 319a of the lever 319, raises the pin end of the lever so as to leave the carriage there and permit the cam arm 322 to get between the lever 319 and the face of the arm 317 and so holding the pin 321 in a retracted position when the arm starts its swing towards the right.

The upward movement of the stem 329 also allows the dog 330 to get above the tail of one of the escapement pawls 374, Figs. 38 and 39, and as they are both carried by the same cross shaft, when the swinging arm again starts towards the right, freeing the angle lever 365, the dog 330 will rock their escapement ends up, pushing the lowermost carrier in the magazine back into the escapement slot 373.

This upward movement of the escapement pawls is sufficient to entirely free the escapement slot and so allow the rod of an empty carrier to again fall into the hooked ends of the links 327. The other carriers in the magazine being prevented from following by the escapement pawl.

As the swinging arm continues its motion to the right, it will engage the stud 341 on the carriage and so move the carriage with it carrying the empty negative carrier. The dog 330 now being disengaged from the tail of the escapement pawl the carriers in the magazine will drop so the lowermost one is opposite the escapement slot.

Just prior to the end of this movement to the right of the slide, the projection 359 will engage the releasing arm 358, Fig. 37, to rock the latch 357 out of the notch 353, permitting the setting cam to recover its position against its stop pin. The pin 321 being maintained in retracted position by the cam arm 322 and though the stop lug 360 momentarily moves the cam arm from this position, the alinement of the face 354 of the setting cam with the face of the carriage prevents the pin 321 from engaging the abutment 331 thus permitting the arm 317 to swing free of the carriage which is therefore left in this position at the right and maintained so by the cam shoe 326 getting behind the pressure lever 349. During the movement to the right the gripping portion of the carrier was guided first on the cross bar 377 and then on portions 377a (Fig. 34) until it came to rest on the arm 338 which had again been put in this position by the release of the setting cam. The toe of the pressure lever 349 is held in a raised position by the cam shoe 326 on the top of the slide, allowing the carrier to assume its position. The final movement of the carriage moves the cam shoe 326 to a point beyond the pressure lever permitting the spring 350 Fig. 30 to pull on the bellcrank 347 and again act on the pressure lever to open the gripping jaws of the empty carrier which is now in position to receive the next exposed film. This downward movement of the pressure lever 349 getting behind the cam shoe 326 prevents the slide 325 from movement towards the left until the tilting of the setting cam again raises the pressure lever.

*Negative developer*

The next step in the handling of the exposed negative, is to route it through, developing, fixing and washing tanks and to separate the negative and its carrier; returning the carrier to the carrier magazine and depositing the developed negative in the printer.

Referring now to Figs. 5, 27 and 42, a connecting rod 400 attached to the crankplate 276 is connected midway of a link 401 pivoted at 402 to a bracket of the main frame. The link 401 at its other end is attached to a walking beam 403 pivoted at 404 on an elevator bar 405 provided with an elevator block 406 and guided in vertical runways 407. The other end of the walking beam is pivoted to a lever 408 which is pivoted to a fixed bracket at 409 and counter-balanced at 410.

As the shaft 54 is continually rotating and so driving the cam plate 276, the elevator bar 405 is continually being raised and lowered from its approximately low position in Fig. 27, to its substantially high position in Fig. 5.

It will be remembered that the negative carrier 305 was released so as to fall down the carrier drops 371. Referring now to Figs. 42 and 57, at the bottom of the drops are arranged a pair of spaced screw conveyors 411 mounted on the frames 412. At one end of the elevator bar 405 is a projecting pin 413, engageable with the hooked portion of a member 414 (Figs. 42 and 47) which when disengaged from the pin 413 is supported by a hanger pin 415. The member 414 is pivoted to the longer arm 416 of a bellcrank fulcrumed at 417. The shorter arm 418 of the bellcrank connects with a pawl link 419 which at its other end is pivoted to a pawl crank 420 on the center 421. The pawl crank carries a pawl 422 engageable with a ratchet 423. On the same center and rotatable with the ratchet is a spur gear 424. This gear is in mesh with a small spur 425 attached to and rotatable with another gear 426. A similar gear 427 is in mesh with the gear 426 and each in turn is meshed with two smaller pinions 428 on the ends of the screw conveyors 411. Overlying the face of the ratchet is an arcuate member 429 mounted on the center 421 and to which is affixed an arm 430 pivoted to a link 431. The other end of this link is connected to a sector disc 432 having a scalloped edge for a spring detent 433.

It is quite apparent from the foregoing that as the elevator bar 405 moves up, the pin 413 will engage the hook on the member 414 and rock the bell crank around the pivot 417. The pawl will drive the ratchet rotating the gear train and so the screws 411. As the screws are rotated in opposite directions, their pitches are opposite. Properly positioning the scallop-edges disc determines the location of the edge of arcuate member 429, and although the pawl at all times makes the same stroke, it will drive the ratchet only after leaving the arcuate member and engaging the ratchet teeth.

At the opposite end of the elevator bar is another pin 413a arranged to operate on exactly similar ratchet and gear train to the one just described and to rotate screw conveyors 434. Fig. 49 indicates the point at which the two pairs of conveyors adjoin at 434a.

Pivoted to a longitudinal member of the frame at 452 is a bellcrank lever 453 to the shorter arm of which is pivoted a tray 454, supporting the four bath tanks, namely developing 455, fixing 456, first washing 457, drying liquid 458. The tray is normally held in a raised position (Fig. 44) by engaging the end 453a under a lever 459 which in turn is held under a stop 460. A projection 461 on one end of the tray is in the path of a block 462 of the bell crank 418a. As the elevator bar moves up and down the block 462 will strike the projection 461 on the tray, causing the tray to tilt on its pivot and so keeping the liquids in the tanks in constant agitation. As the distribution of the weight on the tray is arranged so that one end is normally in contact with the pin 462a, it will assume a horizontal position when the block 462 moves up.

A bellcrank 435 pivoted to the frame has its upstanding forked arm engaged with a trip slide 436. A link 437 is pivoted to the other arm of the bellcrank and a coil spring 438 serves to hold the trip slide to its normal position as in Figs. 42 and 50 in one instance and to hold it in the moved position in Fig. 49 in the other. Locking lever 439 is pivoted to the frame and has one arm engaged with the link 437 while the other serves to prevent the detent 440 from engaging under the block 441 on the negative lifter 442. Also pivoted on the frame and engaged with the link 437 is a lever 443 having a finger 444 engaged by a block 445 on the negative lifter. A fixed wiper 446 is arranged across the machine and another pivoted wiper 447 is aligned with it and moved towards it by the release of the lever 448 during the upward movement of the negative lifter, through links 449, 450 and spring 451.

The negative lifter 442 is provided with a horizontal cross arm 463 having a short downturned leg 464 and on the inside near its upper end and to the inside of the leg 464 are fixed elevator channels 465. The negative lifter is guided in a track 466 secured to the frame.

Taking the apparatus as thus far described the negative carrier 305 with an exposed negative, when dropped from the negative transfer unit will come to rest on the conveyors 411 with the ends of the hanger bar 328 laying in the grooves of the screw threads. Each time the elevator moves up the carrier will be advanced along the screw, the negative meanwhile being immersed in the developing bath the agitation of which insures proper contact of the liquid with the negative. It may be mentioned here that this pair of conveyors is separately driven and at a rate of speed which may be adjusted and controlled depending upon the time of exposure of negative and strength of chemicals, and result desired. The hanger bar 328 of the carrier will eventually engage the slide 436 to rock bellcrank 435. The end of the spring 438 attached to the bellcrank will snap past a line drawn through its anchor point and the bellcrank pivot and quickly remove the locking lever 439 from the edge of detent 440 on the elevator bar. Now as the elevator bar moves upward the detent will engage under the block 441 and raise the lifter 442. The ends of the negative carrier hanger rods 328 being now engaged in the elevator channels 465, the carrier and negative will be raised to a position shown in Fig. 50. As the block 445 moves upward and frees the lever 448, the spring 451 will depress the link 450 and move the wiper 447 to contact with the fixed wiper 446 as the negative goes by. In this manner excessive moisture on film is squeezed back into the tank. The top of the block 445 will then engage the finger 444 to return the slide 436 to its previous position and to move the levers 439 so they assume the position shown in Fig. 50 so that when the elevator bar and negative lifter move down again they may regain their normal position as in Fig. 42.

A pair of arms 467, one of which as actuated by a link 468 and tensioned by a spring 469, oscillate a bar 470 carrying shifting members 471, 471a and 471b. When the negative is raised from the first bath, the shifting member 471 is in the position shown in Fig. 43 and when the bar 470 is moved in the direction of the arrow, the shifter will slide the negative carrier from a position directly behind the negative lifter 442 to the enlargements 465a in the channels 465 as shown in Fig. 50.

Now when the negative lifter moves down, the negative will be immersed in the second or fixing bath 456 and the carrier rod 328 is resting on the screw conveyors 434. It will be advanced along these conveyors by the rise and fall of the pin 413a on the elevator bar until a slide 436a actuates mechanism similar to that which is actuated by the slide 436, and so the shifter 471a will slide the film and carrier so it may be immersed in the washing bath 457. The conveyors 434 will again advance the negative through this bath, the negative will again be lifted and the shifter 471b will then place it in a position to be immersed in the final drying bath 458, where it will be advanced by the screws 434. The mechanism for lifting the negative from this final tank is different from the other three in so far as it is necessary to raise the negative and carrier to a much higher point than hitherto.

The negative lifter at this point consists of a plate 471' moving in a guide 472. (Figs. 42-43). A pinion 473 (Fig. 54) carried on the lifting plate meshes with a fixed rack 474 and with an elevator rack 475 attached with an elevator plate 476 having a horizontal cross arm 477 similar to 463 and elevator channels 478 similar to 465 but without the enlarged sockets 465a. The lifting plate 471' is provided with a projecting roller 479 and the cross arm has projecting roller 480.

When the lifting plate 471' (Fig. 42) is in its lowermost position the roller 479 serves to position a dog 481 pivoted to a lever 482 and held under tension by a spring 483. Another spring 484 serves to tension the lever 482 to which is pivoted a slotted link 485 retained by a pin 486. The elevator bar 405 is provided with a projector 487 which coacts with a pin on the dog 481. The functions for these elements will be later described.

A short distance above the lever 482 is fulcrumed an arm 488 (Fig. 43) with its finger in the path of the roller 479 and engaged with a long vertical link 489 connected with the straight arm of a bellcrank 490 pivoted at 491, (Figs. 43 and 56).

A short link 492 fulcrumed at 493 is connected to the end of a carrier opening lever 494 to a mid point of which is also pivoted the curved arm of the bellcrank 490. Above the arm 488 is pivoted another and slightly longer arm 495, its end also in the path of the roller 479, with a pin slot and spring connection with the lower end of an upright link 496, the other end of which is pivoted to an arm 497 which is attached by shaft 498 to a pair of arms 499 having pusher members 500.

The roller 480 in its lowermost position (Fig. 48) retains the long-fingered lever 501 pivoted at 502 and having notch 503, the other arm of this lever being pivotally attached to one end of a bowed link 504. A spring engagement is provided for this lever and link 505. The upper end of the bowed link is connected with one arm of a bellcrank 506 pivoted at 507 and the other arm has an abutting roller 508.

Located at a point above the pivot 502 (Figs. 51 and 52) and pivoted at 509 is an arm 510 having a resiliently held finger 511 at one end and in the path of the roller 480 and linked at 512 at the other to a bellcrank 513 pivoted at 514. A link 515 connects the bellcrank with a slide 516 guided at 517. On the slide is a support 518 to which is resiliently pivoted a plate 520 and a curved arm 519, contactable with the roller 508.

On the oscillating bar 470 (Figs. 43, 51, 52, 53, 54 and 55) is carried a lateral arm 521 having an upstanding portion 522, the upper end of which is provided with a projecting slide 523 connected by a link 524 to an elevating lever 525 mounted at 526 on the lateral bar 521.

Pivoted at 527 are ejecting arms 528 and at 529 is provided a cross member carrying inreaching support arms 530, provided with carrier rod positioning springs 530a having humps 530b which serve to position and retain the carriers in alinement with the active face of the cross member 529.

With one end supported by a lug 531 (Fig. 43) and arranged on a decline is an empty negative carrier return chute 532 supporting a rest plate 533. Two upstanding members 534 (one not shown), carry links 535 which cradle the pusher link support 536 having a number of pusher links 537. A link 538 is connected at one end to the support 536 and at the other to a bellcrank 539 pivoted at 540. The other end of the bellcrank is pivoted to a short link 541 connected to bar 470.

It will be remembered that the negative is now in its last bath 458. As the locking lever 439d removed from contact with the detent 440d by the movement of the slide 436d, the lifting plate 471' will move up carrying the roller 479. Due to the pinion and rack gearing (Fig. 54), the elevator plate 476 will move twice as fast and so twice as high as the lifting plate. The ends of the negative carrier hanger bar being in the channels 478 the negative will be lifted from the tank and raised to a position somewhat higher than is shown in Fig. 54. The cross bar 477 (Fig. 55) lifts the arm 528 to dislodge the empty negative carrier. The oscillation of the bar 470 will cause the upstanding portion 522, of the lateral bar 521 to move to the right and as the tail of the elevating lever 525 abuts the member 541, the slide 523 will be projected upwardly so that the continued motion of the lateral bar to the right causes the slide 523 to push the negative carrier hanger bar from the channels 478 to the inreaching supports 530.

As the lifting plate moves upward the roller 479 passes by the lever 488. Continued upward movement of the lifting plate will cause the roller 479 to engage the lever 495 to project the pusher members 500 and so the empty negative carrier on to the ejecting arms 528 (Fig. 54). As the roller continues upward the arm 495 is freed, retracting the pusher members 500 and shortly thereafter the arm 528 will be raised by the cross bar 477.

While the roller 479 has been going through its function, the roller 480 has moved up along the finger 501, caught the notch 503, and raised the roller 508 from the arm 519. (Fig. 51). The arm 519 being resiliently held and attached with the plate 520, moves upward from the position shown in Fig. 48 to the one shown in Fig. 51. The roller 480 continues upward and engages the resiliently held finger 511 to rock the bellcrank 513, and move the slide 516 towards the left and so to place the plate 520 in the position shown in Fig. 52, i. e., to the left of the elevator plate 476.

The placing of the plate 520 in this position occurs before the negative carrier moves to its high position for it can be seen from Fig. 45, that the roller 480 and the elevator channels 478 are on substantially the same level and move up together.

Briefly then, the negative carrier starts up from the last tank; the carrier opening lever is set; the empty carrier is shifted to the arms 528; the plate 520 is rocked up and slid to the left just before the negative and carrier goes by; the elevator plate goes to its highest position, the cross arm dislodging the empty carrier from the arms 528; and the slide 523 moves to the right depositing the negative and carrier on supports 530 with the gripping portion adjacent the cross member 529. Fig. 55 clearly shows this relation.

Now the rollers 479 and 480 start downward. First the roller 480 will engage the finger 511 to move the slide 516 to the right (Fig. 52.) then the roller 479 will depress the lever 488 so the carrier opening lever 494 will release the negative from the jaws of the carrier and permit the negative to fall to an upright in the pan 542. The pushers 500 being already retracted the pin 479 will just move down by the end of the arm 495, its spring connection with the link 496 permits this. Then the roller 480 pressing against the notched part of the finger lever 501, the plate 520 will be rocked to the position shown in Fig. 48, and the negative will now lay flat in the pan 542. The lever 439d being returned in the same manner as was the lever 439 the lifting plate 471' will not move up again until another negative carrier comes along.

When the empty negative carrier has been dislodged from the arms 528 it was deposited on the chute 532, the arcuate oscillatory movement of the member 536 imparted by the bar 470, causes the push links 537 to feed the empty carrier down the incline of the chute, the gripping end sliding along the rest plate 533 until it will drop into the magazine 372 where it is now ready for use as was explained in the description of the negative transfer unit.

*Printer*

This unit serves to print a number of positives from the exposed negative in sequences of four, i. e., for each coin originally inserted into the machine four prints will be obtained.

Referring now to Figs. 57 and 58, when the negative lifter 471' has returned to its lowermost position it has set the dog 481 in the position in Fig. 57. When elevator bar 405 now rises after being disengaged from the lifting member, the projection 487 strikes a pin on the dog rocking the bellcrank lever 482 against the tension of the spring 484 and pulls down the slotted link 485. The offset 486' at the top of the link will rock the tail of a latching member 550 around its pivot freeing a pin 551 with which it is normally engaged, and allowing the spring 552 to pull a bellcrank lever 553 around its pivot and through a link 554 draw the slide 555 to the right as from the position shown in Fig. 57 to the one shown in Fig. 58. The slide is guided at 556 and carries a block 557 having attached to it a pusher-finger 558. The tail portion of the pusher-finger as the slide moves toward the right, is rocked upwardly by the floor of the pan 542 and the front pusher portion 558' therefore overlies the end of the negative with the lug portion 558a serving to push the negative. This can readily be seen in Fig. 59, which view, illustrates the negative as being positioned over the light chamber in the printer.

The negative printer is arranged to be supported on a pedestal 559 at the lower portion of which is journalled a shaft 560 driven by sprocket chains 561 from the shaft 562 which in turn, is driven from the gear reducing unit 51 by chain and sprocket 563. The gear reducer being constantly in rotation will therefore continuously drive the shaft 560 which is provided with a crank 564 and through the connecting rod 565 to raise and lower a guided main slide 566. The main slide has near its lower end an aperture 567 and at its upper end a cross-head 568. It is provided adjacent its upper end with an elongated opening 569 and at the rear, and below the opening 569, with a pin 570. A sub-slide 571 is slotted at 572 and carries anchor pins which form one set of terminals for coil springs 573, the other set of terminals being carried on the cross head 568. This subslide also pivotally carries a pin lever 574 having a pin 575 arranged to coact with the aperture 567 in the main slide. A trip lever 576 is carried on the same pivot with the pin lever and a torsional spring 577 is arranged so that the pin 575 normally tends to enter the aperture 567.

A cross-web 578 arranged in the pedestal is slotted at 579 and a bar 580 carrying a pin 581 is guided in this slot with the pin projecting through the slots 569 of the main slide and 572 of the subslide. A cross-roller 582 carries inreaching pins 583 which are urged inwardly by coil springs 584. These two slides 571—566 are arranged on one side of the cross-web 578, on the other are arranged a pair of upstanding links 585 connected by a cross-member 586. One of these links is provided with a finger portion 587 arranged to be engaged by the pin 570 and also with an arm 588 connecting with a pullrod 589. The pull-rod at its upper end carries a cross-bar 590 from which upwardly project pins 591.

Arranged in slot 579 of the cross-web is a block 592 having four horizontal arms 593 arranged in "H" formation, each pair of the arms being provided with a cross-bar 594. Projecting upward from the ends of these cross-bars are four vertical posts 595 guided at 596 and connected by a cross-head 597 at their tops. The cross-head carries a vertical stud 598 having a pressure plate 599 with a spring 600 arranged between it and the cross-head. Below and adjacent the web 578 are a pair of leg members 601 depending from the block 592. These leg members are provided with cam portions 602 and are arranged to straddle the subslide 571.

Referring now to Figs. 57, 58, 59, 60, 62, 63, 64, 65, 66, 67, 68, 69 and 77 it will be remembered that the first upward movement of the elevator bar 405 after it had previously deposited a developed negative in the pan 542 had oscillated the bellcrank 482 and so tripped the slide 555 to shift the negative to a position over the printer light chamber. The leading edge of the negative will pass by the projecting pins 591 only when they are in a retracted condition.

The slide 566 is continually moving up and down with the pin 570 on its rear face hitting against the finger 587 to retract the pins 591. The upstanding links 585 are then rocked to one side and the pins 583 attempt to move inwardly. This is prevented by the increased tension of the coil springs 573 (Fig. 65) causing the top of the subslide 571 to get behind the cross-roller 582.

If there is no negative to intercept the return movement of the pins 591 the links 585 will rock back to close the apertures for the pins 583 as the main slide starts its downward movement; but if a negative is arranged in the path of the pins 591 (as shown in Fig. 65) the links 585 are held in their rocked position and as the main slide 566 starts downward, the tension of the springs 573 is decreased to such a degree as to permit the springs 584 to cause the cross-roller 582 to push the sub-slide 571 downwardly.

The pin 575 now being slightly lowered, as the main slide 566 starts upward again, it will register with the aperture 567. Now, as the main slide starts down again, the sub-slide 571 moves with it and the pin 581 being engaged in the slot 572 of the subslide, the bar 580 will be pulled and so through the block 592, H legs 593, crossbars 594, posts 595 and cross head 597.

To one side of the light chamber 603 and carried on the pedestal, is arranged the print paper and its feeding mechanism. A roll of paper 604 is carried between brackets 605 which also support a guide roll 606. On slide bars 607 is arranged a slide carriage 608 having link and lever connections 609 with the crossblock 592. The slide bar 607 is arranged between a post 610 and an abutting wall 611. The slide carriage carries a lower movable jaw member 612 and another movable upper jaw member 613. A slotted plate 614 is carried by the carriage and toggle links 615 are pivoted to the carriage at one of their ends and to the jaw members 612 and 613 at their other, these ends 616 and 617 operating in the slots of the plate 614. The upper jaw member is provided with an abutting roll 618 co-acting with the post 610 and the lower jaw member is provided with a similar roll 619 in a similar relation with the abutting wall 611.

The slide carriage 608 mounts at 620 a lock lever 621 for the paper gripping jaws 612 and 613 and a trip arm 622 provided with a pin 623 is mounted with the lock lever, the pin being engageable with a hook 624. (Fig. 60.) The upper gripping jaw 613 carries a stationary knife 625 (Figs. 78–79) and the lower jaw member 612 pivotally supports a pair of levers 626 one end of which serves to move a sliding knife 627 guided by the jaw, said knife having a serrated cutting edge 628. The other end of the levers 626 are engageable with a rocking lever 629, said lever serving to elevate the knife 627 for either perforating or cutting, as the case may be.

The lever 629 is rocked through the medium of a pitman 630, operated by an arm 631, shaft 632, another similar arm 633, link 634 and rock arm 635. The shaft 560 is provided with a disc 637, near the periphery of which is mounted a lifting dog 638 having a finger 639 engageable either with the roller 640 or a plate 642 tensioned by a spring 643 and positioned circumferentially by a link 644. Pivoted at 645 and having an arm 646 connected to the link 644, is a member provided with a shoe portion 647 and a ledge 648.

Also mounted on the shaft 560 is a disc 649 having a roller 650 engageable with the toe of a lever 651, pivoted at 652, the upper end of which through a link 653 rocks a bellcrank 654 mounted at 655. A long link 656 connects the bellcrank 654 with a curved arm 657 mounted on the frame for engagement with the tail of the lever 626 for depressing the knife 627.

Between the brackets 605 is pivoted a pair of tensioned arms 658 carrying a roller 659 arranged to press against the photographic paper P. The tail of one of the arms 658 connects with a switch link 660 operating a switch arm 661 for contact with the switch point 662 for closing a circuit when the photographic paper is either broken or depleted. A tensioned arm 663 mounts a roll 644 which impinges against the photopaper trained around a roller 606.

The lower jaw member 612 is made in sections and in the spaces thus provided are arranged fixed platen strips 665 carried from the abutting wall 611 and extending toward the right as viewed in Fig. 81.

Mounted on the web 578 and for rotation at 666 is a disc 667, Figs. 61, 67, 70 and 71, having opposed notches 668 and on one face, eight equally spaced rollers 669 and on the other two diametrically opposed rollers 670 arranged midway between the notches 668. A spring pressed dog 671 prevents rotation of this disc in one direction. In the other, it is intermittently rotated by finger 672 carried by the subslide 571. Figs. 61 and 71. This finger has resilient means 673 to permit its upward movement past the under faces of the pins 669 while an abutting table 674, Fig. 73, furnishes means for positive movement of the disc 667 when said finger engages the top of one of the rollers 669. Normally engaged in one of the notches 668 is a roller 675 (Fig. 61) on a short curved arm 676 fixed on a shaft with a link 677 and pivoted at 678, Fig. 62. The end of the link 677 carries a rod 679, said rod connecting at its other end to a three armed lever 680. The upright arm 681 of this lever has a pin and slot connection with a guided tripping plunger 682 and the substantially curved horizontal arm 683 connects with a vertical slide bar 684, a coil spring 685 connected to this arm at one end and to a portion of the pedestal at the other, functions to normally keep the roller 675 in one of the notches 668 or intimately against the periphery of the disc 667.

The disc 637, Figs. 67 and 70, before mentioned has on its rear face a roller 686 for engagement with the toe of a spring pressed lever 687 having on its tail portion, three notches, the first notch 688 serving to position the pin 689 in what we shall term the neutral position. The second notch 690 serves to position this same pin in what may be called a perforating position, and the third notch 691 similarly serving for the cutting position.

A cam 692 Figs. 72 and 73 is arranged on the shaft 560 so as to be engaged by one arm of a bellcrank lever 693 the other arm of which connects with a long vertical rocking link 694. The upper end of the link 694 is connected to a curved arm 695 fixedly mounted on a shaft 696. The end of the lever 695 beyond its pivot is notched at 697 for engagement with a latch 698 pivoted at 699 and having a projecting toe portion 700. Carried on the same support which trunnions the shaft 699 is a supporting finger 701 the tail of which is yieldably arranged at 702 with the latch 698. Also fixedly mounted on the shaft 696 is a pair of arms 703 having a bridge member 704 between them and having their ends croched to form one jaw 705 of gripping members, the other jaws 706 are yieldably pivoted to the arms 703 at 707 and are provided with tail portions 708. Also carried on the arms 703 and below the pivot 707 is a jaw opening shoe 709, likewise provided with tails 710.

The vertical slide bar 684 has pivoted at its upper end a tilting member 711 linked by means of the rod 712 to a spring tensioned lever 713 having a depending finger 714.

Pivoted at 715 on the web 578 is a bellcrank lever, the lower arm of which 716 is arranged to be engaged by the rollers 670 and the upper arm 717 of which is spring tensioned and connects through a link 718 to an arm 719 on the shaft 720.

Another arm 721 at the opposite end of the shaft 720 is linked at 722 to a coin-ejecting slide 723 guided at 724. An aperture 725 in the guide member is arranged in offset relation with a coin housing tube 726. Another slide member 727 also guided at 724 has a pin and slot engagement with a pivoted arm 728, to the pivot of which is fixedly connected another arm 729 arranged at right angles to it. A small upstanding pin 730 is arranged at the end of this arm to latch behind a yieldable finger 731.

Near the end of the arm 729 is connected a cross rod 732, the far end of which connects to the lower arm of a lever 733 having an upstanding portion 734 and a lateral arm 735.

The rocking link 694 is provided near its upper end with a latching pawl 736 engageable with the lateral arm 735 of the lever 733.

In the light chamber 603 is a platform 738 guided on pins 739 which carries a number of lamps 740 connected through the switch 741 with a source of current. A pair of links 742 connect with a pair of arms 743 at their upper ends to the platform 738 at their lower ends. The arms 743 are pivoted on the shaft 744 and another arm 745 on a portion of the shaft protruding from the light chamber Fig. 72, connects through a link 746 to an operating push and pull rod 747 which is frictionally held wherever positioned by its bearing 748.

The position of the lamps in the light chamber relative to the negative is controlled in this manner to vary the intensity of light. This is necessary because of the varying efficiency of the lamps used or of the developing solution.

The switch 741, Fig. 60, consists of two arms, one of which, 749 is normally held against a pin 750 by a tension spring 751 and the other arm 752 is adjustably positioned and is acted on by a pusher member 753 carried by one of the vertical posts 595.

A pair of rolls, the lower of which 754 is driven by a chain 755 from the shaft 756 is arranged adjacent the light chamber and between the gripper jaws 705—706. The upper roll 757 is freely mounted on its shaft 758 and arranged with its mating roll to feed the negative from a position over the light chamber to a delivery chute.

It will be remembered that during the negative developing operations an oscillating bar 470 was moved by means of a link 468. The far end of this link 761 is connected to one arm of a bellcrank lever 759 which is pivoted at 760 and is rocked through the medium of a link 761 carrying a cam shoe 762 actuated by a roller 763 on a disc 764 fixed to shaft 560.

It will also be remembered that the screw conveyors 411 and 434 were rotated by mechanisms which were capable of adjustment so as to regulate the rate of feed of the negative through the baths, the position of the scalloped segments 432 determining when the pawls 422 would pick up the ratchet teeth 423.

Regulating knobs 765 and 766 are each respectively connected by means of shafts 767—768 to the scalloped edged segments 432 and 432a. Each of the regulating knobs is provided with a pointer and dial 769 which visually indicate the speeds for which the conveyors have been set.

With the printer in a non-operating condition, it will be remembered that the main slide 566 moved up and down through the medium of the crank 564 and no action in the various operating elements took place, but when the pin 575 was permitted to enter the aperture 567 in the main slide, the subslide 571 moved downwardly with the main slide. This was caused, it may be recalled, by the intercepting of pins 591 by the negative. Now as both slides move down together, through rotation of the crank the finger 672 will engage one of the rollers 699 to rotate the plate 677 one eighth of a turn. The roller 675 housed in one of the notches 668 is carried out by this rotation of the plate 667, rocking the curved arm 676 and through the lever 677, rod 679 also rocking the three armed lever 680, serving to retract the plunger 682 from the path of the trip lever 576 and preventing disengagement of the main slide 566 from the subslide 571. The rocking motion of the three armed lever also depresses one of its arms 683 causing a pull on the vertical slide bar 684, the pivoted top member 711 of which, will rock by, the projecting toe portion 700 of the latch 698, and as long as the roller 675 rides on the periphery of the disc 667 the vertical slide bar 684 will remain depressed and the plunger 682 retracted.

As the notches 668 in the plate 667 are diametrically opposite and as four of the rollers 669 are circumferentially arranged between these notches, the slides 566 and 571 may have four up and down movements before the slide bar 684 is again raised and the plunger 682 again placed in the path of the trip finger 576.

As a full revolution of the shaft 560 is required for each up and down movement of the slides, the lifting dog 638 carried on the rotating disc 637 will be elevated four times, the first three times by the roller 640 which imparts only a partial lift and the last time by the roller 641 which imparts full lift.

When the roller 675 was cammed out of the notch 668 it engaged the ledge 648 to rock through the medium of links 646, and 644 the plate 642 on which the rollers 640—641 are mounted. Simultaneously with this movement of these levers 646, 648, the roller 686 on the disc 637 engaged with finger portion of the lever 687 rocking the notched end of the lever downwardly and permitting the pin 689 at the joint of the two links 646, 644 to slip from the neutral notch 688 to the perforating notch 690. As long as the roller 675 remains on the periphery of the disc 667 and engaged by the ledge 648, this relation will be maintained, which means that the lifting dog 638 will be elevated by the roller 640 and as this elevation is partial, the movement imparted to the link 634, arms 633, pitman 630, rocker arm 629, will partially raise the lower knife 627 (the carriage 608 being in a retracted position) to merely perforate the photographic paper at that point, the serrated cutting edge of the knife permitting this.

The jaws 612—613 being closed at the time when the perforating knife is down, the photopaper P will be firmly clamped, and as the carriage moves toward the light chamber the paper will be fed a distance equal to this movement which corresponds to the width of the print. This feed of the carriage transpires when the block 592 which is linked to the carriage moves downward. When the carriage arrives in this position adjacent the light chamber the jaws 612—613 will open as shown in Fig. 77, this being permitted by the pin 623 on the trip arm 622 being engaged by the hook 624 to rock the lock lever 621 from its vertical clamping position as shown in Fig. 79 to the tilted released position shown in Fig. 77. Now, as the roller 619 has engaged against the face of the wall 611, the plate 614 (Fig. 80) can no longer move forward and as the carriage feed continues moving forward a little further, the toggle links 615, straighten and thus separate the jaws; the knives being each carried by their respective jaws the photopaper will be freed, resting on the platen strips 665 and on the resiliently mounted frame 770 surrounding the opening of the light chamber. The negative having been previously fed to a position inside this frame upon the transparent plate 771 covering the light chambers, the photopaper is fed over the negative in this manner.

As the block 592 starts down to feed the carriage it also carries down the post 595 and the cross head 597 as the carriage feed stroke is completed, the pressure plate 599 comes down to press upon that portion of the print paper which overlies the negative and is supported by the resiliently mounted frame 770 to make intimate contact between the negative and the print paper and firmly clamping them in this position. As this occurs, the pusher member 753 engages the switch arm 749, moving it downward to engage the other switch arm 752 thus closing the electrical circuit which illuminates the lamps 740 in the light chamber 603. A proper time interval is arranged for by the position of the pins 750 in relation to the switch arm 749 and by the point by which the pusher member 753 is attached to the post 595.

Now, as the slides start upward due to the crank 564 rotating, the carriage starts back with its jaws open and the pressure plate 599 moves upwardly, freeing the pressure on the resilient frame 770 permitting the photopaper to be slightly raised out of contact with the negative so that when the paper is again fed forward, there will be no resistance to this action due to suction.

When the carriage returns to its fully retracted position, the tail of the lever 626 which moved the lower knife 627 will be engaged on its under face by the toe of the curved arm 657 to depress the knife 627. This is necessary for, as the jaws 612—613 again move together, the lower knife may not cause perforations or severance of the paper at this time and also be moved out of the path of the paper support.

The closing of the jaws in the retracted position as shown in Fig. 79, is caused by the roller 618 striking the post 610 and arresting the continued lateral movement of the plate 614 while the carriage proper 608 continues laterally for a short distance. The joint at the toggle links 615 will be broken and the ends of the levers 616—617 which respectively carry the upper and lower jaws, will move together.

The lock lever 621 being tensioned by means of the spring 620 and as the pin 623 is disengaged from the hook 624 the lock lever will assume a vertical position as shown in Figs. 79–80 to hold the jaws firmly clamped. From the foregoing briefly stated, when a negative had been placed in a position over the light chamber and the upward movement of the pins 591 has been arrested, and the main slide 566 (which is continually moving up and down) had been linked with the subslide 571, the disc 667 is intermittently fed by the finger 672 of the subslide, the first feed has retracted the tripping plunger 682 so as not to disengage the two slides; it has depressed the vertical slide bar 684; and it has placed the roller 640 in a position to elevate the lifting dog 637 for perforation of the photopaper. The first downward movement of the crank 564 has moved the carriage clamping the paper, toward the light chamber, the carriage has been tripped open, the pressure plate 599 being simultaneously lowered to clamp the photopaper and negative against the transparent supporting plate 771, a proper time interval during which the lamps in the light chamber are illuminated, is allowed, then on the up stroke of the crank 564 the carriage is retracted (the jaws still being part or open) the jaws are closed clamping the photopaper, and the lower knife is raised to its perforating position and again depressed and the unit is now in condition to start the second stage of its cycle.

The slides starting another downward movement and so feeding the disc 667 another ⅛ turn, one of the rollers 670 will engage the shoe 647 (Fig. 67) to further rock the arm 646 so its pin 689 may find the outermost notch 691 on the lever 687 thus placing the roller 641 on the plate 642 in a position where it will engage the finger 639 of the lifting dog 638. The roller 641 being nearer the periphery of the plate 642 than the roller 640 (which served to move the knife for perforating) the lifting dog will raise the knife to a greater degree and so completely shear through the photopaper. The carriage, with the jaws closed, now feeds forward and repeats the same action as previously, perforates the paper, again feeds forwardly to bring the severed end of photopaper from the roll to a point adjacent the light chamber as seen in Fig. 79—the carriage being again retracted, the jaws again closed and the lower knife being again raised to perforate the paper and the knife again depressed and the pin 689 permitted to find the innermost notch 688 for neutral position.

During the last movements of the carriage, forth and back, the roller 675 will drop into the notch 668 opposite the notch it originally occupied projecting the plunger 682 into the path of the trip lever 576 so that on the next upward movement of the slides, the pin 575 will be retracted from the aperture 567 freeing the subslide 571 from the main slide 566, the springs 581 returning these parts to the initial position shown in Fig. 63.

When the previous cycle had been completed the jaws 705—706 had assumed the position shown in Fig. 73, but continued rotation of the shaft 560 has caused the cam 692 to rock the bellcrank 693 and so elevate the link 694 which through its curved arm 695 has raised the pair of arms 703 to the position shown in Fig. 75 where the latch 698 engaging with the notch 697 and the tilting member 711 holds the jaws 705—706 apart by means of the shoe 709. These parts assume this position previous to the time when a negative is fed to its position over the light chamber. The first one-eighth turn of the disc 667 retracts the slide bar 684 as before described when the position as shown in Fig. 78, is assumed. This permits the jaws 705—706 to clamp the end of the negative and so long as the roller 675 is kept on the periphery of the disc 667, this position as shown in Fig. 67 is maintained; but when the roller 675 finds its notch 668, that is, when four prints have been made from the negative, the vertical bar 684 will move upward, the tilting member 711 will trip against the under side of the toe portion 700 of the latch 689 moving it out of the notch and permitting the supporting finger 701 to arrange itself as shown in Fig. 76 in which position it holds the latch member 698 so that it may not reengage the notch 697, except at the proper time. As the cam 692 assumes the position shown in Fig. 73, the negative gripping jaws 705—706 will draw the negative from over the light chamber to a position where it may be engaged between the rolls 754—757. The tail member 711a is now in a raised position with its right hand face engaged with the lower left hand portion of the tail 710 and as the curved arm 695 rocks downwardly due to the roller 693a riding off the high part of the cam 692, the member 711a will be rocked against spring tension around its pivot to the left, the arm 703 of course following the motion of the arm 695 and the parts will assume the position shown in Fig. 76 where the negative is engaged between the rollers and the jaws 705—706 freed from it. As the arm 703 rocks down, its under edge engages the upstanding portion of the supporting finger 701, the lower portion in this manner being rocked against its spring, out of latching engagement with the latch 698 allowing the spring 702 to raise the hooked portion of the latch member so it will engage against the arm at a point adjacent the notch 697. The parts will now assume the position shown in the upper left hand portion of Fig. 73 where the jaw members are closed, the tail 710 having passed by the member 711a, and the arm 703 is in its lowermost position. The negative is now free to be fed between the rollers 754—757.

Continued rotation of the shaft 560 will again present the high portion of the cam 692 to the roller 693a, raising the bar 694, rocking the arm 695 upwardly and so also the gripping jaw carrying arm 703. The right hand edge of the tail 710 now engages the left hand edge of the member 711a causing the shoe 709 to open the jaws as they resume the position shown in Fig. 75 which also indicates the relatching of the latch member 698 with the notch 697 on the curved arm 695.

When the disc 667 receives its fourth intermittent motion, one of the rollers 670 engages the toe of the arm 716 (Figs. 61 and 71) to rock the upper arm 717 against the tension of its spring and through arm 719, shaft 720, arm 721, and link 722 moves the slide 723 so that the coin, in this case a quarter, will be moved to permit it to drop through the aperture 725 to a proper coin receptacle. But if the coin be larger or in this case a half-dollar, this movement of the slide 723 will be imparted to the slide 727.

When the slide 723 is moved to eject a coin, it is held in its projected position by the latch member 731a so as to prevent any other coin which may have been resting upon the one which it had just ejected from following. Only when the slide 727 is returned to its normal position, the pin 730 on the lever 729 will engage the square face of the yieldable projection 731 to free the slide 723 from the latch 731a and so allow it to resume the position shown in Fig. 72. The waiting coin may now drop onto the floor of the slide guide where it is ready to be treated as was the previous coin.

This was necessary because, for the larger coin, the printer goes through two cycles before ejecting the negative and the next coin must be prevented from assuming a position where it may be engaged by the movement of the slide 723. In this way the smaller coin will cause the machine to deliver four prints, while the larger coin will cause it to deliver eight prints.

It can readily be seen that the roller 693a of the bellcrank 693 is now held out of engagement with the cam 692 which is in continuous rotation until the trip member 711 is again raised to trip the latch 698. The roll 754—757 being driven by means of the sprocket chains 755, the negative will be moved to a delivery chute (not shown).

In this manner the arm 728 will be rocked around its pivot moving the arm 729 (Fig. 72) so that the pin 730 on this last mentioned arm will latch behind the yieldable finger 731. This movement will cause a pull on the rod 732 (Figs. 60, 77 and 78) to rock the three armed lever 733.

The vertical slide member 684 being in its lowermost position as shown in Figs. 77—78, the upstanding portion 734 of this three armed lever will engage to rock the spring tensioned lever 713 which is linked to the tilting member 711 and in this way tilt it so that when the vertical member 684 moves upward, it will not engage with the toe 700 of the latch 698 so that the latched relation may be maintained and the jaws 705—706 will not be retracted but will maintain their position, gripping the negative which in this manner remains over the light chamber.

When the plunger 682 acted to trip the arm 577 and so disengage the two slides, when the roller 675 found its notch 668 in the disc 667, the unit was temporarily placed in a non-operating condition but as the negative still remains in the position which prevents the upward movement of the pins 291 the two slides will immediately again latch as before described and a cycle will be repeated, and four more prints will be made from the same negative. But it will be remembered that the slide 727 has remained latched in its moved position by means of the resilient member 731 engaging the pin 730 (Fig. 72), the next upward movement of the link 694 which carries the pawl 736 to engage the lateral member 735 of the three armed lever 733, will pull the link 732 to disengage the pin 730 and permit the slide 727 to return to its normal position (Fig. 72) where it may again be in a position to be acted upon by the larger coin.

The first downward movement of the cross head 597 with its posts 595 on one of which is mounted an arm 772 carrying a roller 773 will cause the roller 773 to engage with the offset finger 553a of the spring tensioned lever 553 to return the slide 555 to a position where it may again receive the next developed negative and this position will be maintained by means of the pin 551 latching with the member 550.

Rotation of the shaft 560, imparting the same movement to the disc 764, moves the roller 763 mounted on this disc to act against the cam shoe 762 and so pull on the link 761, in this manner the bellcrank 759 is rocked around its pivot 759a and one arm 774 of the bellcrank is connected to the link 468 to oscillate the bar 470 (Fig. 43) to move the shifting members 471, 471a and 471b. The other arm 775 of the bellcrank 759 pulls the rod 776 attached to a smaller bellcrank lever 777 (Fig. 60) the upright arm of which connects with a link 778 (Figs. 62 and 86) to oscillate through rock levers 779, tensioned by spring 780, the bar 781 carrying shifting members 782, 782a, 782b and 782c.

Positive print developer and dryer

This unit consists of a photographic paper receiving unit, a series of baths, means for successively immersing the positive in the baths, means for drying the positive and for delivery.

On the disc 764 (Fig. 62) is carried a crank arm 783, connecting at 784 (Fig. 90) with an elevating lever 785 pivoted at 786 and counterweighted at 787. A similar elevating lever 788 at the other end of the unit and shown in Figs. 83 and 88 is pivoted at 789. The free ends of each of these levers 785—788 have links 790 connected with an elevator bar 791 which is guided for up and down movement on the vertical guide bars 792.

Referring now to Figs. 86, 96 to 102, between the frame plates 793 is mounted a shaft 794 having plurality of cams fixed to rotate with, and a chain sprocket 795 normally free to rotate, on the shaft. Referring back to Fig. 62, a shaft 796 is driven by means of bevel gears (not shown) from the shaft 756 at the end of which is carried a chain sprocket 797 and between this sprocket and the sprocket 795 is trained a chain 798. Continuous rotary motion is in this manner imparted to last mentioned sprocket.

Referring now to Figs. 60 and 62 a bellcrank 799 has a pin and slot connection with the vertical member 684 and carries on its depending arm links 800 and 807. The other end of the link (Figs. 86 and 96) is connected with a smaller bellcrank 801 pivoted at 802. A vertical link 803 connects this bellcrank with an arm 804 on the shaft 805 which has affixed to it a curved shield member 806.

Another link 807 Figs. 86 and 100 has a slotted engagement with the depending arm of the bell crank 799, its other end connecting with an arm 808 of a bell crank pivoted at 809 having a trip roll 810. The other arm 811 is provided with a pin 812.

The sprocket 795 has secured to it a disc 813 carrying a freely pivoted latching dog 814; and a pin 815 is carried on the face of cam 816 so as to be removably engageable with the latching dog. Another cam 817 Figs. 96 and 101 on the shaft 794 engages with a roller on the end of the arm 818; and carried on the same pivot with this arm is a longer upstanding tucking arm 819 having a tucking blade 820. A third cam 821 Figs. 98 and 101 on the same shaft acts against a roller on an arm 822 which is linked at 823 with the spring tensioned arm 824 on the shaft 825 on which is secured a carrier jaw opening lever 826. A fourth cam 827 on the same shaft coacts with a roller on the spring tensioned curved lever 828, which is linked at 829 to an arm 830 fulcrumed with a carrier supporting and freeing lever 831 at 832.

The far end of the curved lever 828 is connected with one arm of a bellcrank lever 833, the other arm of which is linked at 834 with a shifting lever 835 which engages the shift rod 836. Hanger levers 837 Figs. 99 and 102 on a shift rod 836 are normally arranged centrally of the frame plates 793 by means of a coil spring 838 and an abutting collar 839. On the shaft 825 is carried an offset arm 840 Figs. 98 and 99 engageable with a spring tensioned pull lever 841 having a wire link, connector 841a with the carrier jaw opening lever 826.

The hanger portion 328a of the carrier 305a is engageable with the frame plates 793 by means of vertical slots 842 and communicating inclined slots 843 (Figs. 86, 98, 99, 100 and 102).

Just forward of the curved shield member 806 is arranged a paper receiving chute 844 Fig. 102 and rearward of this curved shoe member is an inclined plate 845 which with the portion 845a of the lever 831 constitutes a continuation of the chute 844. A stop 846 is arranged above the chute to support a pin 847 carried on the tucking arm 819.

The first mentioned cam 816 Figs. 86 and 100 is engaged by a roller on an arm 847 of a bellcrank pivoted at 848 the other arm 849 having a link connection 850 with a short lever 851 mounted on a shaft 852.

The roller on an arm 854 also coacts with the cam 816 to move a link 855 connected to an arm 856 on the shaft 836.

The frame plates 793 are provided with enlarged openings 857 at the end of the slots 843, one of which communicates with a vertical slot 858 on the front frame plate.

A fifth cam 859 Fig. 96 coacts with the roller on a spring tensioned lever 860, connected by a link 861 to a swinging closure plate 862 pivoted to one of the frame plates at 863.

Referring now to Fig. 83, one of a pair of chains 864 is attached to the elevator bar 791 at 865, the lower bights being trained around sprockets on a shaft 866 and the upper bights around sprockets 867. Sprocket chain connections 868 and 869 (Figs. 86 and 91) to shaft 870 provide motive power for the empty carrier chains 871 having a pair of empty carrier propelling fingers 872.

Trained over sprockets (not shown) and on the same shaft with sprockets 867 are the lower bights of a pair of chains 873, Fig. 86, their upper bights being trained over sprockets (not shown) on the shaft 874. These chains mount carrier lowering fingers 875, the tails of which coact with a stop plate 876 to tilt the carrier lowering fingers against the tension of the spring 877 (Fig. 92).

The closure plate 862 forms one side of a passage way between the vertical slots 552, and another fixed plate 878 forms the other, thus affording a confining channel 879 for the first downward movement of the now folded positives, the free ends of which are in this manner prevented from unduly spreading, (Fig. 86).

Upon a platform 880 (Fig. 92) pivoted to a lifting lever 881 is a series of baths, respectively developing 882, fixing bath 883, washing bath 884, and drying bath 885. The lifting lever 881, fulcrumed at 886, is slotted at 887 and is maintained in the position shown in Fig. 92 by a swinging rod 888. A short link 889 is pivoted at one end to the lifting lever and at the other end to a lug on the main frame 890. This manner of mounting permits, when the rod 888 is swung from a position over the end of the lifting lever, the lowering of the platform 880 and the baths in a vertical position onto the runways 891. Handles 892 on the platform serve as pulls when it is desired to remove the baths for emptying, cleaning and refilling. A projection 893 is also provided on the platform the purpose of which will be later described.

Referring to Figs. 83 and 90, the elevator rod 791 is provided with a pin 894 which, each time that the rod is elevated, coacts with a hooked member 895 normally hanging on a pin 896 and pivoted at 897 to the longer arm of a bellcrank 898 fulcrumed at 899. To the shorter arm of this bellcrank is attached a link 900, the upper end of which is pivoted to a pawl carrying arm 901 freely mounted at 902 and having a driving pawl 903 engageable with the teeth of a ratchet wheel 904. On the same shaft with this ratchet wheel is a gear 905 mating with a pinion 906 fixed for rotation with a gear 907. A similar gear 908 is rotated by the gear 907 in the opposite direction by means of two intermediate idler pinions 909. Meshing with each of the gears 907—908 are pinions 910 on the ends of the screw conveyors 911 arranged in parallel relation supported in bearings 912 in the main frame 890. The knuckle formed between the bellcrank 898 and the link 900 serves to act against the projection 893 of the platform 880 to tilt the platform around its pivot to constantly agitate the liquids in the baths.

Mounted at 913 (Fig. 90) is a bevel gear 914 rotatable by a bevel pinion 915 on the angularly arranged shaft 916 connected by a universal coupling 917 with a setting dial 918. Fixed with the bevel gear 913 is a scalloped edged segment 919 having a spring detent 920 engageable with the scallops. A link connector 921 from the segment 919 to a shoe member 922 freely mounted at 902 serves, when the dial 918 is manipulated to determine the amount of rotation imparted to the ratchet wheel 904 by the pawl 903. In this manner, by presetting the dial 918, a predetermined rate of feed is imparted to the screw conveyors 911. The foregoing is substantially similar to the feed mechanism for the negatives, which was previously described.

The first lifting bar 923 (Figs. 83, 84 and 85) is provided with a tilting latch arm 924, and an angle member 925 at its lower end. The elevator bar 791 is provided with a spring pressed lifting dog 926 engageable with the latch arm 924 for lifting the lifting bar 923, the lower portion of the bar itself coacting with the angle member 925 for lowering the lifting bar. The lifting bar is guided at 927 (Fig. 86) and has a cross member 928 having a short depending leg 929. To the inside of the bar 923 and to the inside of the leg 929 are affixed a pair of elevator channels 930.

Referring to Figs. 83 and 92, at 931, is pivoted a tiltable arm 932 having an arm 933 connected by means of a link 934 with one arm of a bellcrank 935 fulcrumed at 936, the free arm 937 having a pin serving to act against the tilting arm 924 to place it in a position where it may be engaged by the lifting dog 926. When the lifting rod 923 moves up, a lever 938 is free to move toward the left as viewed in Fig. 83 under tension of the spring 939, depressing the link 940 which pulls on the lower arm 941 of the wiper supporting lever 942, the wiper 943 on this lever moving toward the fixed wiper 944.

The other three lifting bars are similarly actuated, ad seriatum or successively.

The depending arm 929b of the third lifting bar 923b (Fig. 89) is provided with a roller 945, engageable with a bellcrank 946 pivoted at 947 to the frame. A link 948 connects the bellcrank with a short arm 949 provided with a pin 950 coacting with a tooth 951 on a lever 952, which also has a pin 953. This pin coacts with a lever having a curved end 954 which is pivoted at 955 with a setting arm 956 having a pin 957 engageable with a tooth on a cam 958 to which is secured the toothed wheel 959. The space between two of the teeth at 960 of this wheel is wider than the spaces between the other teeth which are all equal for purposes which will later become apparent. Also carried on the face of the cam is a projection 961 which is engageable with the end of the arm 956. A cam disc 962 is also affixed with the toothed wheel and has a cam notch 963 for the purpose of rocking the bellcrank 964, and a link 965 connects the bell with a switch arm 966. In the proper relation with the toothed wheel is a disc 967 having on one face a pin 968 for coacting with the teeth of the toothed wheel 959 and on the other face, two diametrically opposed pins 969 which serve to rock the toe of a bellcrank 970. The upper end of the arm is provided with a clapper 971 which acts against a bell 972. Pivoted at 973 is a bellcrank, one arm of which 974 normally rests against the arm 970, and the other arm of which connects with a link 975 held in vertical position by means of the slotted connection to the frame at 976.

Referring now to Figs. 86, 87, 93, 94, the last lifting bar 923c is provided at its upper end with a roller 977 (Fig. 87). Normally supported as in Fig. 86 against the roller, 977 is a curved lever 978 pivoted at 979 and linked at 980 to a short arm 981 on the shaft 982. Another arm 983 on this shaft has a pin and slot connection with a spring tensioned lever 984 which connects substantially midway of one of a pair of curved pressure arms 985 having pressure roller 986 at its end and a larger pressure roller 987 at the point where the arm 984 connects with the curved pressure lever.

Another curved lever 988 fulcrumed at 989 has one end also coacting with the roller 977 and having its other end linked at 990 with a short arm 991 on the shaft 992. Also fixed to the shaft 992 is a pair of lifting fingers 993 for the empty carriers which may be ejected from the last elevating channels 930c into the horizontal slots 994 having communicating vertical slots 995. A weighted dog member 996 serves to position the carrier at the junction of the horizontal and vertical slots. Also fixed to the shaft 982 is an arm 997 for the purpose of swinging the empty carrier into a horizontal position so that its free end may ride freely on the runway 998 (Figs. 93 and 94).

Trained over a number of idler pulleys 999 (Figs. 87, 89, 93) is an endless drying belt 1000 driven by means of a chain sprocket 1001 and having a tensioning pulley 1002 having an offset arm 1003. Another endless drying belt 1004 cooperates with the belt 1000 and both pass over a heating drum 1005. Within the drum is an electric or other heating unit 1006 having socket connections 1007 to a source of current and to the controlling switch 966. The belt 1004 is trained over idler 1008 and is tensioned by a roller 1009 on the spring tensioned arms 1010.

Attached to one of the rock levers 779 is a link 1011 connected with a bent arm 1012 pivoted at 1013 (Figs. 87 and 94). Also pivoted at this point is a tiltable positive print receiving pocket 1014 having vertically hinged doors 1015, normally held closed through the medium of the spring tensioned rock plate 1016 and rod links 1017 (Fig. 88). Arranged to coact with one of the doors 1015 is a spring mounted angular member 1018, the tail 1019 of which is engageable at 1020 with the bent lever 1012. A stop member 1021 is arranged for the receiving pocket in its tilted position and another stop 1022 serves to position the pocket vertically. An arm 1023 affixed to the receiving pocket is linked at 1024 with a bellcrank 1025, and an offset link 1026, connects the bellcrank with the curved lever 988.

The oscillating bar 781 (Figs. 86, 87 and 94) is provided with a carrier opening member 1027 and a fixed bar member 1028 is arranged to coact with it.

Referring now to Figs. 91 and 102; carried on a shaft 852 is a pair of arms 1029 having pin and slot connections with a curved lever 1030 pivoted at 1031 to a lever 1032. To the upper portion of the lever 1032 is pivoted one arm 1033 of an escapement and to the lower end is pivoted another arm 1034 of the escapement. The arm 1033 is provided with an extension 1035 acting to rock a cam plate 1036 which serves to tilt a lever 1037 around its pivot 1038. At the ends of the lever 1037 are carried escapement arms 1039—1040.

In operation, when the printed positive is fed from the printer in a strip having three equally spaced perforations or weakening lines forming four individual positive prints, after the second feed of the strip, its leading edge will abut against the curved guide 806 (Fig. 102) and as the feed continues, the free end will be diverted upwardly as seen in Fig. 102 until the tucking blade 820 is in line with the central perforation of the strip. At this time, the vertical slide bar 684 in the printer (Fig. 60) moves upwardly to rock the bellcrank 799 and through link 800 and bellcrank 801 and link 803 moves the curved guide member 806 out of the path of the tucking blade 820. Simultaneous with this action the link 807 is also pulled by the bellcrank 799 and the roller 810 on the bellcrank 808 is removed from the path of the tail of the latching dog 814 permitting its forward end to engage the pin 815 on the face of the cam 816 (Fig. 100). In this manner the sprocket 795 imparts its rotary motion to the cam shaft which previously remained at rest by reason of the tilting of the tail of the latching dog 814 by the roller 810 which raised its forward end so as to avoid engagement with the pin 815. It can therefore be seen that until the vertical slide bar 684 moves up (which occurs at the end of the printer's cycle) the cam shaft remains at rest.

When the vertical slide bar moved up and pulled on link 807, the friction at the pivot 807a between the link and the bellcrank 799 maintained the end of the bell crank in the forward portion of the slot in the end of the link, yet rocking the bellcrank 808 into the position shown in Fig. 100. With the latching dog engaged with the pin 815, as the rotation continues the cam 816 will rock the bellcrank 808 to its initial position against a stop as shown in Fig. 86 again placing the roller 810 in the path of the tail of the latching dog 814, and as a full revolution of the cam shaft is completed, the tail will again be intercepted by the roller 810, thus disengaging its forward end 815 so that the sprocket 795 may again run free. Now the vertical slide bar 684 may move down, rocking the bellcrank 799 to again move its end frictionally to the forward end of the slot. (See Fig. 60.)

As the cam shaft starts its revolution the tucking blade 820 is moved through the medium of the cam 817 forcing the positive strip between 845 and forming a fold which is projected between the jaws of the waiting open carrier 305a, and immediately thereafter the cam 802 acting through its linkage raises the lever 826 permitting the jaws of the carrier to clamp the folded end of the positive strip. The tucking blade returns to its initial position as shown in Fig. 96. Thereupon the freeing lever 831 (Figs. 98 and 102) is rocked downward by means of the cam 827 releasing the jaw end of the carrier and permitting it to hand at the junction of the slots 842—843. The support-arms 853 now swing downwardly and then upwardly through the cam 816, moving the hanger end 328a up the inclined slots 843 until the hanger is arranged opposite the enlarged openings 857 in the side frame 793.

While the supporting arms 853 are swinging, the hanger levers 837 were moved to the center of space between frame plates 793 and this is accomplished through the medium of linkage 828 and cam 827.

Now the hanger levers 837 rock inwardly through the medium of the cam 861 but through the action of linkage and cam roller arranged at a different point of the cam periphery, the hooked portions on the levers 837 may be held stationary to receive the hangers as the support arms 835 move back to their initial position (Figs. 75

100 and 102). The carrier is now in alignment with the confining channel 879 (Fig. 86) and as the free ends of the folded positive strip tend to spread apart the closure plate 862 which, until this time, has remained open, that is, substantially parallel to one of the sides 793 of the frame, is moved around its pivot by the cam 859 and its linkage so as to be parallel and spaced from the fixed plate 878. In this manner a confining channel for the free ends of the positive strip is formed which are entirely necessary until the paper is moistened in the first bath after which there is of course no tendency to spread.

While the carrier is held suspended from the hooked portions of the hanger levers 837 (Figs. 98 and 99) the cam 827, through linkage connections rocks the shifting lever 835 to shift the rod 836 against the spring 838 and as the hanger arms 837 are carried by the shift rod, the carrier will be shifted to the left, placing it in alinement with the mechanism for taking it through the baths.

It will be remembered that the crank arm 783 on the disc 764 (Fig. 62) is in continuous motion and is connected with one of the elevating levers 785 to continually raise and lower the elevator bar 791 to which is attached the chain 864.

The carrier lowering fingers mounted on the chains 783 (Fig. 86) are therefore raised and lowered as these chains 864 and 873 are trained over sprockets on a common shaft 867a. So long as there is no carrier in the confining channel 879, no action will take place but, when the fingers on their upward movement encounter the hanger portion of a carrier held suspended by the hanger levers 837, (Fig. 103) they will raise the carrier from the hooked portions of those levers permitting them to return sans hangers to their initial position and the lowering fingers 875 will move downwardly with the loaded carrier suspended between them. As the lowering fingers approach the screw conveyors 911 (Fig. 92) the tails of the fingers will engage the stop plates 876 causing them to be rocked and so deposit the ends of the carrier hanger bar onto the parallel screw conveyors. The lowering fingers may now of course continue their up and down movement until they encounter another carrier.

The crank arm 783 (Fig. 90) raises and lowers the elevator lever 785 and through the link 790, the elevator bar 791. The pin 894 on the elevator bar engages the hooked member 895 to raise it off the pin 896 rocking the bellcrank 898 around its pivot 899. The link 900 is depressed causing the pawl 903 to ride around the periphery of the shoe member 922 until it engages the teeth of the ratchet 904 and in this manner imparting intermittent successive rotation of the ratchet. It may here be noted that the radial position of the shoe 922, in relation to the pawl may be regulated by manipulation of the dial 918 through its connections with the shoe member 922.

These connections are substantially similar to those already described in connection with the negative developing unit. Rotation of the ratchet through gearing 905, 907, 908, 909, and 910 imparts intermittent consecutive rotation of the screw conveyors 911.

Immediately upon the deposit of the carrier hanger 328a upon the screw conveyors, the carrier will be fed forward, i. e., to the left as viewed in Fig. 83, or to the right as viewed in Fig. 92 until the hanger engages the arm 932 causing it to rock so as to depress the link 934 and so cause the free end of the arm 937 to raise the latch arm 924 from its tilted position so it in turn may be engaged by the lifting dog 926 on the carrier bar. Should the lifting bar be above the latch arm at the time when the latch arm is raised from its tilted position the lifting dog will cam by it.

This is permitted by means of a torsional spring mounted with the lifting dog. Now as the elevator bar moves up, the lifting dog engages under the latch arm (Fig. 84) and so raises the lifting bar 923 upon which are carried the elevating channels 930.

When the carrier has been fed forward far enough to tilt the arm 932 the ends of the carrier hanger rod will be engaged in these channels and so when the lifting rod 923 moves up, the carrier with the positive print is raised from the first or developing bath 882.

As the lifting bar starts upward its lower end frees the lever 938 (Fig. 83) so it may be rocked about its pivot and permitting the spring 939 to depress the link 940. This downward movement of the link rocks the arm 941 to the upper end of which is secured the wiper 943.

This causes the wiper 943 to move toward the fixed wiper 944 and as the positive is elevated from the tank it is squeezed between them forcing all excess fluid from the paper back into the bath, with the positive continuing its upward movement until it is entirely clear of and above the wipers.

At the topmost position of the lifting rod, the channels 930 support the carrier so that the shifting member 782, when the shifting bar 781 is moved, may slide the hanger rod of the carrier from its receiving end 930a to the enlarged portion 930b in which position it may be lowered, as the lifting rod moves down, into the next succeeding or fixing bath 883.

As the elevator bar 791 starts down to lower the positive print into this bath its lower portion engages the angle member 925 on the elevator rod 923 and so positively moves it down. At the same time of course, the tilting latch member 924 is again permitted to assume its tilted position which prevents upward movement of the elevator rod until another carrier is deposited on the screw conveyors. The lower end of the elevator rod reengages with the arm 938, rocking it back to its initial position and so again separating the wipers. When the hanger rod of the carrier was elevated from that portion of the screw conveyor where it engaged the arm 932 it left this arm free to be returned to its normal position by the top of the tilting latch member 924 engaging the projection 924a on the arm 933 when the elevator bar moves up. The free end of the lever 937 is in the manner moved out of engagement with the tilting latch 924.

The carrier is now again fed forward on the parallel screw conveyors to engage the arm 932a and the same cycle of operations is continued for this stage. When elevated from this second bath the shifting member 782a slides the carrier so that it may be lowered into the third or washing bath 884 the operation of which is similar to the previous two and when elevated from this third bath the shifting member 782b slides the carrier so it may be lowered into the last or dryer bath.

As the elevator rod 923b of the third bath section moves up (Fig. 89) the roller 945 on the elevator rod being engaged with the slotted end of the bellcrank 946, the bellcrank will be rocked causing the link 948 through the short arm 949, its pin 950, tooth 951 on the lever 952, to move the pin 953 downwardly so as to free the curved end 954 of the setting arm 956. The torsional spring at the pivot 955 of this arm moves its free end to engage with and move the pin 961 on the cam 958. This cam is notched at 958b to admit pin 957 on the setting arm and so permit the necessary movement of the pin 961. The notch 963 in the disc 962 will therefore cause, by means of a projection on the bellcrank 964 which engages the notch, the moving of the switch arm 966. The electrical circuit between this switch and the heating unit 1006 within the drum 1005 (Figs. 93 and 95) will be closed, and as the dryer belts 1000 and 1004 are in continuous motion they will be warmed, preparatory to their reception of the damp positive print.

It will be seen from Fig. 89 that the wide space 960 is at all times out of engagement with the pin 968 on the disc 967 which is in continuous rotation, but when the setting arm 956 is moved to engage with and move the pin 961 then the first tooth is thus engageable by the pin 968 and as the disc 967 rotates, the pin will successively engage each of the other teeth of this toothed wheel 959 until the space 960 is again in the position shown in Fig. 89 when the toothed wheel will come to rest. During the rotation of this toothed wheel the switch contact was maintained, the projection 958a on the cam 958 engaged the pin 957 to reset to its initial position, the setting arm 956 which is again held in this position by the pin 953 getting behind the lever having the curved end 954. Downward movement of the elevator rod 923b permits the roller 945 on the rod to reengage the notched end of the bellcrank 964 and so return the pin 953 to resume this position. The pin on the bellcrank 964 will ride on the smooth concentric portion of the periphery of the cam 962 holding the switch closed against spring tension until it again finds the notch 963 when the spring will snap the switch open.

The downward movement of the elevator rod 923b has deposited the carrier on the screw conveyors with the positive print in the last or dryer bath. The same sequence of operation as previously described will occur to cause elevation of the last elevator rod 923c at the upper end of which is the roller 977. As the roller moves up (Figs. 86–87) the curved end of the lever 978 is freed and through the medium of the spring on lever 984, the curved pressure arm 985 carrying the pressure rolls 986—987 are raised to the position shown in Fig. 94.

The curved end of the lever 988 will be similarly freed causing the lifting fingers 993 to be lowered from the position shown in Fig. 86 to the one shown in Fig. 87. When the elevator rod 923c attains its topmost position the shifting member 782c slides the carrier from its engagement with the channels 930c into the horizontal slots 994 and past the weighted dog member 996 where it hangs at the junction of the horizontal and the vertical slots 995. Simultaneously with this movement of the carrier, the carrier opening member 1027 moves to open the jaws of the camera as seen in Fig. 94 to permit the positive print to drop into the receiving pocket 1014 which had been placed in a vertical position by the freeing of the lever 988 and the doors 1015 of which are held open by the bent arm 1012. This arm had been rocked into this position through its link connection 1011 with the lever 779 which also serves to move the bar 781 upon which is mounted the carrier opening member 1027.

As the positive print falls into the receiving pocket 1014, the bent arm 1012 moves from its position shown in Fig. 94 toward the left freeing the tail 1019 of the spring tensioned member 1018 so its spring may rock it to assume a position parallel to the back of the receiving pocket. This permits the tensioned rock plate 1016 (Fig. 88) to straighten, pushing on the rod links 1017, the ends of which are connected at 1015a to the doors 1015. In this manner the doors are closed on the upstanding portion of the damp positive print.

The carrier 305a which is now empty and hanging suspended at the junction of the slots 994—995 (Fig. 94) is moved upwardly by the lifting fingers 993 and rocked to a substantially horizontal position by the arm 997 when the elevator rod 327c has started down so the roller 997 reengages the curved ends of the levers 978—988. At the same time through the connection 1026 bellcrank 1025 and link 1024, the receiving pocket 1014 is tilted against the stop 1021 (Fig. 93) with the folded end of the positive print resting on the belt 1000. The return movement of the lever 978 also serves to lower the pressure rolls 986—987 so that the roll 986 overlies the upper folded portion of the positive print and as the belts 1000—1004 are in continuous motion and as the heating unit electric circuit had been previously closed the positive print is fed between the two belts so as to be delivered free of moisture to a chute or suitable receptacle (not shown).

When the carrier 305a had been raised by the lifting fingers 993 and placed in a horizontal position by the arm 997 it is in a position to be engaged by the propelling fingers 872 on the chains 871. The movement of the propelling fingers from the position shown in Fig. 93 to the right, causes them to propel the carrier in this direction with the jaw end sliding on the runway 998a (Figs. 86 and 87a) and the collars on the hanger rod portion guided between the parallel but angularly disposed runways 998 it will be remembered that it was necessary to shift the carrier endwise (Fig. 99) when it first received the positive print to place it in alinement with the baths. The angular disposition of the runways 998 is therefore necessary to return the carrier to the plane from which they were shifted.

As the chains 871 have a reciprocatory movement the propelling fingers 878 move only from the position shown in Fig. 93, to a position where they deposit a carrier 305a as shown in Fig. 102. The carrier will remain in this position until another carrier is propelled by the fingers along the same path, the front end of the second carrier pushing the first carrier so the hanger rod portion may find the slots 842 with the jaw end dropping by the ledge 793a (Fig. 102). The carrier will now become one of a stack of empty carriers available for use, the number of carriers in the stack remaining constant for as one is removed from the bottom of the stack another is added to the top.

When the shaft 852 is rocked through its linkage by the cam 816 (Figs. 100–101) the pair of arms 1029 through links 1030 rock the lever 1032 around its central pivot. In this way the escapement arms 1033 are retracted and the escapement arms 1034 are projected permitting the lowermost hanger rod 305a of the stack to drop onto the arms 1034. As the extension 1035 of one of the escapement arms 1033 is retracted from engagement from the cam plate 1036, the centrally pivoted lever 1037 (Figs. 91 and 102) will be pulled by its spring, withdrawing the upper escapement arm 1039 and projecting the lower escapement arm 1040, and the jaw end of the carrier will drop onto the lower arm. The remainder of the stack, of course, follows to keep intimate contact with the lowermost carrier and with each other.

As the cam 816 continues its rotation the shaft 852 will be rocked in the opposite direction so as to project the upper escapement arms 1033 and retract the lower escapement arms 1034 dropping the carrier hangers to the bottom of the slots 842. As the projection 1035 of one of the arms 1033 re-engages the cam 1036 the lever 1037 will be rocked against its spring tension to project the escapement arm 1039 and retract the escapement arm 1040 permitting the jaw end of the carrier to drop onto the supporting and freeing lever 831.

It will be remembered that the opening lever 826 was moved upward so as to permit the carrier jaws to close, but this lever cannot remain in the plane of the carrier as it can readily be seen from Fig. 99, that it would interfere with the deposit of the next carrier. To this end there is provided on the shaft 825 an offset arm 840 which, when the shaft 825 is rocked to raise the jaw opening lever 826, moves up from behind the tensioned pull lever 841 freeing it so that its connection 841a pulls the jaw opening lever 826 to the right. That is to say, the lever 826 not only moves upwardly as it releases the jaws but swings to one side so as to leave a clear unobstructed path for the next carrier which may be released from the magazine. Of course when the shaft 825 is rocked in the opposite direction the offset lever 840 cams its way behind the pull lever 841 to allow the jaw opening lever to again overlie the carrier jaws, the same motion of the shaft moving this lever down to open the jaws. In this position the carrier is ready to receive the next positive print in a manner already described.

It is necessary to provide an alarm signal should either of the belts 1000 or 1004 become broken. For this purpose there is provided a spring tensioned roller 1002 for the belt 1000 and a similar roller 1009 for the belt 1004. Should the belt 1000 break the arm 974 which is fixed with the offset arm 1003 will engage the toe of another counterweighted bellcrank 970. The counterweight serves as a clapper 971 which strikes the bell 972. This movement has placed the toe of the lever 970 in the path of the pins 969 on the disc 967 and as the disc is in continuous rotation the pins will cause the clapper to continually strike the bell. This provides the necessary warning signal to an attendant that repairs on the belt are necessary. Similarly should the belt 1004 break, the tensioned roller 1009 on the arms 1010 will fall, the arms striking the top of the link 975 causing the arm 974 to act as previously described.

From the foregoing description it will be clearly seen that all the parts of the machine coact to produce the desired results, namely, a machine which is entirely automatic in its operation; which is preferably coin controlled and whereby, upon the advancement of a coin into the machine it is set in motion and all of the parts and units will relatively coact and cooperate through their mutual association to move the negative plate or film into the proper position behind and in alinement with the lens; expose the negative by the operation of the shutter and simultaneous illumination of the subject and then advance the negative into a series of baths to be acted upon successively by developing fluid, fixing fluid and washing fluid, after which the negative is advance in juxtaposition to sensitized paper for the production of positive pictures, to produce positive pictures from said negative, discharge the negative through a discharge spout to without the machine, advance the positives through a series of baths for respectively developing, fixing and washing the positives, advancing the positives through a dryer, the last and final step being the discharge of the positive through a discharge spout to without the machine.

Although I have described my improvements with considerable detail and with respect to certain particular forms of my invention, I do not desire to be limited to such details since many changes and modifications may well be made without departing from the spirit and scope of my invention in its broadest aspect.

Having thus described my invention, what I claim as new and desire to secure by Letters Patent, is:—

1. In an automatic photographing device a camera of the accordion type having a lens and a shutter, a rotatable plate holder for the camera, a hopper to direct sensitized plates to the holder from an outside source, movable pins in the bottom of the holder upon which the plate is initially supported, means to clamp the plate in the holder, means to rotate the holder to turn the plate in a vertical plane selectively to either vertical or horizontal position, a plurality of stops to determine the focus of the camera, means for moving the lens relative to the plate holder to selectively contact one of said stops, a bank of lamps to illuminate an area in front of the camera, means to simultaneously illuminate the lamps to flood-light the subject and to open the camera shutter, means to automatically control the amount and duration of lighting depending upon the focus adjustment of the camera and means to release the plate clamping means and withdraw the supporting pins to discharge the plate from the holder.

2. In an automatic photographic device, a negative plate holder, means in the plate holder to receive a sensitized plate delivered from an outside source, means to clamp the plate in the plate holder, means operative when an exposure has been made on said plate to release the clamping means to allow the plate to drop out of the plate holder, a negative developing mechanism, means for conveying the discharged plate to said developing mechanism, and cam controlled motor driven mechanism for successively actuating the mechanisms and means for each stage of a photographic process.

3. An automatic photographing machine comprising a magazine for unexposed sensitized sheets, a camera remote from the magazine, means for feeding a sensitized sheet from the magazine to the camera, means for causing the camera to expose the sheet for a photograph, means for moving the sheet through a series of baths for sequentially developing, fixing, washing and to hasten drying the exposed sheet to produce a negative, a photographic printer, means for conveying the negative to the printer, a sensitized positive supply, means for feeding the sensitized positive to the printer in juxtaposition to the negative, means for predetermining the number of prints to be made from the negative, means for successively printing the negative image onto the positive paper the predetermined number of times, means for conveying the exposed positives sequentially through developing, fixing, washing and dry-hastening liquids, means to convey and deliver the negative from the printer to without the machine, means to dry the positives, and means to deliver the finished photographs to without the machine.

4. In an automatic photographing machine having means for causing an exposure on a sensitized element; the combination with a series of receptacles adapted to contain solutions for sequentially developing, fixing, and washing said exposed sensitized element, of a supporting platform for the several receptacles, means to rock the platform to constantly agitate the solutions in said receptacles, guide tracks upon which the platform may be lowered and on which it may slide and means to lower the platform to dispose it on the guide tracks for removal and replacement of the receptacles.

5. In an automatic photographing device the combination with a carrier having gripping jaws to receive a sensitized element after exposure by said device, of means to deliver said exposed element to the carrier jaws, a plurality of additional similar carriers and a magazine therefor, a series of receptacles adapted to contain solutions for developing said exposed element, a carriage having arms to receive and support the carrier, means to release the carrier from the support arms when the carrier is adjacent the first receptacle, means operable after the loaded carrier has been released, to supply an unloaded carrier from the magazine onto the supporting arms, and means to move the carriage from one position to another, to sequentially move the loaded carrier to a position adjacent the first receptacle, release the carrier so that it may be delivered to said first receptacle, receive an unloaded carrier from the magazine and move the unloaded carrier to a position in readiness to receive the next sensitized element.

6. In an automatic photographing machine having a series of baths for developing a sensitized element exposed thereby, the combination of a carrier having gripping jaws to receive said element after exposure, means to feed said element to the jaws, a plurality of additional similar carriers and a magazine therefor, a carriage having arms to receive and support said carriers, means to tilt the arms to release the loaded carrier adjacent the bath, means operable after the loaded carrier has been released, to supply an unloaded carrier from the magazine onto the support arms and means to move the carriage from one position to the other, becoming operative when an exposure has been completed to sequentially move the loaded carrier to a position adjacent the first bath, release the carrier so that it may be delivered to the bath, receive an unloaded carrier from the magazine and move the unloaded carrier to a position in readiness to receive the next sensitized element.

7. In an automatic photographing device a plate holder, means in the plate holder to receive a sensitized plate delivered from an outside source, means to clamp the sensitized plate in the plate holder and means operative when an exposure has been made on said plate to release the clamping means to allow the plate to drop out of the plate holder, a carrier for the plate, means to deliver the dropped plate to the carrier, a plurality of additional similar carriers and a magazine therefor, a series of receptacles for solutions for developing said element, a carriage having arms to receive and support the carriers, means to tilt the arms to release the loaded carrier adjacent the receptacles and means operable after the loaded carrier has been released, to supply an unloaded carrier from the magazine onto the carriage arms, means to move the carriage to sequentially transfer the loaded carrier to a position adjacent the first receptacle, release said carrier so that it may be delivered to the solution therein, receive an unloaded carrier from the magazine and move it to a position in readiness to receive the next sensitized element.

LEONIDAS A. VASSAKOS.